(12) United States Patent
Itou et al.

(10) Patent No.: US 9,683,761 B2
(45) Date of Patent: Jun. 20, 2017

(54) INTEGRATION VALVE AND HEAT PUMP CYCLE

(71) Applicant: DENSO CORPORATION, Kariya, Aichi-pref. (JP)

(72) Inventors: Tetsuya Itou, Kariya (JP); Teruyuki Hotta, Nagoya (JP); Atsushi Inaba, Kariya (JP); Yukihiko Takeda, Aichi-gun (JP); Shigeji Ohishi, Anjo (JP); Keiichi Yoshii, Anjo (JP)

(73) Assignee: DENSO CORPORATION, Kariya, Aichi-pref. (JP)

( * ) Notice: Subject to any disclaimer, the term of this patent is extended or adjusted under 35 U.S.C. 154(b) by 447 days.

(21) Appl. No.: 14/349,543

(22) PCT Filed: Oct. 2, 2012

(86) PCT No.: PCT/JP2012/006301
§ 371 (c)(1),
(2) Date: Apr. 3, 2014

(87) PCT Pub. No.: WO2013/051235
PCT Pub. Date: Apr. 11, 2013

(65) Prior Publication Data
US 2014/0238067 A1  Aug. 28, 2014

(30) Foreign Application Priority Data

Oct. 5, 2011 (JP) .................................. 2011-221016
Aug. 24, 2012 (JP) .................................. 2012-185550

(51) Int. Cl.
*F25B 30/02* (2006.01)
*F25B 41/06* (2006.01)
(Continued)

(52) U.S. Cl.
CPC ......... *F25B 30/02* (2013.01); *B60H 1/00885* (2013.01); *B60H 1/00921* (2013.01);
(Continued)

(58) Field of Classification Search
CPC ........ F25B 30/02; F25B 41/062; F25B 41/04; F25B 2600/11; F25B 2600/2513;
(Continued)

(56) References Cited

U.S. PATENT DOCUMENTS 3,667,497 A * 6/1972 Farmery ............... B60T 13/148
137/118.07
5,526,650 A   6/1996 Iritani et al.
(Continued)

FOREIGN PATENT DOCUMENTS

JP   S62-076876 U   5/1987
JP   H11-157327 A   6/1999
(Continued)

OTHER PUBLICATIONS

U.S. Appl. No. 13/349,620, filed Apr. 3, 2014, Itou et al.
(Continued)

*Primary Examiner* — Len Tran
*Assistant Examiner* — Kirstin Oswald
(74) *Attorney, Agent, or Firm* — Harness, Dickey & Pierce, P.L.C.

(57) ABSTRACT

In an integration valve, a body, in which a vapor-liquid separating space is provided, includes a fixed throttle decompressing liquid-phase refrigerant, a liquid-phase refrigerant side valve body member opening or closing a liquid-phase refrigerant passage, and a vapor-phase refrigerant side valve body member opening or closing a vapor-phase refrigerant passage. Further, the vapor-phase refrigerant side valve body member is configured by a differential pressure regulating valve operated based on a pressure (Continued)

difference between a refrigerant pressure at a side of the vapor-phase refrigerant passage and a refrigerant pressure at a side of the liquid-phase refrigerant passage. The vapor-phase refrigerant side valve body member is movable when the liquid-phase refrigerant side valve body member is moved by a solenoid. Therefore, a cycle configuration of a heat pump cycle configuring a gas injection cycle can be simplified.

18 Claims, 24 Drawing Sheets

(51) Int. Cl.
*F25B 41/04* (2006.01)
*B60H 1/00* (2006.01)
(52) U.S. Cl.
CPC ............ *F25B 41/04* (2013.01); *F25B 41/062* (2013.01); *F25B 2341/062* (2013.01); *F25B 2341/065* (2013.01); *F25B 2400/13* (2013.01); *F25B 2500/18* (2013.01); *F25B 2600/11* (2013.01); *F25B 2600/2501* (2013.01); *F25B 2600/2509* (2013.01); *F25B 2600/2513* (2013.01); *Y02B 30/72* (2013.01)
(58) Field of Classification Search
CPC ........ F25B 2600/2501; F25B 2341/065; F25B 2500/18; F25B 2600/2509; F25B 2341/062; B60H 1/00885; B60H 1/00921; Y02B 30/72

USPC ........................................ 62/324.6, 512, 528
See application file for complete search history.

(56) References Cited

U.S. PATENT DOCUMENTS

| 5,619,861 | A | * | 4/1997 | Yamanaka | ............ | F25B 41/062 |
| | | | | | | 62/225 |
| 5,704,219 | A | | 1/1998 | Suzuki et al. | | |
| 5,934,094 | A | | 8/1999 | Itoh et al. | | |
| 2013/0312447 | A1 | | 11/2013 | Inaba et al. | | |

FOREIGN PATENT DOCUMENTS

| JP | 3257361 B2 | 2/2002 |
| JP | 3331765 B2 | 10/2002 |
| JP | 2005037114 A | 2/2005 |
| JP | 2010-133606 A | 6/2010 |
| JP | 2012-181005 A | 9/2012 |
| WO | WO-2012108211 A1 | 8/2012 |
| WO | WO-2013/051237 A1 | 4/2013 |

OTHER PUBLICATIONS

International Search Report and Written Opinion issued in the subject International Application No. PCT/JP2012/006301, ISA/JP, mailed Jan. 8, 2013.

* cited by examiner

COOLING OPERATION MODE /
DEHUMIDIFICATION AND HEATING OPERATION MODE

HEATING OPERATION MODE (FIRST HEATING MODE)

HEATING OPERATION MODE (SECOND HEATING MODE)

COOLING OPERATION MODE

HEATING OPERATION MODE (FIRST HEATING MODE)

HEATING OPERATION MODE (SECOND HEATING MODE)

DEHUMIDIFICATION AND HEATING OPERATION MODE
(FIRST DEHUMIDIFICATION AND HEATING MODE)

DEHUMIDIFICATION AND HEATING OPERATION MODE
(FOURTH DEHUMIDIFICATION AND HEATING MODE)

INTEGRATION VALVE AND HEAT PUMP CYCLE

CROSS REFERENCE TO RELATED DISCLOSURE

This disclosure is a 371 U.S. National Phase application based on PCT/JP2012/006301, filed on Oct. 2, 2012, which is based on Japanese Patent Disclosures No. 2011-221016 filed on Oct. 5, 2011 and No. 2012-185550 filed on Aug. 24, 2012, the contents of which are incorporated herein by reference in their entirety.

FIELD OF THE INVENTION

The present disclosure relates to an integration valve for a heat pump cycle, and the heat pump cycle using the same. The integration valve and the heat pump cycle are effectively used for a vehicle.

BACKGROUND OF THE INVENTION

Conventionally, an air conditioner for a vehicle such as an electric vehicle, in which a heat source for a heating a passenger compartment is hardly secured, is known to heat air blown into a passenger compartment in a heat pump cycle (i.e., a vapor compression refrigerant cycle).

For example, Patent Document 1 and Patent Document 2 describe a heat pump cycle used for such kind of a vehicle air conditioner, in which a refrigerant cycle in a cooling operation and a refrigerant cycle in a heating operation are configured to be switchable. More specifically, in the heat pump cycle of Patent Document 1 and Patent Document 2, a refrigerant cycle is switched so that refrigerant absorbs heat from outside air at an exterior heat exchanger and releases the heat to air blown into a passenger compartment at an interior condenser, to heat the air blown into the passenger compartment in the heating operation.

In the heat pump cycle of Patent Document 2, in the heating operation, refrigerant is pressurized through multiple stages by two compression mechanisms such as a low stage compression mechanism and a high stage compression mechanism. An intermediate-pressure gas-phase refrigerant is mixed with a refrigerant discharged from the low stage compression mechanism, and the mixed refrigerant is drawn into the high stage compression mechanism. That is, a gas injection cycle (i.e., an economizer-type refrigerant cycle) is set to improve a coefficient of performance (COP) in the heating operation.

PRIOR ART DOCUMENT

Patent Document 1: Japanese Patent No. 3331765
Patent Document 2: Japanese Patent No. 3257361

SUMMARY OF THE INVENTION

However, according to investigations of inventors of the present application, the heat pump cycle described in Patent Document 1 and Patent Document 2 needs to have multiple valves such as an open-close valve or a four-way valve to switch between the refrigerant cycle in the cooling operation and the refrigerant cycle in the heating operation. Therefore, switching control to switch cycle structures or refrigerant cycles may become complicated.

Specifically, when a refrigerant cycle working as a gas injection cycle, such as the refrigerant cycle described in Patent Document 2, is configured, a cycle structure tends to likely be complicated compared to a conventional refrigerant cycle. Further, in association with a complicated cycle structure, there is a risk that an ease of mounting of the heat pump cycle as a whole to an object such as a vehicle may be decreased.

The present disclosure has been made in view of the foregoing points, and it is a first object of the present disclosure to provide an integration valve capable of simplifying a cycle configuration of a heat pump cycle.

Further, it is a second object of the present disclosure to improve a mountability of a heat pump cycle to be mounted to an object.

According to the present disclosure, an integration valve is used for a heat pump cycle having a compressor compressing and discharging refrigerant. The integration valve has a body, a liquid-phase refrigerant side valve member, a fixed throttle, and a vapor-phase refrigerant side valve member. The body is provided with (i) a refrigerant inlet port to which refrigerant discharged from the compressor flows, (ii) a vapor-liquid separating space separating refrigerant flowing from the refrigerant inlet port into vapor-phase refrigerant and liquid-phase refrigerant, (iii) a vapor-phase refrigerant outlet port through which vapor-phase refrigerant separated in the vapor-liquid separating space flows, and (iv) a liquid-phase refrigerant outlet port through which liquid-phase refrigerant separated in the vapor-liquid separating space flows. The liquid-phase refrigerant side valve member opens or closes a liquid-phase refrigerant passage extending from the vapor-liquid separating space to the liquid-phase refrigerant outlet port. The fixed throttle decompresses liquid-phase refrigerant and passes the decompressed liquid-phase refrigerant to a side of the liquid-phase refrigerant outlet port, when the liquid-phase refrigerant side valve member closes the liquid-phase refrigerant passage. The vapor-phase refrigerant side valve member opens or closes a vapor-phase refrigerant passage extending from the vapor-liquid separating space to the vapor-phase refrigerant outlet port are disposed. The vapor-phase refrigerant side valve member is configured by a differential pressure regulating valve moved based on a pressure difference between a refrigerant pressure at a side of the liquid-phase refrigerant outlet port and a refrigerant pressure at a side of the vapor-phase refrigerant passage.

In the body in which the vapor-liquid separating space or the like are disposed, the fixed throttle decompressing liquid-phase refrigerant, the liquid-phase refrigerant side valve member opening or closing the liquid-phase refrigerant passage, and the vapor-phase refrigerant side valve member opening or closing the vapor-phase refrigerant passage are integrated and disposed. Accordingly, a cycle configuration of the heat pump cycle configuring a gas injection cycle can be simplified.

Further, because the liquid-phase refrigerant side valve member is configured by the differential pressure regulating valve movable based on a pressure difference, a movement part (e.g., an electromagnetic mechanism or the like) for only move the vapor-phase refrigerant side valve member is not required to dispose. Accordingly, the vapor-phase refrigerant passage can be open or closed by displacing the vapor-phase refrigerant side valve member based on an operation of the liquid-phase refrigerant side valve member.

More specifically, a refrigerant pressure at the side of the liquid-phase refrigerant outlet port is equal to a refrigerant pressure at the side of the vapor-phase refrigerant passage when the vapor-phase refrigerant side valve member opens the liquid-phase refrigerant passage. A refrigerant pressure at the side of the liquid-phase refrigerant outlet port becomes a pressure caused by decompressing a refrigerant at the side of the liquid-phase refrigerant outlet when the liquid-phase refrigerant side valve member closes the liquid-phase refrigerant passage. Accordingly, the refrigerant pressure at the side of the liquid-phase refrigerant outlet port becomes lower than a refrigerant pressure at the side of the vapor-phase refrigerant passage.

In such a case, the vapor-phase refrigerant side valve member can be moved based on a pressure difference caused between the refrigerant pressure at the side of the liquid-phase refrigerant outlet port and the refrigerant pressure at the side of the vapor-phase refrigerant passage. Therefore, a heat pump cycle working as a gas injection cycle can be configured with a simple cycle configuration. It should be noted that "vapor-phase refrigerant" includes not only refrigerant in a vapor-phase state (i.e., single phase refrigerant) but also refrigerant in a vapor-liquid mixing state mainly including refrigerant in the vapor-phase state, and that "liquid-phase refrigerant" includes not only refrigerant in a liquid-phase state (i.e., single phase refrigerant) but also refrigerant in a vapor-liquid mixing state mainly including refrigerant in the liquid-phase state.

Alternatively, according to the integration valve of the present disclosure, the vapor-phase refrigerant side valve member may be configured by a differential pressure regulating valve in which the vapor-phase refrigerant passage is open when a refrigerant pressure at the side of the liquid-phase refrigerant outlet port is lower than a refrigerant pressure at the side of the vapor-phase refrigerant passage.

Specifically, when the liquid-phase refrigerant side valve member closes the liquid-phase refrigerant passage, (i) vapor-phase refrigerant separated in the vapor-liquid separating space flows out of the vapor-phase refrigerant outlet port, and (ii) refrigerant decompressed at the fixed throttle flows out of the liquid-phase refrigerant outlet port.

On the other hand, when the liquid-phase refrigerant side valve member opens the liquid-phase refrigerant passage, refrigerant flows out of the liquid-phase refrigerant outlet port without flowing out through the vapor-phase refrigerant outlet port.

Alternatively, according to the integration valve of the present disclosure, the body may further have therein a pressure introducing passage through which a pressure of refrigerant at the liquid-phase refrigerant outlet port is applied to the vapor-phase refrigerant side valve member. Accordingly, a refrigerant passage through which a refrigerant pressure at the side of the liquid-phase refrigerant outlet port is applied to the vapor-phase refrigerant side valve member is unnecessary. Therefore, a cycle configuration of the heat pump cycle can be further simplified.

Alternatively, according to the integration valve of the present disclosure, an electromagnetic mechanism operating the liquid-phase refrigerant side valve member based on electric force applied thereto may be used. By the electromagnetic mechanism, an operation of the liquid-phase refrigerant side valve member can easily be controlled. The electromagnetic mechanism includes a solenoid actuator moving a moving member by causing electromagnetic force by applying electric force, a motor generating rotational driving force based on electric force applied thereto, or the like.

Alternatively, according to the integration valve of the present disclosure, the liquid-phase refrigerant passage and the fixed throttle may be arranged downward of a separated vapor-phase refrigerant outlet hole through which vapor-phase refrigerant flows from the vapor-liquid separating space to the side of the vapor-phase refrigerant passage. Accordingly, liquid-phase refrigerant separated in the vapor-liquid separating space can be moved downward of the vapor-liquid separating space by an effect of gravity, and vapor-phase refrigerant separated in the vapor-liquid separating space can be accurately introduced to the side of the vapor-phase refrigerant passage.

Alternatively, according to the integration valve of the present disclosure, the integration valve may further have a regulating member and a sealing member. The regulating member regulates a movement of the vapor-phase refrigerant side valve member by abutting to the vapor-phase refrigerant side valve member when the vapor-phase refrigerant side valve member opens the vapor-phase refrigerant passage. The sealing member restricts refrigerant from leaking through a contact part at which the vapor-phase refrigerant side valve member and the regulating member abut to each other. The sealing member is disposed on at least one side of the vapor-phase refrigerant side valve member or the regulating member.

Because the sealing member is disposed, the sealing member restricts refrigerant from leaking through the contact part at which the vapor-phase refrigerant side valve member and the regulating member abut to each other when the vapor-phase refrigerant side valve member opens the vapor-phase refrigerant passage. Accordingly, decrease of pressure difference can be restricted.

Therefore, for example, decrease of a pressure difference between a refrigerant pressure at the side of the liquid-phase refrigerant outlet port and a refrigerant pressure at the side of the vapor-phase refrigerant passage is restricted, by employing a configuration in which the vapor-phase refrigerant side valve member opens the vapor-phase refrigerant passage when the refrigerant pressure at the side of the liquid-phase refrigerant outlet port is lower than the refrigerant pressure at the side of the vapor-phase refrigerant passage. Accordingly, the vapor-phase refrigerant side valve member keeps the vapor-phase refrigerant passage opening.

Moreover, by disposing the sealing member to the contact part, a slide resistance caused when the vapor-phase refrigerant side valve member moves is restricted from increasing.

Alternatively, according to the integration valve of the present disclosure, the body may be provided with a separated liquid-phase refrigerant outlet hole through which liquid-phase refrigerant flows from the vapor-liquid separating space to a side of the liquid-phase refrigerant passage. A flow direction of liquid-phase refrigerant flowing out of the separated liquid-phase refrigerant outlet hole may be different from a flow direction of refrigerant flowing in the liquid-phase refrigerant passage.

Because the flow direction of the liquid-phase refrigerant flowing out of the separated liquid-phase refrigerant outlet hole is different from the flow direction of the refrigerant flowing in the liquid-phase refrigerant passage, mixing of vapor-phase refrigerant and liquid-phase refrigerant is promoted, and the slip ratio can be stabilized in a low value. Accordingly, a decompression characteristic of the fixed throttle can be restricted from changing.

Furthermore, a flow direction of liquid-phase refrigerant flowing out of the separated liquid-phase refrigerant outlet port is preferably changed at about a right angle with respect to a flow direction of refrigerant flowing in the liquid-phase refrigerant passage.

Alternatively, according to the integration valve of the present disclosure, the vapor-liquid separating space may be formed in a cylindrical shape. The vapor-liquid separating space may be configured to separate vapor-phase refrigerant and liquid-phase refrigerant from each other by using a centrifugal force in the vapor-liquid separating space.

A vapor-liquid separating performance of a configuration in which vapor-phase refrigerant and liquid-phase refrigerant are separated from each other by using the centrifugal force is higher than a vapor-liquid separating performance of a configuration in which vapor-phase refrigerant and liquid-phase refrigerant are separated from each other by using gravity or the like. Accordingly, a space for providing the vapor-liquid separating space is saved, and a whole of the integration valve can be downsized. Therefore, a hole of the heat pump cycle can be downsized, and a mountability of the heat pump cycle to be mounted to an object can be improved.

Specifically, the vapor-liquid separating space may be provided with a separated vapor-phase refrigerant outlet pipe arranged coaxially with the vapor-liquid separating space and providing the vapor-phase refrigerant passage therein. The separated vapor-phase refrigerant outlet pipe may be provided with a separated vapor-phase refrigerant outlet hole through which vapor-phase refrigerant flows from the vapor-liquid separating space to a side of the vapor-phase refrigerant passage. The separated vapor-phase refrigerant outlet hole is arranged at one end part of the separated vapor-phase refrigerant outlet pipe in a longitudinal direction.

Alternatively, according to the integration valve of the present disclosure, a shutter member may be disposed. The shutter member is formed in a discoid shape and restricts liquid-phase refrigerant separated in the vapor-liquid separating space from scattering toward a side of the separated vapor-phase refrigerant outlet hole. The shutter member is arranged between the separated vapor-phase refrigerant outlet hole and a separated liquid-phase refrigerant outlet hole through which liquid-phase refrigerant flows from the vapor-liquid separating space to a side of the liquid-phase refrigerant passage.

In such a configuration, the shutter member can restrict liquid-phase refrigerant from scattering from the side of the separated liquid-phase refrigerant outlet hole to the side of the separated vapor-phase refrigerant outlet hole. Accordingly, a vapor-liquid separating efficiency in the integration valve can be improved. Therefore, the space for providing the vapor-liquid separating space can be saved, and the whole of the integration valve can be downsized. As a result, the hole of the heat pump cycle can be downsized, and the mountability of the heat pump cycle to be mounted to an object can be improved.

Alternatively, according to the integration of the present disclosure, a diameter Ds of the shutter member, a diameter Dp of the separated vapor-phase refrigerant outlet pipe, a diameter Dr of the vapor-liquid separating space, and a diameter Do of the separated liquid-phase refrigerant outlet hole may be determined to satisfy following formulas of $Dp \leq Ds \leq (Dx+Dr)/2$ and $Dx=(Dr^2-Do^2)^{1/2}$.

By determining the diameter of the shutter member, a pressure loss due to the shutter member can be restricted, and the vapor-liquid separating efficiency in the integration valve can be improved.

Alternatively, according to the integration valve of the present disclosure, a diameter of an outer periphery of the shutter member at the side of the separated vapor-phase refrigerant outlet hole may decrease continuously from a side of the separated liquid-phase refrigerant outlet hole to the side of the separated vapor-phase refrigerant outlet hole.

Thus, refrigerant flows smoothly from the side of the separated vapor-phase refrigerant outlet hole to the side of the separated liquid-phase refrigerant outlet hole. Accordingly, the pressure loss due to the shutter member can be reduced.

Alternatively, according to the integration valve of the present disclosure, the vapor-liquid separating space may communicate with a refrigerant introducing passage introducing refrigerant from the refrigerant inlet port to the vapor-liquid separating space via a refrigerant introducing hole provided on a radial-outer wall surface of the vapor-liquid separating space. The refrigerant introducing hole may be an oblong hole extending in an axial direction of the vapor-liquid separating space and opens at a location further from the one end part of the separated vapor-phase refrigerant outlet pipe than the other end part of the separated vapor-phase refrigerant outlet pipe in the longitudinal direction.

The refrigerant introducing hole is configured by the oblong hole extending in the axial direction of the vapor-liquid separating space and arranged to be distanced from the separated vapor-phase refrigerant outlet hole in the axial direction. Accordingly, a diffusion of refrigerant in a radial-inward direction of the vapor-liquid separating space 141b can be restricted while an approach zone for refrigerant in the vapor-liquid separating space is secured, and refrigerant can flow along the radial-outer wall surface of the vapor-liquid separating space. Therefore, centrifugal force can effectively act to refrigerant flowing into the vapor-liquid separating space, and a vapor-liquid separating efficiency in the integration valve can be improved.

Alternatively, according to the integration valve of the present disclosure, (i) a distance Lv from an end part of the refrigerant introducing hole on a side of the one end part of the separated vapor-phase refrigerant outlet pipe in the longitudinal direction to the one end part of the separated vapor-phase refrigerant outlet pipe and (ii) a vertical dimension Dv of the refrigerant introducing hole extending in the axial direction of the vapor-liquid separating space may be determined to satisfy a formula of $Lv \geq (½) \times Dv$.

By determining the distance from the end part of the refrigerant introducing hole to the one end part of the separated vapor-phase refrigerant outlet pipe, the approach zone for refrigerant swirling in the vapor-liquid separating space can be secured, and the vapor-liquid separating efficiency in the integration valve can be improved.

Alternatively, according to the integration valve of the present disclosure, at least a part of the body providing a refrigerant passage extending from the fixed throttle at the liquid-phase refrigerant passage to the liquid-phase refrigerant outlet port or a part of the body providing the fixed throttle may be made of a material having higher thermal resistance than other parts.

Thus, an indirect heat-transferring caused between vapor-liquid mixed refrigerant after passing through the fixed throttle and liquid-phase refrigerant before passing through the fixed throttle via the body and the fixed throttle can be restricted. Therefore, a change of decompression characteristic of the fixed throttle can be restricted.

Alternatively, according to the integration valve of the present disclosure, a flow direction of refrigerant flowing out of the fixed throttle may be the same as a flow direction of refrigerant flowing through the refrigerant passage extending from the fixed throttle at the liquid-phase refrigerant passage to the liquid-phase refrigerant outlet port.

In such a configuration of the integration vale, refrigerant is decompressed at the fixed throttle, a temperature of the refrigerant is decreased at the fixed throttle, and the refrigerant flows to the side of the liquid-phase refrigerant outlet port linearly. By the configuration, an indirect heat-transferring caused between refrigerant after passing through the fixed throttle and refrigerant before passing through the fixed throttle via the body and the fixed throttle can be restricted. Therefore, a change of decompression characteristic of the fixed throttle can be restricted.

Alternatively, according to the integration valve of the present disclosure, at least (i) a part of the body providing a refrigerant passage extending from the vapor-liquid separating space to the fixed throttle and (ii) a part of the body providing a refrigerant passage extending from the fixed throttle to the liquid-phase refrigerant outlet port may have a cross-sectional area smaller than other part of the body so as to be higher in thermal resistance.

Thus, an indirect heat-transferring between refrigerant after passing through the fixed throttle and refrigerant before passing through the fixed throttle via the body is restricted. Therefore, a change of decompression characteristic of the fixed throttle can be restricted.

Alternatively, according to the heat pump cycle of the present disclosure, the heat pump cycle may have a compressor, a using-side heat exchanger, a high-stage-side decompressor, an integration valve, and an evaporator. The compressor (i) draws low-pressure refrigerant from a suction port, (ii) compresses the low-pressure refrigerant, and (iii) discharges high-pressure refrigerant through the discharge port. The compressor has an intermediate pressure port through which intermediate pressure refrigerant flowing in the heat pump cycle flows to be mixed with refrigerant being compressed. In the using-side heat exchanger, the high-pressure refrigerant discharged from the discharge port exchanges heat with a heat-exchange fluid so as to heat the heat-exchanging fluid. The high-stage-side decompressor decompresses high-pressure refrigerant flowing out of the using-side heat exchanger to be intermediate-pressure refrigerant. The integration valve is configured to separate the intermediate-pressure refrigerant decompressed at least at the high-stage-side decompressor into vapor-phase refrigerant and liquid-phase refrigerant. The evaporator evaporates the low-pressure refrigerant flowing out of the integration valve. The evaporated low-pressure refrigerant flows toward a side of the suction port through the evaporator. The integration valve includes a body provided with (i) a refrigerant inlet port through which intermediate-pressure refrigerant decompressed at the high-stage-side decompressor flows, (ii) a vapor-liquid separating space separating refrigerant flowing from the refrigerant inlet port into vapor-phase refrigerant and liquid-phase refrigerant, (iii) a vapor-phase refrigerant outlet port through which vapor-phase refrigerant separated in the vapor-liquid separating space flows toward a side of the intermediate pressure port, and (iv) a liquid-phase refrigerant outlet port through which liquid-phase refrigerant separated in the vapor-liquid separating space flows toward a side of the evaporator. The body has therein (i) a liquid-phase refrigerant side valve member opening or closing a liquid-phase refrigerant passage extending from the vapor-liquid separating space to the liquid-phase refrigerant outlet port, (ii) a fixed throttle decompressing the liquid-phase refrigerant and passing the decompressed liquid-phase refrigerant to a side of the liquid-phase refrigerant outlet port when the liquid-phase refrigerant side valve member loses the liquid-phase refrigerant passage, (iii) a vapor-phase refrigerant side valve member opening or closing a vapor-phase refrigerant passage extending from the vapor-liquid separating space to the vapor-phase refrigerant outlet port. The vapor-phase refrigerant side valve member is configured by a differential pressure regulating valve movable to open the vapor-phase refrigerant passage when a pressure difference is caused between a refrigerant pressure at a side of the liquid-phase refrigerant outlet port and a refrigerant pressure at a side of the vapor-phase refrigerant passage.

Thus, the heat pump cycle uses the integration valve includes the body in which the vapor-liquid separating space or the like are provided. In the body, (i) the fixed throttle decompressing liquid-phase refrigerant, (ii) the liquid-phase refrigerant side valve member opening or closing the liquid-phase refrigerant passage, and (iii) the vapor-phase refrigerant side valve member opening or closing the vapor-phase refrigerant passage are disposed integrally. Accordingly, a gas injection cycle can be configured without having complicated cycle configuration.

More specifically, the heat pump cycle of the present disclosure has the compressor including the intermediate pressure port with respect to a conventional heat pump cycle. Because the vapor-phase refrigerant outlet port of the integration valve and the intermediate pressure port are connected to each other, the heat pump cycle performing as the gas injection cycle can be configured extremely easily. Therefore, a mountability of the heat pump cycle to be mounted to an object can be improved.

Alternatively, according to the present disclosure, the heat pump cycle may have a compressor, a first using-side heat exchanger, a second using-side heat exchanger, an exterior heat exchanger, a first decompressor, a second decompressor, and an integration valve. The compressor (i) draws low-pressure refrigerant from a suction port, (ii) compresses the low-pressure refrigerant, and (iii) discharges high-pressure refrigerant through a discharge port, the compressor having an intermediate pressure port through which intermediate pressure refrigerant flowing in the heat pump cycle flows to be mixed with refrigerant being compressed. In the first using-side heat exchanger, high-pressure refrigerant discharged from the discharge port exchanges heat with a heat-exchange fluid. In the second using-side heat exchanger, refrigerant exchanges heat with the heat-exchange fluid and flows to a side of the suction port of the compressor through the second using-side heat exchanger. In the exterior heat exchanger, refrigerant exchanges heat with outside air. The first decompressor decompresses refrigerant flowing out of the first using-side heat exchanger. The second decompressor decompresses refrigerant flowing into the second using-side heat exchanger. The integration valve is configured to separate at least refrigerant flowing out of the first decompressor into vapor-phase refrigerant and liquid-phase refrigerant, and the integration valve through which the separated liquid-phase refrigerant flows out through the integration valve. The integration valve includes a body provided with (i) a refrigerant inlet port through which refrigerant flowing out of the first decompressor flows into the integration valve, (ii) a vapor-liquid separating space separating refrigerant flowing from the refrigerant inlet port into vapor-phase refrigerant and liquid-phase refrigerant, (iii) a vapor-phase refrigerant outlet port through which vapor-phase refrigerant separated in the vapor-liquid separating space flows toward a side of the intermediate pressure port, and (iv) a liquid-phase refrigerant outlet port through which liquid-phase refrigerant separated in the vapor-liquid separating space flows toward a side of the exterior heat exchanger. The body has therein (i) a liquid-phase refrigerant side valve member opening or closing a liquid-phase refrigerant passage extending from the vapor-liquid separating space to the liquid-phase refrigerant outlet port, (ii) a fixed throttle decompressing the liquid-phase refrigerant and passing the decompressed liquid-phase refrigerant to a side of the liquid-phase refrigerant outlet port when the liquid-phase refrigerant side valve member closes the liquid-phase refrigerant passage, and (iii) a vapor-phase refrigerant side valve member opening or closing a vapor-phase refrigerant passage extending from the vapor-liquid separating space to the vapor-phase refrigerant outlet port. The vapor-phase refrigerant side valve member is configured by a differential pressure regulating valve in which the liquid-phase refrigerant passage is open when a pressure difference is caused between a refrigerant pressure at a side of the liquid-phase refrigerant outlet port and a refrigerant pressure at a side of the vapor-phase refrigerant passage. When the liquid-phase refrigerant side valve member opens the liquid-phase refrigerant passage, a refrigerant cycle is set so that refrigerant flows out of the liquid-phase refrigerant outlet port without flowing out of the vapor-phase refrigerant outlet port and flows through the exterior heat exchanger, the second decompressor, and the second using-side heat exchanger in this order. When the liquid-phase refrigerant side valve member closes the liquid-phase refrigerant passage, a refrigerant cycle is set so that (i) refrigerant flowing out of the liquid-phase refrigerant outlet port flows to a side of the suction port through the exterior heat exchanger, and (ii) refrigerant flowing out of the vapor-phase refrigerant outlet port flows to a side of the intermediate pressure port.

Thus, the heat pump cycle has the integration valve includes a body in which the vapor-liquid separating space or the like are provided. In the body, (i) the fixed throttle decompressing liquid-phase refrigerant, (ii) the liquid-phase refrigerant side valve member opening or closing the liquid-phase refrigerant passage, and (iii) the vapor-phase refrigerant side valve member opening or closing the vapor-phase refrigerant passage are disposed integrally. Accordingly, a heat pump cycle having a switchable refrigerant cycle can be configured without having complicated cycle configuration.

More specifically, when the liquid-phase refrigerant side valve member opens the liquid-phase refrigerant passage, a cycle configuration is set such that at least one of the first using-side heat exchanger and the exterior heat exchanger works as a radiator at which refrigerant radiates heat, and the second using-side heat exchanger works as an evaporator at which refrigerant evaporates.

On the other hand, when the liquid-phase refrigerant side valve member closes the liquid-phase refrigerant passage, a heat pump cycle can be easily switched to a gas injection cycle in which the first using-side heat exchanger works as a radiator at which refrigerant radiates heat, and the exterior heat exchanger works as an evaporator at which refrigerant evaporates. Therefore, a mountability of the heat pump cycle to be mounted to an object can be improved.

Alternatively, according to the present disclosure, the heat pump cycle may further have a bypass passage and a bypass-passage switching valve. Through the bypass passage, liquid-phase refrigerant separated in the integration valve flows to the side of the suction port while bypassing the second decompressor and the second using-side heat exchanger. The bypass-passage switching valve opens or closes the bypass passage.

Thus, the bypass-passage switching valve closes the bypass passage when the liquid-phase refrigerant side valve member opens the liquid-phase refrigerant. Accordingly, a cycle configuration can be set so that (i) at least of the first using-side heat exchanger and the exterior heat exchanger works as a radiator at which refrigerant radiates heat, and that (ii) the second using-side heat exchanger works as an evaporator evaporating refrigerant because On the other hand, the bypass-passage switching valve opens the bypass passage when the liquid-phase refrigerant side valve member opens the liquid-phase refrigerant passage. Accordingly, a cycle configuration can be set so that the first using-side heat exchanger works as a radiator at which refrigerant radiates heat, and the exterior heat exchanger works as an evaporator evaporating refrigerant.

DETAILED DESCRIPTION OF THE PREFERRED EMBODIMENTS

Embodiments of the present disclosure will be described hereafter referring to drawings. In the embodiments, a part that corresponds to a matter described in a preceding embodiment may be assigned with the same reference number, and redundant explanation for the part may be omitted.

First Embodiment

Referring to FIGS. 1 to 18, a first embodiment of the present invention will be described below. According to the first embodiment, a heat pump cycle (i.e., a vapor compression refrigerant cycle) 10 has an integration valve 14 of the present disclosure, and the heat pump cycle 10 is used for a vehicle air conditioner 1 of an electric vehicle. The electric vehicle gains a driving force from an electric motor for driving the electric vehicle. In the vehicle air conditioner 1, the heat pump cycle 10 carries out a cooling operation or a heating operation to cool or heat a blown air blown into a passenger compartment, which is an example of an object space being air-conditioned. Therefore, an object fluid of heat exchanging is the blown air in the first embodiment.

Figure 1:
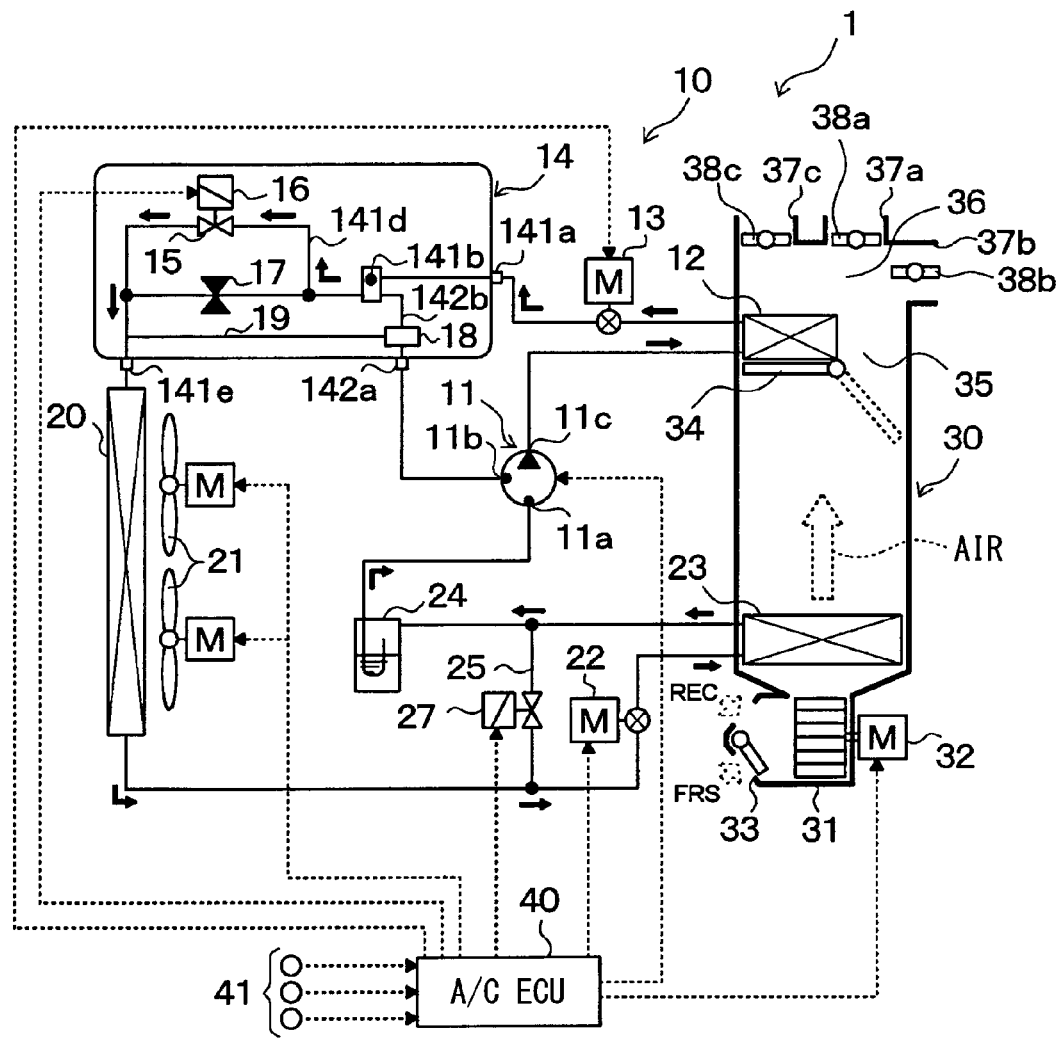
FIG. 1 is an overall schematic diagram illustrating a refrigerant cycle of a heat pump cycle in a cooling operation mode and in a dehumidification and heating operation mode according to a first embodiment.

Further, as shown in an overall schematic diagram of FIG. 1, the heat pump cycle 10 is configured to switch between (i) a refrigerant cycle in a cooling operation mode cooling the passenger compartment (i.e., a cooling operation mode cooling the blown air) or in a dehumidification and heating operation mode (i.e., a dehumidification mode) dehumidifying and heating the passenger compartment and (ii) a refrigerant cycle in a heating operation mode heating the passenger compartment (i.e., a heating operation mode heating the blown air).

Figure 2:
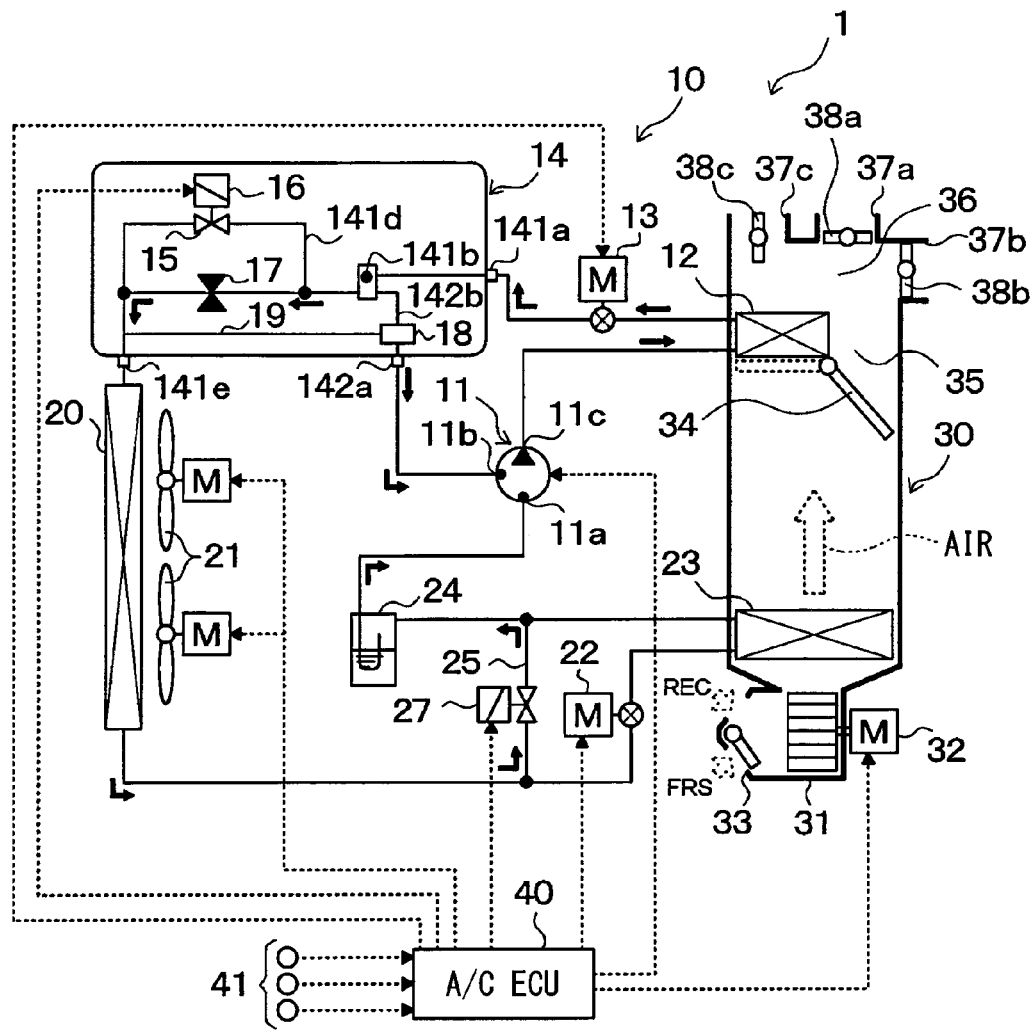
FIG. 2 is an overall schematic diagram illustrating a refrigerant cycle of the heat pump cycle in a first heating mode according to the first embodiment.
Figure 3:
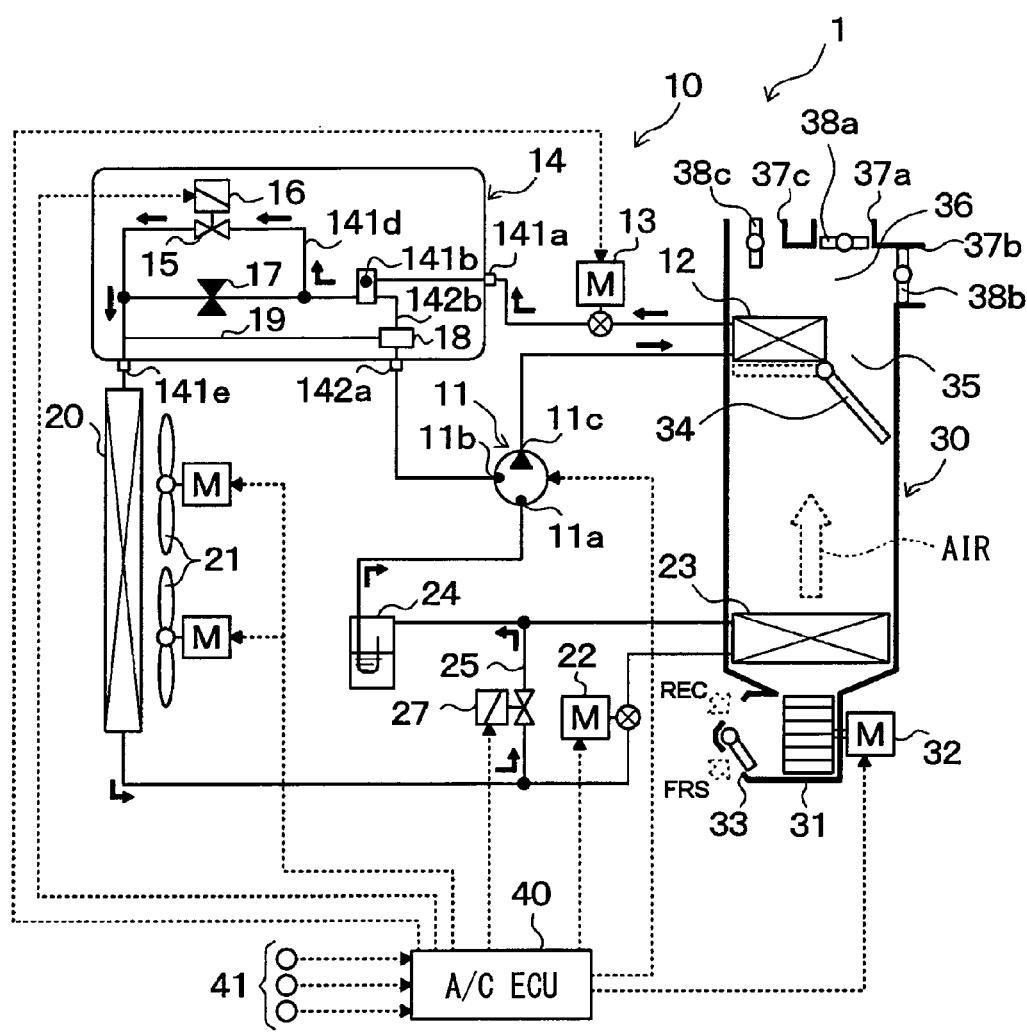
FIG. 3 is an overall schematic diagram illustrating a refrigerant cycle of the heat pump cycle in a second heating mode according to the first embodiment.

Specifically, the heat pump cycle 10 switches between a first heating mode (FIG. 2), which is an example of the heating operation mode and is carried out when an outside temperature is ultralow (e.g., under 0° C.), and a second heating mode (FIG. 3), in which a normal heating is carried out. In FIGS. 1-3, a refrigerant flow of each operation mode is shown by solid arrows.

The heat pump cycle 10 uses a hydrofluorocarbon (HFC)-group refrigerant, specifically, R134a, as a refrigerant and constructs a vapor-compression subcritical refrigerant cycle, in which a high-pressure side refrigerant pressure Pd does not exceed a subcritical pressure of the refrigerant. Other refrigerant such as a hidrofluoroolefin (HFO)-group refrigerant, for example, R1234yf, may be used. Further, the refrigerant is mixed with a refrigerant oil lubricating a compressor 11, and a part of the refrigerant oil circulates in the heat pump cycle 10 together with the refrigerant.

The compressor 11 is one of components of the heat pump cycle 10 and disposed in a bonnet of a vehicle. In the heat pump cycle 10, when the refrigerant is supplied to the compressor 11, the compressor 11 compresses the refrigerant and discharges a compressed refrigerant. The compressor 11 is a double-stage-compression electric compressor configured to include a housing. The housing defines an outer wall of the compressor 11 and houses two compression mechanisms (i.e., a low-stage compression mechanism and a high-stage compression mechanism) and an electric motor, which operates and rotates the two compression mechanisms.

The housing of the compressor 11 has a suction port 11a, an intermediate pressure port 11b, and a discharge port 11c. The suction port 11a draws a low-pressure refrigerant from outside of the housing to the low-stage compressing mechanism. The intermediate pressure port 11b supplies an intermediate-pressure refrigerant from outside the housing to inside the housing and mixes the intermediate-pressure refrigerant with a refrigerant being compressed from a low pressure to a high pressure. The discharge port 11c discharges a high-pressure refrigerant from the high-stage compressing mechanism, to outside of the housing.

Specifically, the intermediate pressure port 11b is connected to a refrigerant outlet side of the low-stage compression mechanism (i.e., a refrigerant suction side of the high-stage compression mechanism). The low-stage compression mechanism and the high-stage compression mechanism may be a scroll-type compression mechanism, vane-type compression mechanism, a rolling-piston-type compression mechanism, or the like.

Operation (i.e., a rotation speed) of the electric motor is controlled by control signals output from an air-conditioning controller 40 (i.e., an A/C ECU) which is described later, and the electric motor may be an alternating-current or a direct-current motor. A refrigerant discharge capacity of the compressor 11 is changed by a rotation-number control. According to the first embodiment, the electric motor configures a discharge capacity changing part changing the refrigerant discharge capacity of the compressor 11.

Although the compressor 11, in which the two compression mechanisms are housed by a single housing, is used according to the first embodiment, a type of a compressor is not limited to the compressor 11. That is, as long as the intermediate-pressure refrigerant is made to flow through the intermediate pressure port 11b and mixed with the refrigerant being compressed from a low pressure to a high pressure, the compressor 11 may be an electric compressor. The electric compressor is configured such that one fixed-capacity-type compression mechanism and an electric motor rotary operating the fixed-capacity-type compression mechanism are housed in a housing.

Further, a double-stage-compression electric compressor may have a structure in which two compressors, a low-stage-side compressor and a high-stage-side compressor, are connected in series. The suction port 11a may be a suction port of the low-stage-side compressor arranged on a low-stage side. The discharge port 11c may be a discharge port of the high-stage-side compressor arranged on a high-stage side. The intermediate pressure port 11b may be located at a connection part connecting a discharge port of the low-stage-side compressor and a suction port of the high-stage-side compressor.

A refrigerant inlet side of an interior condenser 12 is connected to the discharge port 11c of the compressor 11. The interior condenser 12 is a using-side heat exchanger (i.e., a first using-side heat exchanger) heating a blown air passed though an interior evaporator 23 which will be described later, and is disposed in an air conditioning case 31 of an interior air conditioning unit 30 disposed in the vehicle air conditioner 1, which will be described after. The interior condenser 12 works as a radiator radiating heat of a high-temperature high-pressure refrigerant discharged from the compressor 11, specifically, the high-stage-side compression mechanism.

A refrigerant outlet side of the interior condenser 12 is connected with an inlet side of a high-stage-side expansion valve 13 working as a high-stage-side decompressor (i.e., a first decompressor) decompressing a high-pressure refrigerant, flowing out the interior condenser 12, to be an intermediate-pressure refrigerant. The high-stage-side decompressor is an electric variable throttle mechanism including a valve member, in which a throttle opening degree of the valve member can be changed, and an electric actuator having a stepping motor changing the throttle opening degree of the valve member.

Specifically, when the high-stage-side expansion valve 13 is partially closed to decompress a refrigerant, the throttle opening degree is changed such that an equivalent diameter of a throttle passage area is within the range of $\phi 0.5$-$\phi 3$ mm. Further, when the throttle opening degree is fully opened, the equivalent diameter of the throttle passage area can be kept to $\phi 10$ mm so that a refrigerant decompression function is not exerted. Operation of the high-stage-side expansion valve 13 is controlled by control signals output from the air-conditioning controller 40. An outlet side of the high-stage-side expansion valve 13 is connected with a refrigerant inlet port 141a of the integration valve 14.

The integration valve 14 is configured such that a vapor-liquid separating part (e.g., a vapor-liquid separating space 141b), a valve device (e.g., a vapor-phase refrigerant side valve member 18), a valve device (e.g., a liquid-phase refrigerant side valve member 15), and a decompressor (e.g., a fixed throttle 17) are integrated. The vapor-liquid separating space 141b separates refrigerant flowing from the high-stage side expansion valve 13 into vapor-phase refrigerant and liquid-phase refrigerant. The vapor-phase refrigerant side valve member 18 opens or closes a vapor-phase refrigerant passage through which vapor-phase refrigerant separated in the vapor-liquid separating space 141b flows. The liquid-phase refrigerant side valve member 15 opens or closes a liquid-phase refrigerant passage through which liquid-phase refrigerant separated in the vapor-liquid separating space 141b flows. The fixed throttle 17 decompresses liquid-phase refrigerant separated in the vapor-liquid separating space 141b.

In other words, the integration valve 14 has a structure in which a part of component devices required to drive the heat pump cycle 10 as a gas injection cycle are integrated. Moreover, the integration valve 14 carries out a function as a refrigerant cycle switching part switching a refrigerant cycle in which refrigerant is circulating.

Figure 4:
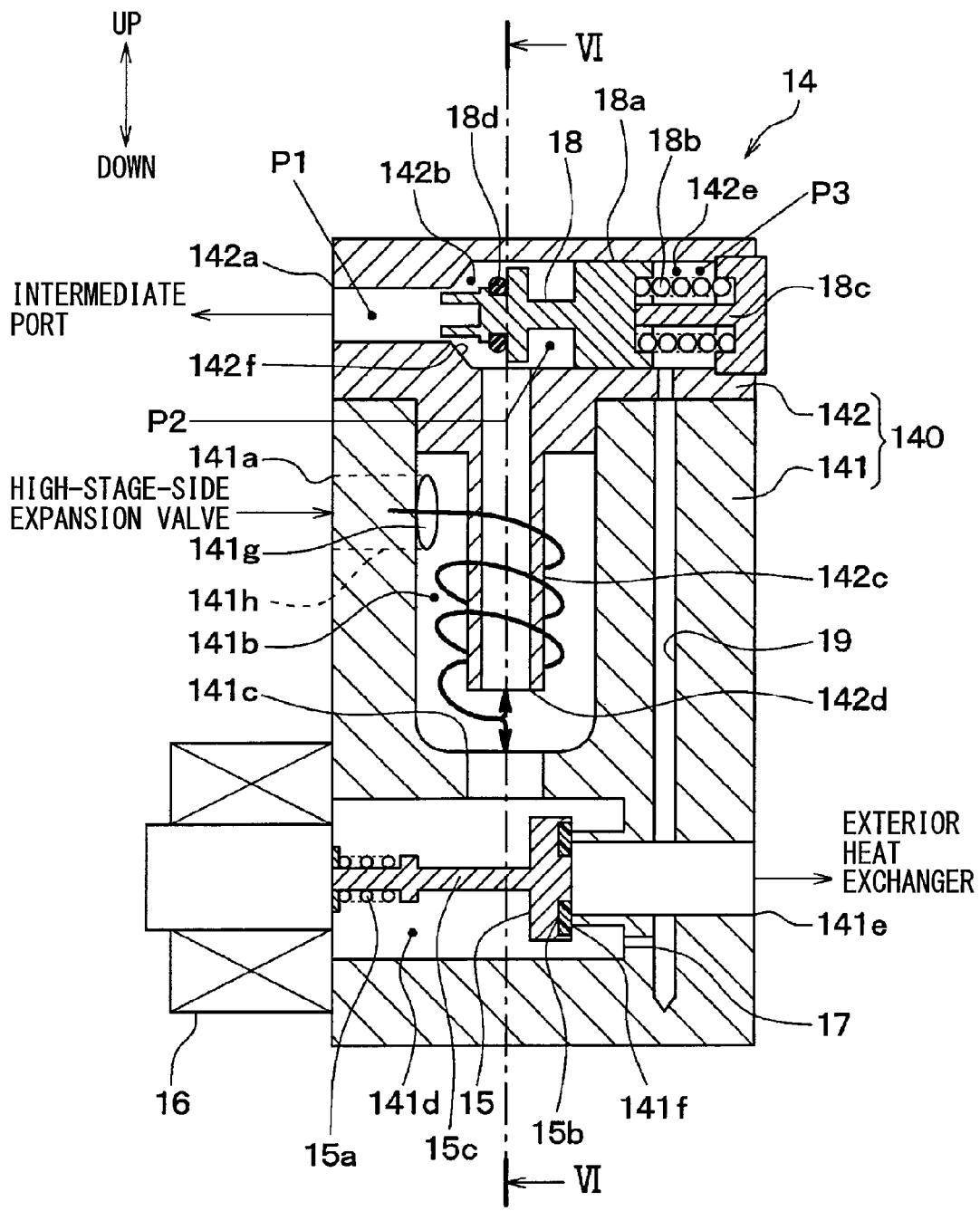
FIG. 4 is a cross-sectional view of an integration valve taken along a line extending in a top-bottom direction in a non-conducting state.
Figure 5:
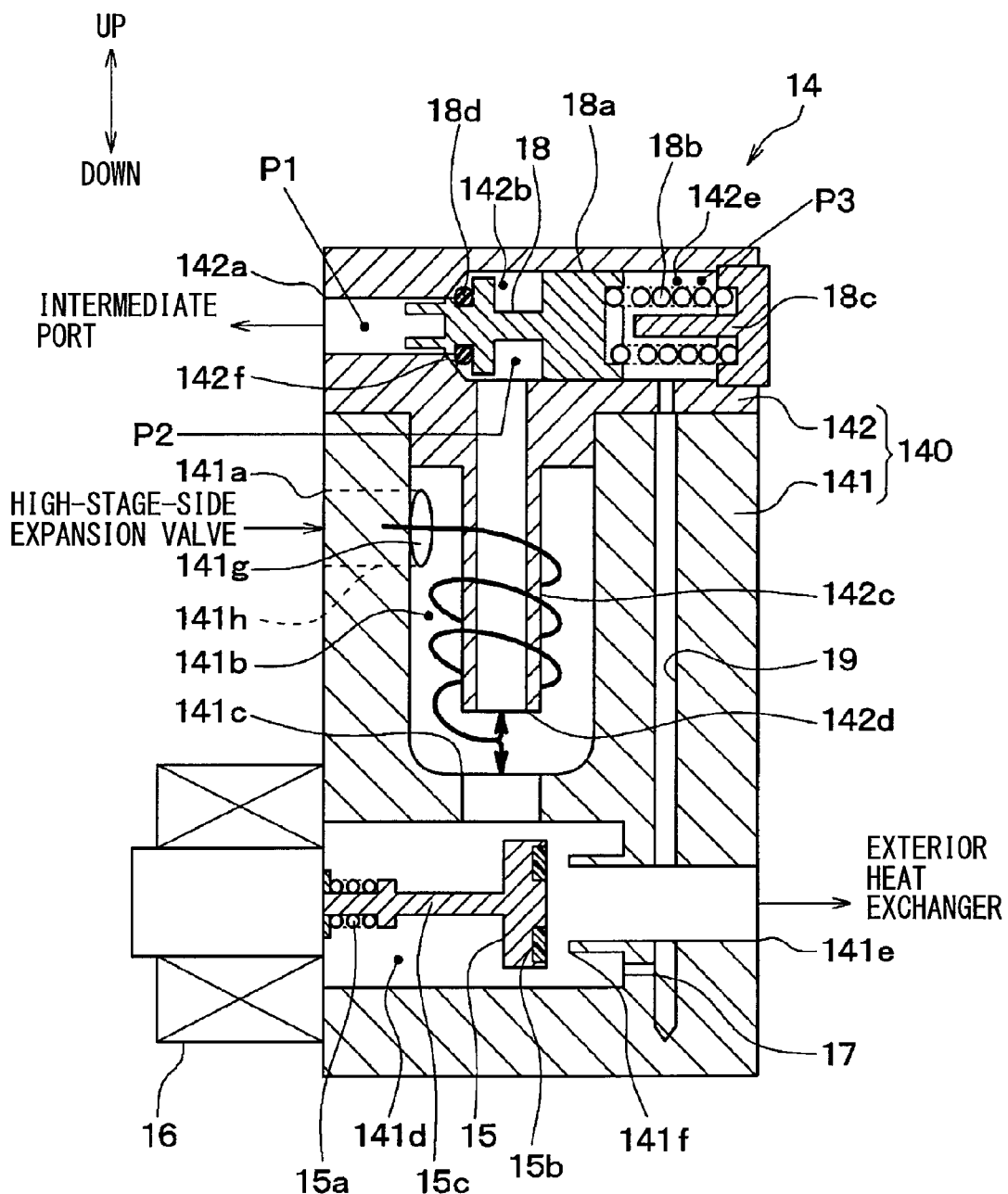
FIG. 5 is a cross-sectional view of the integration valve taken along the line extending in the top-bottom direction in a conducting state.
Figure 6:
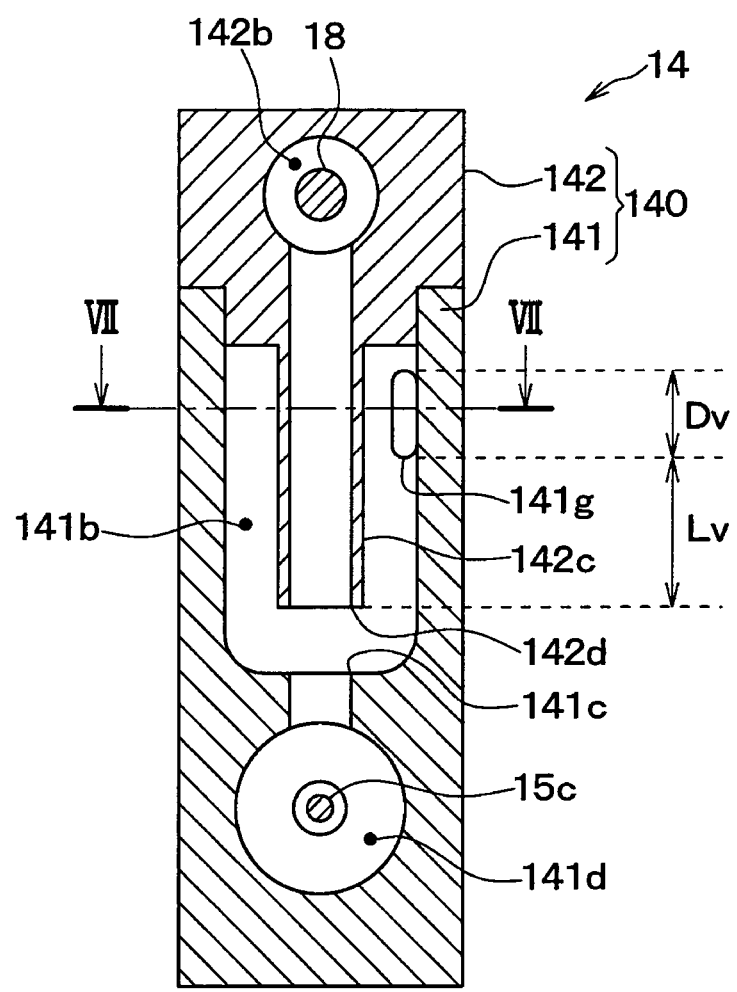
FIG. 6 is a cross-sectional view taken along a line VI-VI of FIG. 4.
Figure 7:
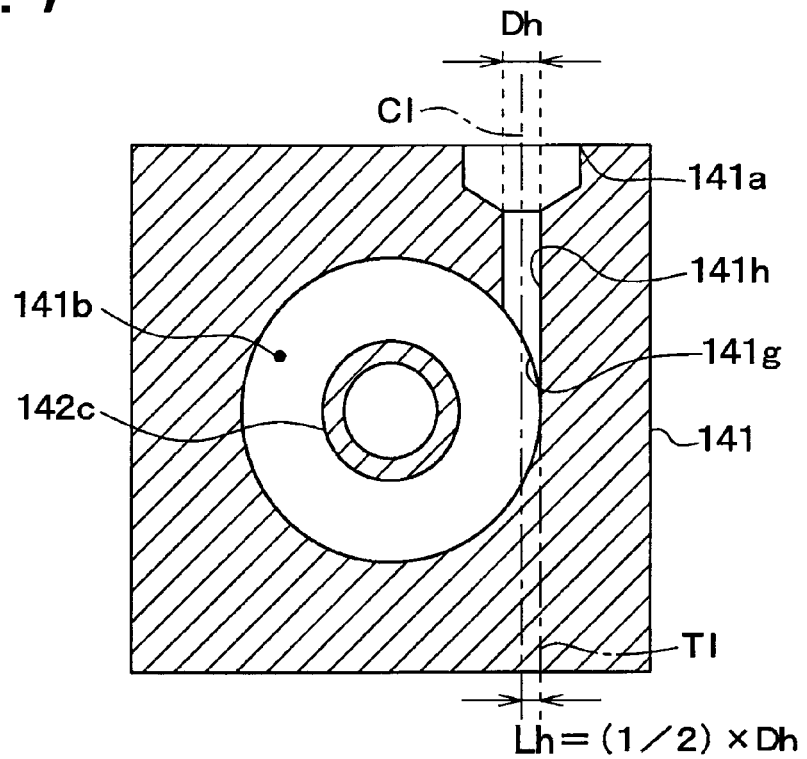
FIG. 7 is a cross-sectional view taken along a line VII-VII of FIG. 6.
Figure 8:
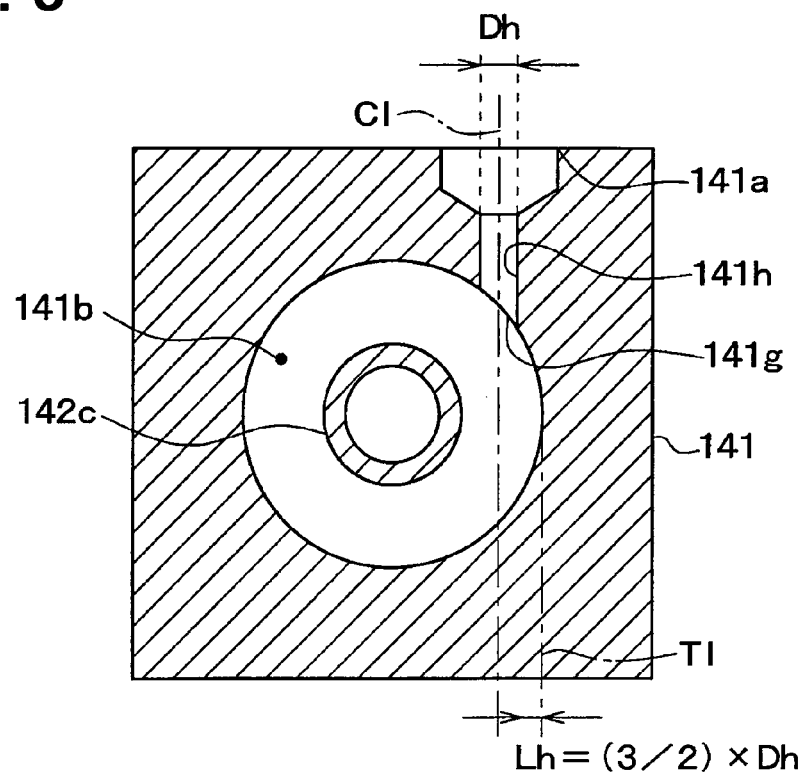
FIG. 8 is a cross-sectional view illustrating a locational modification of a refrigerant introducing passage.

A detail of the structure of the integration valve 14 will be described hereafter referring to FIGS. 4-8. FIGS. 4 and 5 are schematic cross-sectional views of the integration valve 14 of the first embodiment taken along a line extending in a top-bottom direction. FIG. 4 is the schematic cross-sectional view of the integration valve 14 in a condition where electric power is not supplied to a solenoid 16 which will be described below, and FIG. 5 is the schematic cross-sectional view of the integration valve 14 in a condition where electric power is supplied to the solenoid 16. Arrows showing an upper direction and a down direction in FIGS. 4 and 5 indicate the upper direction and the down direction in a state where the integration valve 14 is mounted in the vehicle air conditioner 1. FIG. 6 is a schematic cross-sectional view taken along a line VI-VI of FIG. 4, FIG. 7 is a schematic cross-sectional view taken along a line VII-VII of FIG. 6, and FIG. 8 is a view illustrating a locational modification of interior of the integration valve 14.

The integration valve 14 has a body 140 configuring an outer shell of the integration valve 14 and housing the vapor-phase refrigerant side valve member 18, the liquid-phase refrigerant side valve member 15, or the like therein. The body 140 includes a lower body 141 arranged generally lower side of the body 140 and an upper body 142 arranged and fixed upward of the lower body 141.

The lower body 141 is configured by a metal block body, which has a generally square tubular shape, and an axis direction of the metal block body extends in an up-down direction. The vapor-liquid separating space 141b is provided in the lower body 141. The vapor-liquid separating space 141b is configured to have a generally cylindrical shape, and an axis direction of the generally cylindrical shape extends in the up-down direction.

The refrigerant inlet port 141a, through which a refrigerant after flowing out of the high-stage-side expansion valve 13 is introduced to the vapor-liquid separating space 141b, is defined at an outer wall surface of the lower body 141.

A refrigerant introducing passage 141h, which introduces a refrigerant from the refrigerant inlet port 141a to the vapor-liquid separating space 141b, communicates with the vapor-liquid separating space 141b via a refrigerant introducing hole 141g.

As shown in the cross-sectional view of FIG. 7, the refrigerant introducing passage 141h of this embodiment extends in a tangential direction of a circle, which is a cross-sectional shape of an inner wall surface of the vapor-liquid separating space 141b, when being viewed in an axial direction of the vapor-liquid separating space 141b (i.e., in the up-down direction of this embodiment).

Therefore, the refrigerant introduced from the refrigerant inlet port 141a into the vapor-liquid separating space 141b turns and swirls along the inner wall surface of the vapor-liquid separating space 141b, which has the generally circle shape in cross section.

By an effect of centrifugal force produced by such a swirl flow, the refrigerant flowing in the vapor-liquid separating space 141b is separated into a vapor-phase refrigerant and a liquid-phase refrigerant, and the liquid-phase refrigerant moves downward of the vapor-liquid separating space 141b by an effect of gravity. In other words, the vapor-liquid separating space 141b configures a centrifugal vapor-liquid separating part.

A diameter of the vapor-liquid separating space 141b is set to be in a range, for example, from one and a half times to three times as long as a diameter of a refrigerant pipe connecting to the refrigerant inlet port 141a, so as to downsize the whole of the integration valve 14.

More specifically, an inner volume of the vapor-liquid separating space 141b of the present embodiment is set to be smaller than an excess refrigerant volume, which is a refrigerant volume after deducting a maximum required refrigerant volume from a sealed refrigerant volume. The maximum required refrigerant volume is in a liquid-phase state and is calculated from a required refrigerant volume required for the cycle to perform with a maximum capacity in the cycle. The sealed refrigerant volume is in a liquid-phase state and is converted from a refrigerant volume sealed in the cycle. In other words, the inner volume of the vapor-liquid separating space 141b of the present embodiment may not store an excess refrigerant substantially, even when a refrigerant volume circulating in the cycle is varied based on a load change.

As shown in a cross-sectional view of FIG. 6, the refrigerant introducing hole 141g of this embodiment is configured by an elongate hole extending in the axial direction of the vapor-liquid separating space 141b. In other words, a vertical dimension Dv of the refrigerant introducing hole 141g extending in the axial direction of the vapor-liquid separating space 141b is larger than a horizontal dimension Dh of the refrigerant introducing hole 141g extending in a direction perpendicular to the tangential direction of the vapor-liquid separating space 141b (Dv>Dh).

Therefore, when a refrigerant introduced to the vapor-liquid separating space 141b swirls in the vapor-liquid separating space 141b, a main flow of the refrigerant gyrates along a radial-outer wall of the vapor-liquid separating space 141b without spreading radial-inward of the vapor-liquid separating space 141b. Thus, centrifugal force can act effectively to the refrigerant flowing into the vapor-liquid separating space 141b, and a vapor-liquid separating efficiency in the integration valve 14 can be improved.

Furthermore, the refrigerant introducing hole 141g opens at a position where is far from one end (i.e., a lower end) of the separated vapor-phase refrigerant outlet pipe 142c in a longitudinal direction and is closer to the other end (i.e., an upper end) of the separated vapor-phase refrigerant outlet pipe 142c in the longitudinal direction.

A distance Lv from a lower end of the refrigerant introducing hole 141g to the one end (i.e., the lower end) of the separated vapor-phase refrigerant outlet pipe 142c is determined based on the vertical dimension Dv of the refrigerant introducing hole 141g. Specifically, the distance Lv from the lower end of the refrigerant introducing hole 141g to the one end (i.e., the lower end) of the separated vapor-phase refrigerant outlet pipe 142c is determined to be larger than a half of the vertical dimension Dv of the refrigerant introducing hole 141g as shown in a formula F1 below.

$$Lv \leq (1/2) \times Dv \tag{F1}$$

A location of the lower end of the refrigerant introducing hole 141g corresponds to an end portion at the one end side of the separated vapor-phase refrigerant outlet pipe 142c, which will be described later.

As described above, when the distance Lv from an end location of the refrigerant introducing hole 141g to the one end of the separated vapor-phase refrigerant outlet pipe 142c is set to satisfy the formula F1, an entrance length, in which the refrigerant swirls sufficiently in the vapor-liquid separating space 141b, can be kept. Therefore, a vapor-liquid separating efficiency in the integration valve 14 can be improved.

A distance Lh between a center line Cl of the refrigerant introducing passage 141h and a tangent line Tl of the vapor-liquid separating space 141b at a radial-outer wall surface, which is parallel with the center line Cl is determined based on the horizontal dimension Dh of the refrigerant introducing hole 141g. Specifically, the distance Lh between the center line Cl and the tangent line Tl is determined to be longer than a half of the horizontal dimension Dh of the refrigerant introducing hole 141g and shorter than one and a half of the horizontal dimension Dh of the refrigerant introducing hole 141g, as shown with a formula F2.

$$(1/2) \times Dh \leq Lh \leq (3/2) \times Dh \tag{F2}$$

FIG. 7 is a cross-sectional view taken along a line VII-VII of FIG. 6 in a condition where the distance Lh between the center line Cl and the tangent line Tl is equal to a half of the horizontal dimension Dh of the refrigerant introducing hole 141g. FIG. 8 is a cross-sectional view taken along the line VII-VII of FIG. 6 in a condition where the distance Lh between the center line Cl and the tangent line Tl is equal to one and a half of the horizontal dimension Dh of the refrigerant introducing hole 141g.

Because the distance Lh between the center line Cl and the tangent line Tl is set to satisfy the formula F2, the refrigerant can receive great centrifugal force, when the refrigerant flowing into the vapor-liquid separating space 141b swirls along the radial-outer wall surface of the vapor-liquid separating space 141b. Therefore, a vapor-liquid separating efficiency in the integration valve 14 can be improved.

A lowest part of the vapor-liquid separating space 141b of the lower body 141 has a separated liquid-phase refrigerant outlet hole 141c through which separated liquid-phase refrigerant flows to a side of a liquid-phase refrigerant passage 141d. The liquid-phase refrigerant passage 141d is a passage arranged downward of the vapor-liquid separating space 141b and introduces liquid-phase refrigerant separated in the vapor-liquid separating space 141b to a side of the liquid-phase refrigerant outlet port 141e through which the liquid-phase refrigerant flows to outside of the integration valve 14.

More specifically, the liquid-phase refrigerant passage 141d is provided by a communication hole portion which extends in a direction perpendicular to the axial direction of the vapor-liquid separating space 141b (i.e., a horizontal direction in the present embodiment). The communication hole portion has a generally discoid shape in cross section and passes a central part of the lower body 141 to penetrate through a sidewall of the lower body 141 at two parts of the sidewall opposing to each other.

Therefore, the liquid-phase refrigerant passage 141d extends to be perpendicular to the axial direction of the vapor-liquid separating space 141b. A flow direction of refrigerant flowing from the separated liquid-phase refrigerant outlet hole 141c to the liquid-phase refrigerant passage 141d is changed about at a right angle, and the refrigerant flows into the side of the liquid-phase refrigerant outlet port 141e and a side of the fixed throttle 17. One opening of the communication hole portion provides the liquid-phase refrigerant outlet hole 141e.

In the liquid-phase refrigerant passage 141d, a liquid-phase refrigerant side valve member 15, a spring (i.e., an elastic part) 15a, or the like are disposed. The liquid-phase refrigerant side valve member 15 opens or closes the liquid-phase refrigerant passage 141d. The spring 15a is configured by a coil spring applying a load to the liquid-phase refrigerant side valve member 15 toward a side closing the liquid-phase refrigerant passage 141d.

The spring 15a applies a load to the liquid-phase refrigerant side valve member 15 so that a sealing portion 15b, which is made of resin, has an annular shape, and located at a tip part of the liquid-phase refrigerant side valve member 15, is pressed against a valve seat 141f configured in the liquid-phase refrigerant passage 141d, so as to increase a sealing property. The valve seat 141f is formed to have an annular shape so as to fit to the sealing portion 15b.

Further, the liquid-phase refrigerant side valve member 15 is connected to a movable part (e.g., an armature) of a solenoid actuator 16 via a shaft 15c. The solenoid actuator 16 is referred to as just a solenoid 16 hereinafter. The solenoid 16 is an electromagnetic mechanism producing electromagnetic force by applying electric power to move the movable part. An operation of the solenoid 16 is controlled based on control voltage output by the air conditioning controller 40.

According to the present embodiment, when the air conditioning controller 40 applies electric power to the solenoid 16, a load is applied to the liquid-phase refrigerant side valve member 15 via the shaft 15c so as to open the liquid-phase refrigerant passage 141d, based on electromagnetic force applied to the movable part. When the load due to the electromagnetic force exceeds a load provided by the spring 15a, the liquid-phase refrigerant side valve member 15 is moved to open the liquid-phase refrigerant passage 141d, as shown in FIG. 5.

That is, the solenoid 16, the liquid-phase refrigerant side valve member 15, the valve seat 141f of the liquid-phase refrigerant passage 141d, or the like of the present embodiment configure a normal close-type solenoid valve. The solenoid 16 functions as a sealing portion sealing the other opening of the communication hole portion providing the liquid-phase refrigerant passage 141d.

The fixed throttle 17 is configured in the lower body 141. The fixed throttle 17 decompresses liquid-phase refrigerant separated in the vapor-liquid separating space 141b and introduces the decompressed liquid-phase refrigerant to flow to the side of the liquid-phase refrigerant outlet port 141e, when the liquid-phase refrigerant side valve member 15 closes the liquid-phase refrigerant passage 141d. More specifically, the fixed throttle 17 is arranged in parallel with a refrigerant passage provided inside of the valve seat 141f.

A nozzle or an orifice of which opening degree is fixed can be used as the fixed throttle 17. In a fixed throttle such as the nozzle and the orifice, aperture passage area is drastically decreased or increased. Therefore, a flow amount of a refrigerant passing through the fixed throttle and a quality of a refrigerant on an upstream side of the fixed throttle can be self-controlled (i.e., balanced) in accordance with a pressure difference between an upstream side and a downstream side (i.e., a pressure difference between an inlet port and an outlet port).

Specifically, when the pressure difference between the upstream side and the downstream side is relatively large, the quality of the refrigerant on the upstream side of the fixed throttle 17 is balanced to be large as a required flow amount of a circulating refrigerant, which is a required flow amount circulating in a cycle, decreases. On the other hand, when the pressure difference is relatively small, the quality of the refrigerant on the upstream side of the fixed throttle 17 is balanced to be small as the required flow amount of the circulating refrigerant increases.

However, when the quality of the refrigerant on the upstream side of the fixed throttle 17 is large, and when an exterior heat exchanger 20 works as an evaporator, a coefficient of performance (COP) of the cycle is slipped while a heat absorb amount (i.e., a refrigeration capacity) of a refrigerant at the exterior heat exchanger 20 is decreased. According to this embodiment, even if the required flow amount of the circulating refrigerant is changed by variation of a load change in a heating operation mode (i.e., a first heating mode), a quality X of the refrigerant on the upstream side of the fixed throttle 17 is smaller than or equal to 0.1 so that the COP is restricted from reducing.

In other words, the fixed throttle 17 of the present embodiment is adapted such that the quality of the refrigerant on the upstream side of the fixed throttle 17 is self-controlled to be smaller than or equal to 0.1 even if the flow amount of the circulating refrigerant and the pressure difference between the inlet port and the outlet port of the fixed throttle changes in a range in which a load change is considered to be caused in the heat pump cycle 10.

Refrigerant is separated into liquid-phase refrigerant and vapor-phase refrigerant in the vapor-liquid separating space 141b. However, refrigerant flowing from the separated liquid-phase refrigerant outlet hole 141c is in a state where liquid-phase refrigerant and vapor-phase refrigerant are mixed, since a part of separated vapor-phase refrigerant is mixed with liquid-phase refrigerant. When vapor-phase refrigerant is mixed with liquid-phase refrigerant, a decompression characteristic of the fixed throttle 17 may be destabilized.

Whereas, according to the present embodiment, a flow direction of refrigerant flowing from the separated liquid-phase refrigerant outlet hole 141c to the liquid-phase refrigerant passage 141d is changed about at a right angle. Therefore, the decompression characteristic of the fixed throttle 17 can be stabilized even if vapor-phase refrigerant is mixed with liquid-phase refrigerant flowing in the liquid-phase refrigerant passage 141d.

Figure 9:
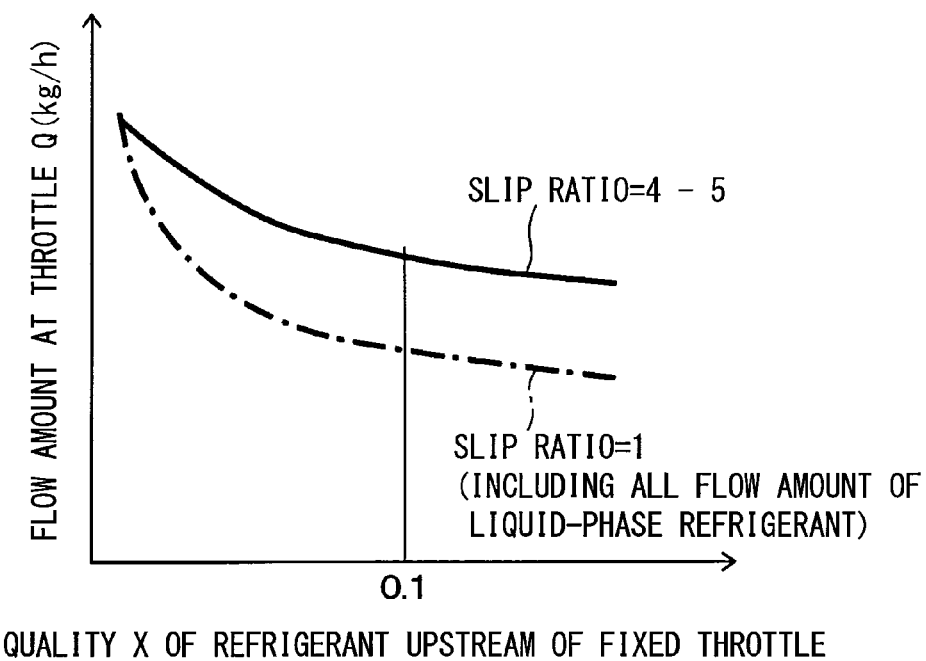
FIG. 9 is a graph showing flow characteristics of a fixed throttle according to the first embodiment.

The decompression characteristic described above will be described with reference to FIG. 9. FIG. 9 is a flow characteristic chart (i.e., a throttle characteristic chart) of the fixed throttle 17, and shows variation of a flow amount Q at the fixed throttle 17 relative to a quality X of refrigerant upstream of the fixed throttle 17 in the heating operation mode (i.e., the first heating mode). The flow amount Q is a flow amount (i.e., a mass flow rate) of refrigerant flowing through the fixed throttle 17.

As described above, in the heat pump cycle 10 of the present embodiment, it is preferable that the quality X of the refrigerant on the upstream side of the fixed throttle 17 is smaller than or equal to 0.1 even when an operation condition of the cycle is changed. The reason is that COP is slipped due to decrease of an absorbed heat amount at a heat exchanger working as an evaporator when the quality X is increased. The absorbed heat amount is, in other words, a difference between an enthalpy of refrigerant at outlet side of the heat exchanger and an enthalpy of refrigerant at an inlet side of the heat exchanger.

The flow characteristic of the fixed throttle 17 may be required that a gain (i.e., a rate of increase of the flow amount Q due to decrease of the quality X) is relatively large so as to keep the quality X of refrigerant upstream of the fixed throttle 17 being smaller than or equal to 0.1. That is, preferably, a change of the quality X is required to be smaller than a change of the flow amount Q in the flow characteristic.

It is obvious from FIG. 9 that refrigerant flowing into the liquid-phase refrigerant passage 141d is in the state where vapor-phase refrigerant and liquid-phase refrigerant are mixed. Therefore, when a ratio of a flow speed of liquid-phase refrigerant to a flow speed of vapor-phase refrigerant is generally high, the gain is decreased, and the flow amount Q is increased. The ratio of a flow speed of liquid-phase refrigerant to a flow speed of vapor-phase refrigerant is hereinafter referred to as a slip ratio, and the slip ratio is defined as the flow speed of vapor-phase refrigerant divided by the flow speed of liquid-phase refrigerant.

According to the present embodiment, the flow direction of refrigerant flowing from the separated liquid-phase refrigerant outlet hole 141c to the liquid-phase refrigerant passage 141d is changed at generally a right angle. In other words, a flow direction of refrigerant flowing out of the separated liquid-phase refrigerant outlet hole 141c is different from a flow direction of refrigerant flowing through the liquid-phase refrigerant passage 141d. Therefore, mixing of vapor-phase refrigerant and liquid-phase refrigerant is promoted, and the slip ratio can be stabilized in a low value.

Since the decompression characteristic of the fixed throttle 17 can be stabilized, the gain can be made large by stabilizing the slip ratio at a low value. Therefore, the quality X at the fixed throttle 17 is self-controlled sufficiently.

Moreover, according to the present embodiment, the vapor-liquid separating space 141b, the liquid-phase refrigerant passage 141d, and the fixed throttle 17 are integrally configured in the lower body 141. In this case, a heat-transferring amount of refrigerant passing through the liquid-phase refrigerant passage 141d from outside can be decreased as compared to a case where a refrigerant passage connecting the separated liquid-phase refrigerant outlet hole 141c of the vapor-liquid separating space 141b and the fixed throttle 17 is separately provided by a pipe.

Figure 10:
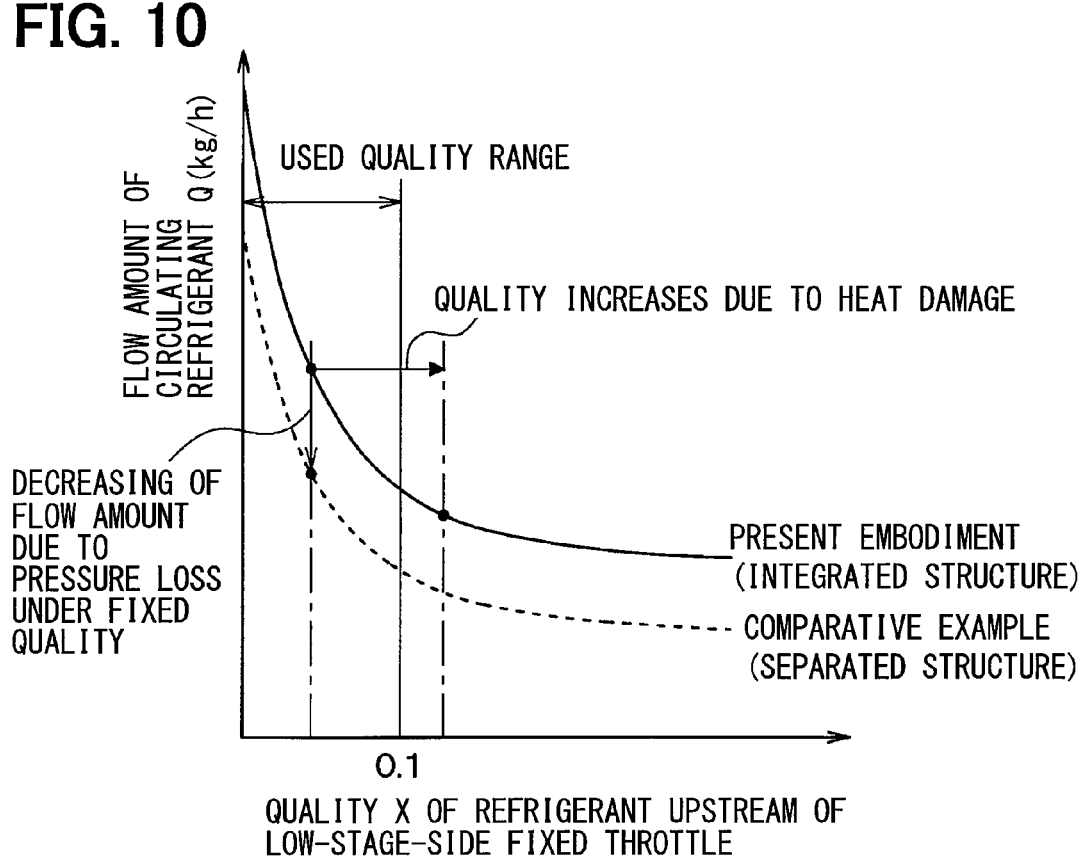
FIG. 10 is a graph showing how heat damage impacts a flow characteristic of the fixed throttle according to the first embodiment.

Therefore, a phenomenon, which will be referred to as a heat damage hereafter, that the refrigerant passing through the liquid-phase refrigerant passage 141d is boiled and vaporize by heat from outside of the integration valve 14 can be reduced. This point will be described referring to FIG. 10. FIG. 10 is a flow characteristic chart (i.e., a throttle characteristic chart) showing an influence of the heat damage in a condition that the pressure difference between a refrigerant pressure on the upstream side of the fixed throttle 17 and a refrigerant pressure on the downstream side of the fixed throttle 17 is fixed.

As seen in FIG. 10, a flow amount Q of refrigerant passing through the fixed throttle 17 is decreased when a quality X of the refrigerant upstream of the fixed throttle 17 is increased by the heat damage. Further, when a density of a refrigerant passing through the liquid-phase refrigerant passage 141d is decreased by the heat damage, the flow amount Q is decreased even if the quality X is fixed, because a pressure loss is increased while a refrigerant passes through the liquid-phase refrigerant passage 141d.

According to the present embodiment, the vapor-liquid separating space 141b, the liquid-phase refrigerant passage 141d, and the fixed throttle 17 are integrally configured in the lower body 141. Therefore, increase of the quality X and increase of the pressure loss caused by the heat damage are restricted, and the flow amount Q at the fixed throttle 17 can be effectively restricted from decreasing.

In the present embodiment, a pressure loss, which is caused due to refrigerant passing through the liquid-phase refrigerant passage 141d in a state where the liquid-phase refrigerant side valve member 15 opens the liquid-phase refrigerant passage 141d, is extremely small, with respect to a pressure loss caused due to refrigerant passing through the fixed throttle 17. Therefore, refrigerant bypasses the fixed throttle 17 and flows out of the integration valve 14 from the liquid-phase refrigerant outlet port 141e via a refrigerant passage provided at an inner periphery side of the valve seat 141f, in a state where the liquid-phase refrigerant side valve member 15 opens the liquid-phase refrigerant passage 141d.

The upper body 142 is configured by a metal block having a generally rectangular tube shape, and an outer diameter of the metal block is generally the same as an outer diameter of the lower body 141. The upper body 142 includes a vapor-phase refrigerant passage 142b, the separated vapor-phase refrigerant outlet pipe 142c, or the like. The vapor-phase refrigerant passage 142b guides vapor-phase refrigerant separated in the vapor-liquid separating space 141b to flow to a side of the vapor-phase refrigerant outlet port 142a. The vapor-phase refrigerant flows out of the integration valve 14 via the vapor-phase refrigerant outlet port 142a. The vapor-liquid separating space 141b and the vapor-phase refrigerant passage 142b communicate with each other via the separated vapor-phase refrigerant outlet pipe 142c.

The separated vapor-phase refrigerant outlet pipe 142c has a round tubular shape and is arranged to be coaxial with the vapor-liquid separating space 141b when the lower body 141 and the upper body 142 are integrated. Accordingly, refrigerant flowing into the vapor-liquid separating space 141b swirls around the separated vapor-phase refrigerant outlet pipe 142c.

Further, the separated vapor-phase refrigerant outlet pipe 142c extends so that a lowermost end of the separated vapor-phase refrigerant outlet pipe 142c is located in the vapor-liquid separating space 141b. A separated vapor-phase refrigerant outlet hole 142d is provided at the lowermost end of the separated vapor-phase refrigerant outlet pipe 142c. Vapor-phase refrigerant separated in the vapor-liquid separating space 141b flows out of the vapor-liquid separating space 141b through the separated vapor-phase refrigerant outlet hole 142d. Therefore, the liquid-phase refrigerant passage 141d and the fixed throttle 17 are arranged downward of the separated vapor-phase refrigerant outlet hole 142d.

The vapor-phase refrigerant passage 142b is arranged upward of the vapor-liquid separating space 141b and the separated vapor-phase refrigerant outlet pipe 142c. Similarly to the liquid-phase refrigerant passage 141d, the vapor-phase refrigerant passage 142b is provided by a communication hole portion extending in a direction (i.e., the horizontal direction in the present embodiment) perpendicular to the axial direction of the vapor-liquid separating space 141b. The communication hole portion has a discoid shape in cross section and is provided so as to pass the central part of the upper body 142 and penetrate through sidewalls of the upper body 142 opposing to each other in the thickness direction of the sidewalls.

An opening of the communication hole portion at one end side provides the vapor-phase refrigerant outlet port 142a. The vapor-phase refrigerant side valve member 18 is disposed in the vapor-phase refrigerant passage 142b and opens or closes the vapor-phase refrigerant passage 142b. The vapor-phase refrigerant side valve member 18 is configured by a differential pressure regulating valve moved by a pressure difference between a refrigerant pressure at a side of the liquid-phase refrigerant outlet port 141e and a refrigerant pressure at a side of the vapor-phase refrigerant passage 142b.

Specifically, the communication hole portion for providing the vapor-phase refrigerant passage 142b is partitioned by a body part 18a of the vapor-phase refrigerant side valve member 18 so as to have a space at a side of the vapor-phase refrigerant passage 142b and a space at a space providing a backpressure space 142e. Refrigerant at a side of the liquid-phase refrigerant outlet port 141e is guided to flow into the backpressure space 142e via a pressure inlet passage 19.

The body part 18a has a cylindrical shape. One bottom end surface of the body part 18a at one end in an axial direction of the body part 18a (i.e., at a side of the vapor-phase refrigerant outlet port 142a side) receives a pressure of refrigerant at a side of the vapor-phase refrigerant outlet port 142a. The other end surface of the body part 18a at the other end in the axial direction of the body part 18a receives a refrigerant pressure at a side of the backpressure space 142e. Further, an outside diameter of the body part 18a is slightly shorter than an inside diameter of the vapor-phase refrigerant passage 142b so as to be loosely fitted to each other. Accordingly, the vapor-phase refrigerant side valve member 18 can be movable in the vapor-phase refrigerant passage 142b.

The pressure inlet passage 19 is provided by a communication passage portion. The communication passage portion is provided at both of the lower body 141 and the upper body 142 when the lower body 141 and the upper body 142 are integrated. The pressure inlet passage 19 is arranged so that a longitudinal direction of the pressure inlet passage 19 is parallel with the axial direction of the vapor-liquid separating space 141b and an axial direction of the separated vapor-phase refrigerant outlet pipe 142c. Accordingly, a passage structure of the pressure inlet passage 19 is simplified so as to the whole of the integration valve 14 is downsized.

The backpressure space 142e has a spring (i.e., an elastic member) 18b and a stopper (i.e., a regulating member) 18c therein. The spring 18b applies a load to the vapor-phase refrigerant side valve member 18 to close the vapor-phase refrigerant passage 142b. The stopper 18c regulates movement of the vapor-phase refrigerant side valve member 18 when the vapor-phase refrigerant valve member 18 opens the vapor-phase refrigerant passage 142b.

The spring 18b applies a load to the vapor-phase refrigerant side valve member 18 in a direction increasing a sealing characteristic produced by pressing a sealing portion 18d to a valve seat 142f, in other words, in a direction closing the vapor-phase refrigerant passage 142b. The sealing portion 18d is configured by an O-ring arranged at a tip part of the vapor-phase refrigerant side valve member 18. The valve seat 142f has a tapered shape and is configured in the vapor-phase refrigerant passage 142b.

The stopper 18c regulates movement of the vapor-phase refrigerant side valve member 18 and functions as (i) the regulating member restricting the body part 18a of the vapor-phase refrigerant side valve member 18 from closing the pressure inlet passage 19 and (ii) a sealing member sealing an opening of the communication hole portion providing the vapor-phase refrigerant passage 142b at the other end of the communication hole portion.

Figure 11A:
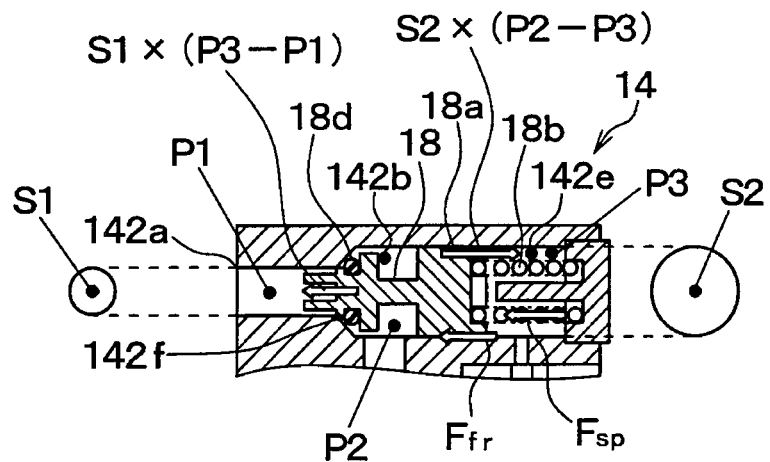
FIG. 11A is an explanatory view illustrating a state where a vapor-phase refrigerant side valve member starts opening.
Figure 11B:
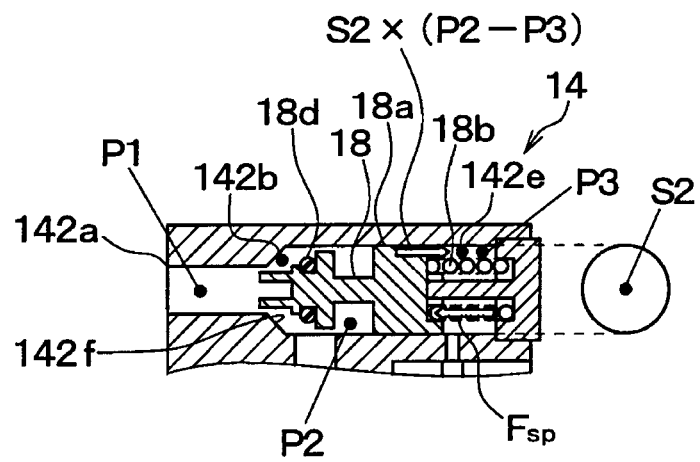
FIG. 11B is an explanatory view illustrating a state where the vapor-phase refrigerant side valve member is kept opening.

An operation of the vapor-phase refrigerant side valve member 18 will be described referring to FIGS. 11A and 11B. FIGS. 11A and 11B are enlarged views illustrating the vapor-phase refrigerant side valve member 18 and around thereof. FIG. 11A shows a state of the vapor-phase refrigerant side valve member 18 to start opening, and FIG. 11B shows a state of the vapor-phase refrigerant side valve member 18 to keep opening.

When electric force is supplied to the solenoid 16, (i) a refrigerant pressure P2 (shown by a point P2 in FIG. 5) inside the vapor-phase refrigerant passage 142b becomes a refrigerant pressure of vapor-phase refrigerant separated in the vapor-liquid separating space 141b, and (ii) a refrigerant pressure P3 (shown by a point P3 in FIG. 5) at a side of the liquid-phase refrigerant outlet port 141e (i.e., inside the backpressure space 142e) becomes a pressure of liquid-phase refrigerant separated in the vapor-liquid separating space 141b.

Therefore, the refrigerant pressure P2 at the side of the vapor-phase refrigerant passage 142b is generally equal to the refrigerant pressure P3 at the side of the liquid-phase refrigerant outlet port 141e (i.e., a refrigerant pressure inside the backpressure space 142e). Accordingly, when electric force is supplied to the solenoid 16, the vapor-phase refrigerant side valve member 18 closes the vapor-phase refrigerant passage 142b using a load Fsp applied by the spring 18b.

As shown in FIGS. 1-3, the intermediate pressure port 11b of the compressor 11 is connected to the vapor-phase refrigerant outlet port 142a of the integration valve 14. Accordingly, when the vapor-phase refrigerant side valve member 18 closes the vapor-phase refrigerant passage 142b, the refrigerant pressure P2 at the side of the vapor-phase refrigerant 142a becomes a suction pressure of the compressor 11. Therefore, the refrigerant pressure P2 and the refrigerant pressure P3 in FIG. 5 satisfy P1<P2.

Accordingly, when the vapor-phase refrigerant side valve member 18 closes the vapor-phase refrigerant passage 142b during an operation of the compressor 11, the vapor-phase refrigerant passage 142b is kept closing until electric power supplied to the solenoid 16 is stopped, even when the refrigerant pressure P2 in the vapor-phase refrigerant passage 142b and the refrigerant pressure P3 at the side of the liquid-phase refrigerant outlet port 141e are changed in some degree.

When the supply of electric force to the solenoid 16 is stopped, (i) a refrigerant pressure P1 (shown by a point P1 in FIG. 11A) at a side of the vapor-phase refrigerant outlet port 142a becomes a refrigerant pressure at a side of the intermediate pressure port 11b of the compressor 11, (ii) a refrigerant pressure P2 (shown by a point P2 in FIG. 11A) in the vapor-phase refrigerant passage 142b becomes an intermediate pressure decompressed at the high-stage side expansion valve 13, and (iii) a refrigerant pressure P3 (shown by a point P3 in FIG. 11A) at a side of the liquid-phase refrigerant outlet port 141e (i.e., a refrigerant pressure in the backpressure space 142e) becomes a pressure after being decompressed at the fixed throttle 17.

Because a pressure difference between the refrigerant pressure P2 in the vapor-phase refrigerant passage 142b and the refrigerant pressure P3 at the side of the liquid-phase refrigerant outlet port 141e is increased and satisfies a formula F3 shown below, the vapor-phase refrigerant side valve member 18 starts to open the vapor-phase refrigerant passage 142b.

$$S2 \times (P2-P3) > S1 \times (P3-P1) + Fsp + Ffr \quad (F3)$$

S1 is an area of the vapor-phase refrigerant outlet port 142a projected to the vapor-phase refrigerant side valve member 18 in the axial direction of the vapor-phase refrigerant side valve member 18. S2 is a cross-sectional area of the body part 18a of the vapor-phase refrigerant side valve member 18, taken in a section perpendicular to the axial direction of the vapor-phase refrigerant side valve member 18. Ffr is a friction force (i.e., a friction) when the vapor-phase refrigerant side valve member 18 moves.

When the vapor-phase refrigerant side valve member 18 opens the vapor-phase refrigerant passage 142b, (i) a refrigerant pressure P1 (shown by a point P1 in FIG. 11B) at a side of the vapor-phase refrigerant outlet port 142a and a refrigerant pressure P2 (shown by a point P2 in FIG. 11B) in the vapor-phase refrigerant passage 142b becomes a pressure of vapor-phase refrigerant separated in the vapor-liquid separating space 141b, and (ii) a refrigerant pressure P3 (shown by a point P3 in FIG. 11B) at a side of the liquid-phase refrigerant outlet port 141e (i.e., in the backpressure space 142e) becomes a pressure after being decompressed at the fixed throttle 17.

Because the refrigerant pressure P3 in the backpressure space 142e is lower than the refrigerant pressure P2 in the vapor-phase refrigerant passage 142b, and a formula F4 shown below is satisfied, the vapor-phase refrigerant side valve member 18 keeps the vapor-phase refrigerant passage 142b to be open.

$$S2 \times (P2-P3) > Fsp \quad (F4)$$

In a refrigerant pipe extending from the vapor-phase refrigerant outlet port 142a of the integration valve 14 to the intermediate pressure port 11b of the compressor 11, a check valve (not shown), which allows refrigerant to flow only from the integration valve 14 to the intermediate pressure port 11b of the compressor 11, is disposed. Accordingly, refrigerant is restricted from flowing back from a side of the compressor 11 to a side of the integration valve 14. It should be noted that the check valve may be configured integrally with the integration valve 14 or the compressor 11.

As shown in FIGS. 1-3, a refrigerant inlet side of the exterior heat exchanger 20 is connected to the liquid-phase refrigerant outlet port 141e of the integration valve 14. the exterior heat exchanger 20 is located in a bonnet, and refrigerant flowing thorough the exterior heat exchanger 20 exchanges heat with outside air blown by a blowing fan 21. The exterior heat exchanger 20 functions as an evaporator evaporating low-pressure refrigerant to perform a heat absorption action at least in the heating operation mode (e.g., the first heating mode and the second heating mode), and functions as a radiator at which high-pressure refrigerant radiates heat in the cooling operation mode or the like.

A refrigerant inlet side of a cooling expansion valve 22 as a second decompressor is connected to a refrigerant outlet side of the external heat exchanger 20. The cooling expansion valve 22 decompresses refrigerant flowing out of the external heat exchanger 20 and flowing into the interior evaporator 23 in the cooling operation mode or the like. A basic structure of the cooling expansion valve 22 is generally the same as the high-stage side expansion valve 13, and operation of the cooling expansion valve 22 is controlled by a control signal output from the air conditioning controller 40.

A refrigerant inlet side of the interior evaporator 23 is connected to an outlet side of the cooling expansion valve 22. In the air conditioning case 31 of the interior air conditioning unit 30, the interior evaporator 23 is arranged upstream of the interior condenser 12 in a flow direction of air to be blown into a passenger compartment. The interior evaporator 23 evaporates refrigerant flowing therein to perform heat absorption action in the cooling operation mode, and dehumidification and heating operation mode, or the like. The interior evaporator 23 is a heat exchanger functioning as an evaporator (i.e., a second using-side heat exchanger) cooling air to be blown into the passenger compartment.

An inlet side of the accumulator 24 is connected to an outlet side of the interior evaporator 23. The accumulator 24 is a low-pressure side vapor-liquid separator, which separates refrigerant flowing in the accumulator 24 into vapor-phase refrigerant and liquid-phase refrigerant and which stores excess refrigerant therein. Further, the suction port 11a of the compressor 11 is connected to a vapor-phase refrigerant outlet of the accumulator 24. Therefore, the interior evaporator 23 is connected so that refrigerant flows toward a side of the suction port 11a of the compressor 11.

Moreover, an expansion-valve bypass passage 25 is connected to the refrigerant outlet side of the external heat exchanger. The expansion-valve bypass passage 25 guides refrigerant flowing out of the exterior heat exchanger 20 to bypass the cooling expansion valve 22 and the interior evaporator 23 and to flow to the inlet side of the accumulator 24. A bypass-passage switching valve 27 is disposed in the expansion-valve bypass passage 25.

The bypass-passage switching valve 27 is a solenoid valve closing or opening the expansion-valve bypass passage 25, and switching operation of the bypass-passage switching valve 27 is controlled by a control voltage output from the air conditioning controller 40. A pressure loss caused when refrigerant flows through the bypass-passage switching valve 27 is extremely small with respect to a pressure loss caused when refrigerant flows through the cooling expansion valve 22.

Therefore, refrigerant flowing out of the exterior heat exchanger flows into the accumulator 24 via the expansion-valve bypass passage 25 when the bypass-passage switching valve 27 is open. In this case, an opening degree of the cooling expansion valve 22 may be fully closed.

When the bypass-passage switching valve 27 is closed, refrigerant flows into the interior evaporator 23 via the cooling expansion valve 22. Accordingly, the bypass-passage switching valve 27 can switch refrigerant cycles of the heat pump cycle 10. Therefore, the bypass-passage switching valve 27 of the present embodiment configures the refrigerant cycle switching part, together with the integration valve 14.

The interior air conditioning unit 30 will be described below. The interior air conditioning unit 30 is disposed inside an instrument board (i.e., a dash panel) located at forefront part of a passenger compartment and has the air conditioning case 31 therein. The air conditioning case 31 provides an outer shell of the interior air conditioning unit 30 and has an air passage, in which air blown toward the passenger compartment flows. A blower 32, the interior condenser 12, the interior evaporator 23, or the like are disposed in the air passage.

An inside air/outside air switching device 33 switches intake air between inside air (i.e., air inside the passenger compartment) and outside air is arranged at a most upstream side in a flow direction of air in the air conditioning case 31. The inside air/outside air switching device 33 continuously regulates (i) an opening area of an inside air intake port introducing inside air into the air conditioning case 31 and (ii) an opening area of an outside air intake port introducing outside air into the air conditioning case 31 by using an inside air/outside air switching door so that an air volume ratio of inside air volume to outside air volume is continuously changed.

The blower 32, which blows air drawn via the inside air/outside air switching device 33 toward the passenger compartment, is arranged downstream of the inside air/outside air switching device 33 in the flow direction of air. The blower 32 is an electric blower, in which a centrifugal multiblade blower (i.e., a sirocco fan) is operated by an electric motor, and a rotating speed (i.e., a blowing air volume) is controlled based on a control voltage output from the air conditioning controller 40.

The interior evaporator 23 and the interior condenser 12 are disposed on a downstream side of the blower 32 in the flow direction of air in this order of the interior evaporator 23 and the interior condenser 12. In other words, the interior evaporator 23 is located at an upstream side of the interior condenser 12 in the flow direction of air.

In the air conditioning case 31, a bypass passage 35 guiding blowing air after passing the interior evaporator 23 to bypass the interior condenser 12 is disposed, and an air mix door 34 is arranged on a downstream side of the interior evaporator 23 and on an upstream side of the interior condenser 12 in the flow direction of air.

The air mix door 34 of the present embodiment is a flow amount regulator regulating a flow amount (i.e., an air volume) of blowing air blown into the interior condenser 12 so that a ratio of an air volume of blowing air passing on a side of the interior condenser 12 to an air volume of blowing air passing through the bypass passage 35 is regulated after blowing air passes through the interior evaporator 23. The air mix door 34 functions as a regulator regulating a heat exchanging ability of the interior condenser 12.

A mixing space 36 is provided at a downstream side of the interior condenser 12 and the bypass passage 35 in the flow direction of air. In the mixing space 36, blowing air heated by exchanging heat with refrigerant at the interior condenser 12 is mixed with blowing air passing through the bypass passage 35 without being heated.

Openings are located most downstream of the air conditioning case 31 in the flow direction of air so that blowing air mixed in the mixing space 36 is blown to the passenger compartment that is a space to be cooled. Specifically, (i) a defroster opening 37a blowing conditioned air toward inside surface of a windshield of a vehicle, (ii) a face opening 37b blowing conditioned air toward an upper body of an occupant in the passenger compartment, and (iii) a foot opening 37c blowing conditioned air toward foot of an occupant in the passenger compartment are provided as the opening.

Therefore, the air mix door 34 regulates the ratio of an air volume of blowing air passing on a side of the interior condenser 12 to an air volume of blowing air passing through the bypass passage 35 such that temperature of air in the mixing space 36 is regulated. The air mix door 34 is operated by a servo motor (not shown), and an operation of the servo motor is controlled based on control signals output from the air conditioning controller 40.

Moreover, a defroster door 38a regulating an opening area of the defroster opening 37a, a face door 38b regulating an opening area of the face opening 37b, and a foot door 38c regulating an opening area of the foot door 38c are located upstream of the defroster opening 37a, the face opening 37b, and the foot opening 37c, respectively.

The defroster door 38a, the face door 38b, and the foot door 38c configure outlet mode switching parts for opening or closing the openings 37a-37c and are controlled by a servo motor (not shown), which is operated based on control signals output from the air conditioning controller 40, via a link mechanics or the like.

A face outlet, a foot outlet, and a defroster outlet disposed in the passenger compartment are connected to a downstream side of the defroster opening 37a, the face opening 37b, and the foot opening 37c, respectively, in the flow direction of air via a duct providing an air passage.

The outlet mode is, for example, (i) a face mode in which the face opening 37b is fully open to blow air toward an upper body of an occupant via the face outlet, (ii) a bi-level mode in which both of the face opening 37b and the foot opening 37c are open to blow air toward an upper body and foot of an occupant, and (iii) a foot mode in which the foot opening 37c is fully open and the defroster opening 37a is open in a small degree to mainly blow air from the foot outlet.

An electric control device of the present embodiment will be described. The air conditioning controller 40 is configured from a well-known microcomputer including CPU, ROM, RAM, or the like and a peripheral circuit, and performs a variety of arithmetic processing. The air conditioning controller 40 controls an operation of a variety of air conditioning devices (e.g., the compressor 11, the integration valve 14, the bypass-passage switching valve 27, the blower 32, or the like) connected to an output side, based on an air conditioning control program memorized at ROM.

A sensor group 41 for a variety of air conditioning control is connected to an input side of the air conditioning controller 40. The sensor group 41 includes (i) an inside air sensor detecting a temperature in a passenger compartment, (ii) an outside air sensor detecting a temperature of outside air, (iii) a solar radiation sensor detecting a solar radiation amount entering in the passenger compartment, (iv) a temperature sensor for an evaporator detecting a temperature of blowing air blown from the interior evaporator 23 (i.e., a temperature of the evaporator), (v) a discharge-pressure sensor detecting a pressure of high-pressure refrigerant discharged from the compressor 11, (vi) a condenser temperature sensor detecting a temperature of refrigerant flowing out of the interior condenser 12, (vii) a suction-pressure sensor detecting a pressure of intake refrigerant drawn into the compressor 11, or the like.

Further, a control panel (not shown) is located around an instrument panel located at a front area in a passenger compartment and is connected to an input side of the air conditioning controller 40. Control signals from various air conditioning operation switches disposed to the control panel are input to the air conditioning controller 40. The various air conditioning operation switches are, specifically, (i) an operation switch of the vehicle air conditioner 1, (ii) an inside temperature setting switch setting a temperature in the passenger compartment, (iii) a mode selecting switch selectively setting the cooling operation mode, (iv) a dehumidification and heating operation mode, or (v) the heating operation mode, or the like.

Control parts controlling operation of various air conditioning control devices connected to an output side of the air conditioning controller 40 are integrated to provide the air conditioning controller 40, and a configuration (a hardware and a software) controlling operation of each controlled object apparatus configures a control part controlling the operation of each controlled object apparatus.

For example, according to the present embodiment, a configuration (a hardware and a software) controlling an operation of an electric motor of the compressor 11 configures a discharge ability controlling part, and a configuration (a hard ware and a software) controlling an operation of the integration valve 14 and the bypass-passage switching valve 27 configures a refrigerant circuit controlling part. The discharge ability controlling part, the refrigerant circuit controlling part, or the like may be configured as a control device separately from the air conditioning controller 40.

An operation of the vehicle air conditioner 1 of the present embodiment having a structure described above will be described. As described above, the vehicle air conditioner 1 of the present embodiment selectively switches (i) the cooling operation mode cooling a passenger compartment, (ii) the heating operation mode heating the passenger compartment, and (iii) the dehumidification and heating mode dehumidifying and heating the passenger compartment. An operation in each operation mode will be described.

(a) Cooling Operation Mode

The cooling operation mode is started when the cooling operation mode is set by the mode selecting switch in a condition that an operation switch of the control panel is on. In the cooling operation mode, the air conditioning controller 40 controls (i) the high-stage-side expansion valve 13 to be fully open, (ii) the solenoid 16 of the integration valve 14 to be energized, (iii) the cooling expansion valve 22 to be slightly open so as to perform decompression action, and (iv) the bypass-passage switching valve 27 to be closed.

Accordingly, as shown in FIG. 5, in the integration valve 14, (i) the liquid-phase refrigerant side valve member 15 opens the liquid-phase refrigerant passage 141d, (ii) the vapor-phase refrigerant side valve member 18 closes the vapor-phase refrigerant passage 142b, and (iii) the heat pump cycle 10 sets a refrigerant cycle in which refrigerant flows as shown by solid arrows in FIG. 1.

In the above configuration of the refrigerant cycle, the air conditioning controller 40 reads detection signals of the sensor group 41 for air conditioning control and operation signals of the operation panel. A target air temperature TAO, which is a target temperature of air to be blown into a passenger compartment, is calculated based on the detection signals and the operation signals. Furthermore, the air conditioning controller 40 determines operation states of various air conditioning control device connected to the output side of the air conditioning controller 40 based on the calculated target air temperature TAO and detection signals of the sensor group 41.

For example, a refrigerant discharge ability of the compressor 11, in other words, control signals fed into the electric motor of the compressor 11, is determined as following description. Based on the target air temperature TAO, a target evaporator air temperature TEO which is a temperature of air from an air outlet of the interior evaporator 23 is determined using a control map memorized at the air conditioning controller 40.

Control signals, which is output to the electric motor of the compressor 11, are determined based on a deviation between the target evaporator air temperature TEO and a temperature of air at the outlet of the interior evaporator 23, detected by the evaporator temperature sensor, so that a temperature of air blown from the interior evaporator 23 approaches to the target evaporator air temperature TEO, by using a feedback control.

Control signals output to the cooling expansion valve 22 is determined so that a supercooling degree of refrigerant flowing into the cooling expansion valve 22 approaches to a target supercooling degree. The target supercooling degree is predetermined such that the COP approaches generally to a maximum value. Control signals output to the servo motor of the air mix door 34 is determined so that the air mix door 34 closes the air passage of the interior condenser 12, and that all amount of blowing air after passing through the interior evaporator 23 passes through the bypass passage 35.

Control signals or the like determined in a manner described above are output to the various air conditioning control devices. Subsequently, a control routine, for example, (i) reading the detection signals and the operation signals, (ii) calculating the target air temperature TAO, (iii) determining each operation state of the various of air conditioning control devices, (iv) outputting the control voltage and the control signal, and the like, is repeated until a predetermined period when an operation of the vehicle air conditioner is required to be stopped via the control panel. A repeat of such a control routine is similarly performed in other operation modes.

Therefore, in the cooling operation mode of the heat pump cycle 10, high-pressure refrigerant discharged from the discharge port 11c of the compressor 11 (the point $a_{12}$ in FIG. 12) flows into the interior condenser 12. In the cooling operation mode, the air mix door 34 closes the air passage of the interior condenser 12, and refrigerant flowing into the interior condenser 12 flows out through the interior condenser 12 so as to radiate little heat to air blown to the passenger compartment.

The high-stage-side expansion valve 13 is fully open, and refrigerant flowing out of the interior condenser 12 passes through the high-stage-side expansion valve 13 without being decompressed. The refrigerant flows into the vapor-liquid separating space 141b via the refrigerant inlet port 141a of the integration valve 14.

Refrigerant flowing into the integration valve 14 is vapor-phase refrigerant having a superheating degree, and the vapor-phase refrigerant flows into the liquid-phase refrigerant passage 141d without being separated into vapor-phase and liquid-phase in the vapor-liquid separating space 141b of the integration valve 14. Further, because the liquid-phase refrigerant side valve member 15 is moved to open the liquid-phase refrigerant passage 141d, the vapor-phase refrigerant flowing into the liquid-phase refrigerant passage 141d flows out of the liquid-phase refrigerant outlet port 141e generally without being decompressed at the fixed throttle 17.

That is, refrigerant flowing into the integration valve 14 flows out through the liquid-phase refrigerant outlet port 141e generally without causing pressure loss. On this occasion, because a refrigerant pressure at a side of the liquid-phase refrigerant outlet port 141e is introduced in the backpressure space 142e via the pressure introducing passage 19, the vapor-phase refrigerant side valve member 18 closes the vapor-phase refrigerant passage 142b. Therefore, refrigerant does not flow out of the separated vapor-phase refrigerant outlet port 142a.

Vapor-phase refrigerant flowing out of the liquid-phase refrigerant outlet port 141e of the integration valve 14 flows into the exterior heat exchanger 20. Refrigerant flowing into the exterior heat exchanger 20 radiates heat by exchanging heat with outside air blown by a blower fan 21 (from the point $a_{12}$ to the point $b_{12}$ in FIG. 12). Since the bypass-passage switching valve 27 is in a closed state, refrigerant flowing out of the exterior heat exchanger 20 flows into the cooling expansion valve 22 being slightly open and is decompressed and expanded isoenthalpially to be low-pressure refrigerant (the point $b_{12}$ to the point $c_{12}$ in FIG. 12).

Figure 12:
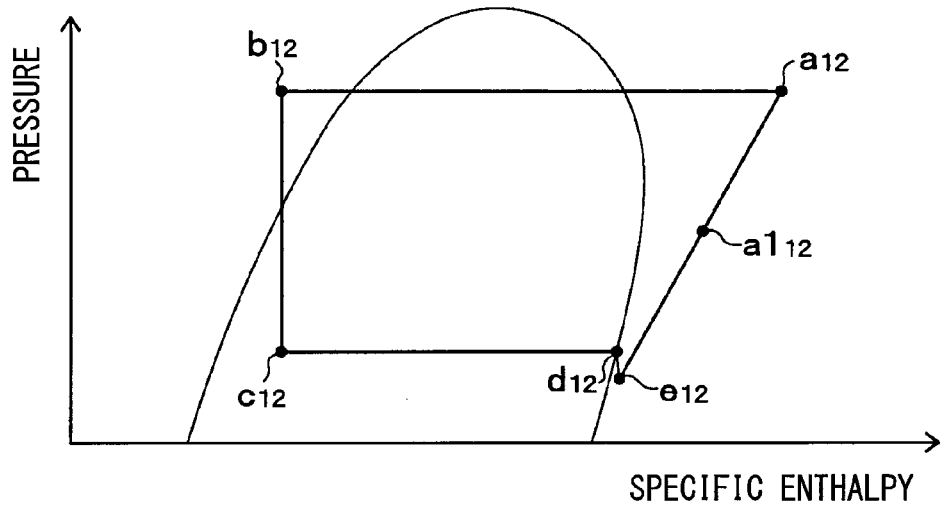
FIG. 12 is a Mollier diagram showing a refrigerant state in the cooling operation mode of the heat pump cycle according to the first embodiment.

Low-pressure refrigerant decompressed at the cooling expansion valve 22 flows into the interior evaporator 23, absorbs heat from air blown toward the passenger compartment, which is blown by the blower 32, and evaporates (the point $c_{12}$ to the point $d_{12}$ in FIG. 12). Accordingly, air blown toward the passenger compartment is cooled.

Refrigerant flowing out of the interior evaporator 23 is separated into vapor-phase refrigerant and liquid-phase refrigerant in the accumulator 24. Separated vapor-phase refrigerant is drawn to the suction port 11a of the compressor 11 (the point $e_{12}$ in FIG. 12) and decompressed again in an order of the low-stage-side compression mechanism and high-stage-side compression mechanism (in an order of the point $e_{12}$, the point $a1_{12}$, the point $a_{12}$ in FIG. 12). On the other hand, separated liquid-phase refrigerant is stored in the accumulator 24 as an excess refrigerant which is unnecessary for a cycle to perform a required refrigeration capacity.

As shown in FIG. 12, the point $d_{12}$ is different from the point $e_{12}$ due to (i) a pressure loss caused to vapor-phase refrigerant passing through a refrigerant pipe extending from the accumulator 24 to the suction port 11a of the compressor 11 and (ii) a heat-absorbed amount, which is a heat amount of vapor-phase refrigerant absorbing heat from outside (i.e., outside air). Therefore, in an ideal cycle, the point $d_{12}$ is preferably coincide with the point $e_{12}$. This matter is similar to a Mollier diagram in the following description.

As described above, in the cooling operation mode, since the air passage of the interior compressor 12 is closed by the air mix door 34, air cooled at the interior evaporator 23 can be blown into the passenger compartment. Accordingly, a cooling operation of the passenger compartment can be exerted.

(b) Heating Operation Mode

The heating operation mode will be described below. As described above, in the heat pump cycle 10 of the present embodiment, the first heating mode or the second heating mode can be performed as the heating operation mode. The heating operation mode is started when the heating operation mode is selected by using the mode selecting switch in a condition that the operation switch of the vehicle air conditioner is on.

When the heating operation mode is operated, the air conditioning controller 40 reads detection signals from the sensor group 41 for air conditioning control and operation signals from the operation panel, and determines refrigerant discharging capacity (i.e., a rotation speed) of the compressor 11. In addition, the air conditioning controller 40 operates the first heating mode or the second heating mode based on the determined rotation speed.

(b)-1 First Heating Mode

The first heating mode will be described below. When the first heating mode is operated, the air conditioning controller 40 controls (i) the high-stage-side expansion valve 13 to be fully closed, (ii) the solenoid 16 of the integration valve 14 to be non-energized, (iii) the cooling expansion valve 22 to be fully closed, and (iv) the bypass-passage switching valve 27 to be open.

Accordingly, in the integration valve 14 shown in FIG. 4, the liquid-phase refrigerant side valve member 15 closes the liquid-phase refrigerant passage 141d, the vapor-phase refrigerant side valve member 18 opens the vapor-phase refrigerant passage 142b, and the heat pump cycle 10 is set to a refrigerant passage in which refrigerant flows as shown by solid arrows in FIG. 2.

In a configuration of the refrigerant flow passage (i.e., a configuration of a cycle), similar to a case of the cooling operation mode, the air conditioning controller 40 (i) reads detection signals detected by the sensor group 41 for air conditioning and operation signals from the operation panel and (ii) determines operation states of the various air control devices electrically connected to the output side of the air conditioning controller 40 based on the target air temperature TAO and the detection signals of the sensor group.

In the first heating mode, control signals fed into the high-stage-side expansion valve 13 is determined so that a pressure of refrigerant at the interior condenser 12 becomes a predetermined target high pressure, or that a supercooling degree of refrigerant flowing out of the interior condenser 12 becomes a predetermined target supercooling degree. Control signals fed into the servo motor of the air mix door 34 is determined so that the air mix door 34 is moved to close the bypass passage 35 and that all volume of blowing air after passing through the interior evaporator 23 passes through the interior condenser 12.

Figure 13:
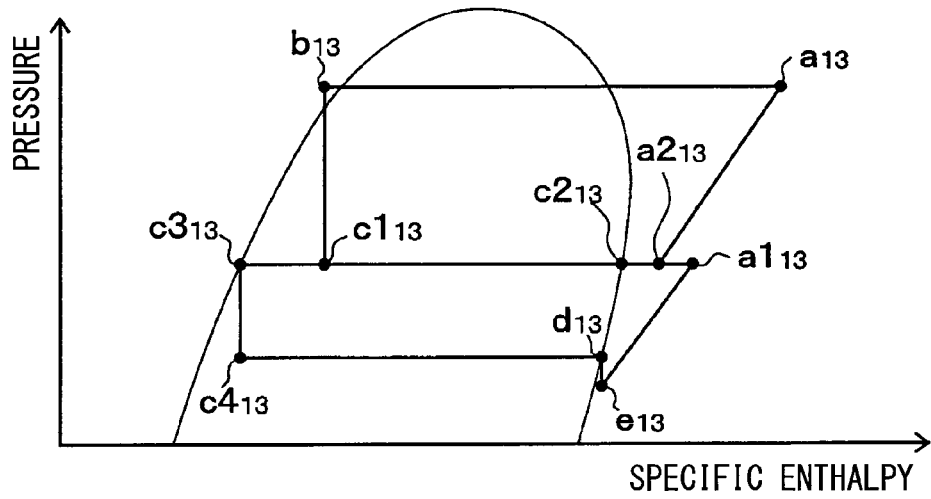
FIG. 13 is a Mollier diagram showing a refrigerant state in the first heating mode of the heat pump cycle according to the first embodiment.

Therefore, in the first heating mode of the heat pump cycle 10, as shown in a Mollier diagram in FIG. 13, high-pressure refrigerant discharged from the discharge port 11c of the compressor 11 (the point $a_{13}$ in FIG. 13) flows into the interior condenser 12. Refrigerant flowing into the interior condenser 12 radiates heat by exchanging heat with air blown toward the passenger compartment, which is blown from the blower 32 and passes through the interior evaporator 23 (the point $a_{13}$ to the point $b_{13}$ in FIG. 13). Accordingly, air blown toward the passenger compartment is heated.

Refrigerant flowing out of the interior condenser 12 is decompressed isoenthalpially at the high-stage-side expansion valve 13 being slightly opened to be intermediate-pressure refrigerant (the point $b_{13}$ to the point $c1_{13}$ in FIG. 13). The intermediate-pressure refrigerant decompressed at the high-stage-side expansion valve 13 flows into the vapor-liquid separating space 141b from the vapor-phase refrigerant outlet port 142a of the integration valve 14 and separated into vapor-phase refrigerant and liquid-phase refrigerant (from the point $c1_{13}$ to the point $c2_{13}$, and from the point $c1_{13}$ to the point $c3_{13}$ in FIG. 13).

Liquid-phase refrigerant separated in the vapor-liquid separating space 141b flows into the liquid-phase refrigerant passage 141d. Because the liquid-phase refrigerant side valve member 15 closes the liquid-phase refrigerant passage 141d, the liquid-phase refrigerant is decompressed and expanded isoenthalpially at the fixed throttle 17 to be low-pressure refrigerant (from the point $c3_{13}$ to the point $c4_{13}$ in FIG. 13) and flows out of the liquid-phase refrigerant outlet port 141e.

Since a refrigerant pressure at a side of the liquid-phase refrigerant outlet port 141e decompressed at the fixed throttle 17 is introduced into the backpressure space 142e via the pressure introducing passage 19, the vapor-phase refrigerant side valve member 18 opens the vapor-phase refrigerant passage 142b. Therefore, vapor-phase refrigerant separated in the vapor-liquid separating space 141b flows out of the vapor-phase refrigerant outlet port 142a of the integration valve 14 and flows into the intermediate pressure port 11b of the compressor 11 (from the point $C2_{13}$ to the point $a2_{13}$ in FIG. 13).

Intermediate-pressure vapor-phase refrigerant flowing into the intermediate pressure port 11b is mixed with refrigerant discharged from the low-pressure-side compression mechanism (the point $a1_{13}$ in FIG. 13), and the mixed refrigerant is drawn into the high-stage-side compression mechanism. On the other hand, refrigerant flowing out of the liquid-phase refrigerant outlet port 141e of the integration valve 14 via the fixed throttle 17 flows into the exterior heat exchanger 20 and absorbs heat by exchange heat with outside air blown by the blower fan 21 (the point $c4_{13}$ to the point $d_{13}$ in FIG. 13).

Refrigerant flowing out of the exterior heat exchanger 20 flows into the accumulator 24 via the expansion-valve bypass passage 25 and is separated into the vapor-phase refrigerant and liquid-phase refrigerant because the bypass-passage switching valve 27 is in an open state. The separated vapor-phase refrigerant drawn into the suction port 11a of the compressor 11 (the point $e_{13}$ in FIG. 13) and is decompressed again. On the other hand, the separated liquid-phase refrigerant is stored in the accumulator 24 as an excess refrigerant, which is unnecessary for the cycle to perform a required refrigerant capacity.

As described above, in the first heating mode, heat of refrigerant discharged from the compressor 11 is radiated to blowing air, which is blown into the passenger compartment, at the interior condenser 12, and the heated blowing air is blown into the passenger compartment. Accordingly, a heating operation of the passenger compartment can be exerted.

Further, in the first heating mode, a gas injection cycle (i.e., an economizer refrigerant cycle) can be configured. In the gas injection cycle, low-pressure refrigerant decompressed at the fixed throttle 17 is drawn from the suction port 11a of the compressor 11, and intermediate-pressure refrigerant decompressed at the high-stage-side expansion valve 13 flows into the intermediate-pressure port 11b and is mixed with refrigerant being compressed.

Thus, the mixed refrigerant of which temperature is low can be drawn in the high-stage-side compression mechanism. Therefore, a pressure difference between a pressure of drawn refrigerant and a pressure of discharged refrigerant is decreased in both the high-stage-side compression mechanism and the low-stage-side compression mechanism such that a compression efficiency of the high-stage-side compression mechanism is improved. Further, both the compression efficiency of the high-stage-side compression mechanism and a compression efficiency of the low-stage-side compression mechanism can be improved. Accordingly, COP in whole of the heat pump cycle 10 can be improved.

(b)-2 Second Heating Mode

The second heating mode will be described below. When the second heating mode is operated, the air conditioning controller 40 controls (i) the high-stage side expansion valve 13 to be slightly open, (ii) the solenoid 16 of the integration valve 14 to be energized, (iii) the cooling expansion valve 22 to be fully closed, and (iv) the bypass-passage switching valve 27 to be open. Accordingly, similar to the cooling operation mode, the integration valve 14 is in a state shown in FIG. 5, and the heat pump cycle 10 is set to a refrigerant flow passage in which refrigerant flows as shown by solid arrows in FIG. 3.

In a configuration of the refrigerant flow passage (i.e., a configuration of the cycle), similar to the cooling operation mode, the air conditioning controller 40 (i) reads a detection signals of the sensor group 41 for air conditioning and an operation signals from the operation panel and (ii) determines operation states of the various air conditioning control devices connected to the output side of the air conditioning controller 40 based on the target air temperature TAO and the detection signals of the sensor group.

In the second heating mode, control signals fed into the high-stage-side expansion valve 13 is determined so that a refrigerant pressure at the interior condenser 12 becomes a predetermined target high-pressure, or that a supercooling degree of refrigerant flowing out of the interior condenser 12 becomes a predetermined target supercooling degree. Control signals fed into the servo motor of the air mix door 34 is determined so that the air mix door 34 closes the bypass passage 35, and that all volume of blowing air after passing the interior evaporator 23 passes through the interior condenser 12.

Figure 14:
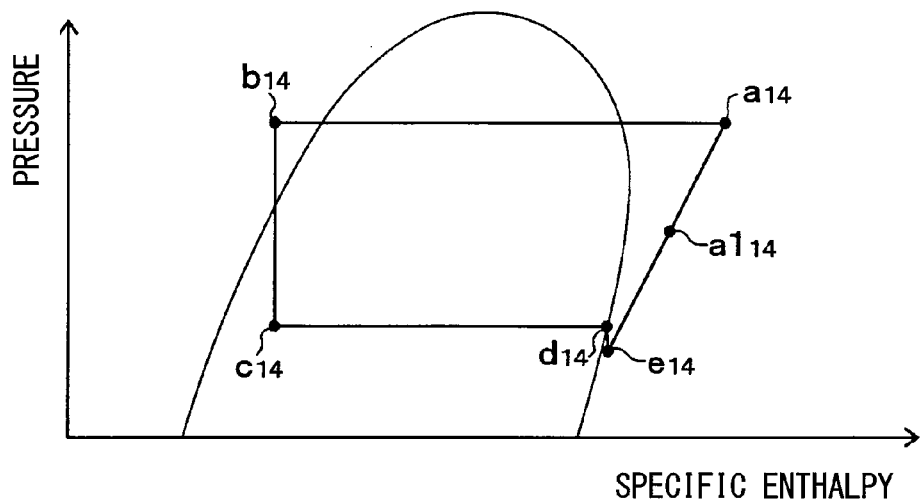
FIG. 14 is a Mollier diagram showing a refrigerant state in the second heating mode of the heat pump cycle according to the first embodiment.

Therefore, in the second heating mode of the heat pump cycle 10, as shown in a Mollier diagram of FIG. 14, high-pressure refrigerant discharged from the discharge port 11c of the compressor 11 (the point $a_{14}$ in FIG. 14) flows into the interior condenser 12, and similar to a case in the first heating mode, radiates heat to air blown toward the passenger compartment, by exchanging heat (from the point $a_{14}$ to the point $b_{14}$ in FIG. 14). Accordingly, air blown toward the passenger compartment is heated.

Refrigerant flowing out of the interior condenser 12 is decompressed and expanded isoenthalpially at the high-stage-side expansion valve 13, which is slightly open, to be low-pressure refrigerant (from the point $b_{14}$ to the point $c_{14}$ in FIG. 14) and flows into the vapor-liquid separating space 141b of the integration valve 14. Refrigerant flowing into the vapor-liquid separating space 141b flows out through the liquid-phase refrigerant outlet port 141e without flowing out of the vapor-phase refrigerant outlet port 142a and without being decompressed, similar to a case in the cooling operation mode.

Low-pressure refrigerant flowing out of the liquid-phase refrigerant outlet port 141e flows into the exterior heat exchanger 20 and absorbs heat from outside air blown from the blower fan 21 by exchange heat (from the point $c_{14}$ to the point $d_{14}$ in FIG. 14). Refrigerant flowing out of the exterior heat exchanger 20 flows into the accumulator 24 via the expansion-valve bypass passage 25 because an open state of the bypass-passage switching valve 27 is in an open state, and is being separated into vapor-phase refrigerant and liquid-phase refrigerant in the accumulator 24. The separated vapor-phase refrigerant is drawn into the suction port 11a of the compressor 11 (the point $e_{14}$ in FIG. 14).

As described above, in the second heating mode, heat of refrigerant discharged from the compressor 11 is radiated to air blown toward the passenger compartment at the interior condenser 12, and the heated blowing air can be blown into the passenger compartment. Accordingly, a heating operation of the passenger compartment can be exerted.

An effect of operating the second heating mode, in a condition that a heating load is relatively low relative to the first heating mode, for example, a condition that outside temperature is high, will be described. In the first heating mode, as described above, the gas injection cycle can be configured, and COP in the whole of the heat pump cycle 10 can be improved.

That is, theoretically, as long as a rotation speed of the compressor 11 is fixed, the first heating mode can perform with a higher heating capacity than that of the second heating mode. In other words, a rotation speed (i.e., a refrigerant discharging capacity) of the compressor 11, which is required to perform the same heating capacity, in the first heating mode is lower than a rotation speed of the compressor 11 in the second heating mode.

However, in a compression mechanism, there is a rotation speed for maximum efficiency at which a compression efficiency is maximum (i.e., a compression efficiency reaches a peak). When a rotation speed is lower than the rotation speed for maximum efficiency, the compression efficiency is greatly reduced. Therefore, when the compressor 11 is operated with a rotation speed which is lower than the rotation speed for maximum efficiency in a condition that a heating load is relatively low, COP may rather be reduced in the first heating mode.

According to the present embodiment, the rotation speed for maximum efficiency is determined as a standard rotation speed. When the rotation speed of the compressor 11 is lower than the standard rotation speed in the first heating mode, the first heating mode is switched to the second heating mode. When the rotation speed of the compressor 11 exceeds a sum rotation speed of the target rotation speed and a predetermined rotation speed in the second heating mode, the second heating mode is switched to the first heating mode.

Accordingly, one of the first heating mode and the second heating mode can be set to perform higher COP. Therefore, when the rotation speed of the compressor 11 is lower than the standard rotation speed in the first heating mode, COP in the whole of the heat pump cycle 10 can be improved by switching the first heating mode to the second heating mode.

(c) Dehumidification and Heating Mode

The dehumidification and heating mode will be described below. The dehumidification and heating operation mode is operated when a setting temperature set by a passenger-compartment temperature setting switch is higher than outside temperature in the cooling operation mode.

When the dehumidification and heating mode is operated, the air conditioning controller 40 controls (i) the high-stage side expansion valve 13 to be fully open or slightly open, (ii) the solenoid 16 of the integration valve 14 to be energized, (iii) the cooling expansion valve 22 to be fully open or slightly open, and (iv) the bypass-passage switching valve 27 to be closed. Accordingly, the heat pump cycle 10 is switched to a refrigerant flow passage in which refrigerant flows as shown with solid arrows in FIG. 1 as the same as the cooling operation mode.

In a configuration of the refrigerant flow passage (i.e., a configuration of the cycle), the air conditioning controller 40 (i) reads detection signals of the sensor group 41 for air conditioning and operation signals from the operation panel and (ii) determines operation states of the various air conditioning control devices connected to the output side of the air conditioning controller 40 based on the target air temperature TAO and the detection signals of the sensor group.

For example, control signals fed into the servo motor of the air mix door 34 is determined so that the air mix door 34 closes the bypass passage 35, and that all volume of blowing air after passing through the interior evaporator 23 passes through the interior condenser 12. Further, in the dehumidification and heating mode of the present embodiment, an opening degree of the high-stage-side expansion valve 13 and an opening degree of the cooling expansion valve 22 are changed depend on a temperature difference between the setting temperature and outside temperature. Specifically, in association with increasing the target air temperature TAO, four stages of the dehumidification and heating mode, from a first to fourth dehumidification and heating modes, are operated.

(c)-1 First Dehumidification and Heating Mode

In the first dehumidification and heating mode, the high-stage-side expansion valve 13 is fully closed, and the cooling expansion valve 22 is slightly open. In the first dehumidification and heating mode, although a configuration of the cycle (i.e., a configuration of the refrigerant flow passage) is the same as the cycle of the cooling operation mode, the air mix door 34 is adjusted so that the air passage of the interior condenser 12 is fully open. Accordingly, a state of refrigerant circulating in the cycle is varied as shown in a Mollier diagram in FIG. 15.

Figure 15:
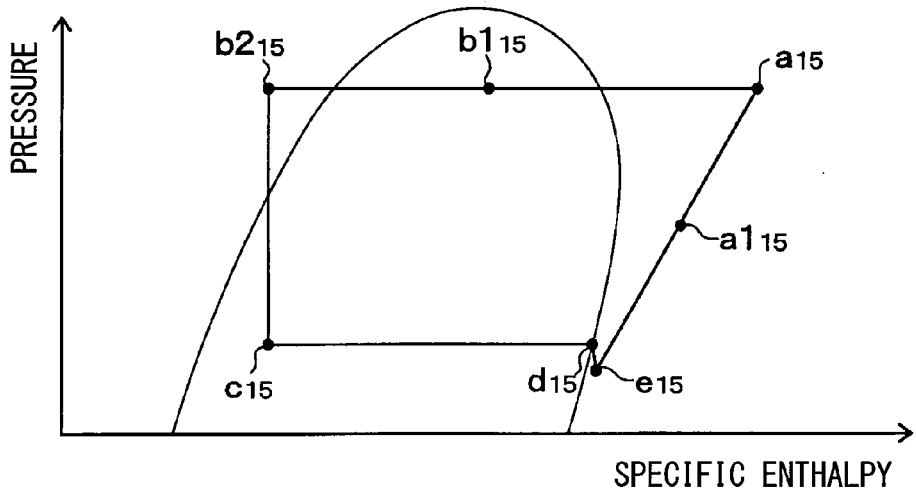
FIG. 15 is a Mollier diagram showing a refrigerant state in a first dehumidification and heating mode of the heat pump cycle according to the first embodiment.

That is, as shown in FIG. 14, high-pressure refrigerant discharged from the discharge port 11c of the compressor 11 (the point $a_{15}$ in FIG. 15) flows into the interior condenser 12 and radiates heat by exchanging heat with air blown toward the passenger compartment and having been cooled and dehumidified at the interior evaporator 23 (from the point $a_{15}$ to the point $b1_{15}$ in FIG. 15). Accordingly, air blown toward the passenger compartment is heated at the interior condenser 12.

As the same as the cooling operation mode, refrigerant flowing out of the interior condenser 12 flows into the exterior heat exchanger 20 via the high-stage-side expansion valve 13 and the integration valve 14, in this order. High-pressure refrigerant flowing into the exterior heat exchanger 20 further radiates heat by exchanging heat with outside air blown from the blower fan 21 (from the point $b1_{15}$ to the point $b2_{15}$ in FIG. 15). A following operation is the same as the cooling operation mode.

As described above, in the first dehumidification and heating mode, air blown toward the passenger compartment, which is cooled and dehumidified at the interior evaporator 23, can be heated at the interior condenser 12 and blown into the passenger compartment. Therefore, a dehumidification and heating operation of the passenger compartment can be exerted.

(c)-2 Second Dehumidification and Heating Mode

When the target air temperature TAO exceeds a first standard temperature, which is predetermined, in the first dehumidification and heating mode, the second dehumidification and heating mode is switched for the first dehumidification and heating mode. In the second dehumidification and heating mode, the high-stage-side expansion valve 13 is slightly open, and the cooling expansion valve 22 in a throttle state in which an opening degree of the cooling expansion valve 22 is larger than an opening degree of the cooling expansion valve 22 in the first dehumidification and heating mode. Therefore, in the second dehumidification and heating mode, a state of refrigerant circulating the cycle is changed as shown in a Mollier diagram in FIG. 16.

Figure 16:
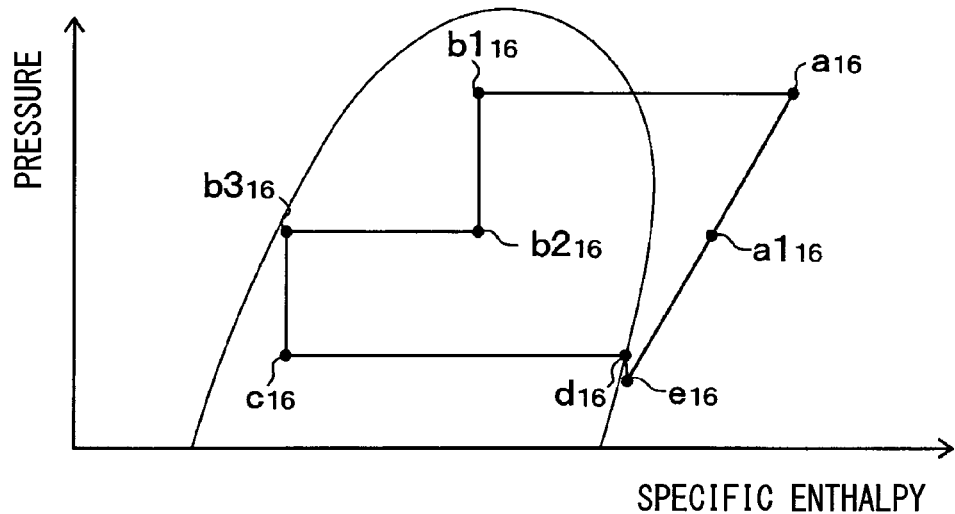
FIG. 16 is a Mollier diagram showing a refrigerant state in a second dehumidification and heating mode of the heat pump cycle according to the first embodiment.

That is, as shown in FIG. 16, high-pressure refrigerant discharged from the discharge port 11c of the compressor 11 (the point $a_{16}$ in FIG. 16) flows into the interior condenser 12 and radiates heat by exchanging heat with air blown toward the passenger compartment, which is cooled and dehumidified at the interior evaporator 23, similar to the first dehumidification and heating mode (from the point $a_{16}$ to the point $b1_{16}$ in FIG. 16). Therefore, air blown toward the passenger compartment is heated at the interior condenser 12.

Refrigerant flowing out of the interior condenser 12 is decompressed isoenthalpially to be intermediate-pressure refrigerant, of which temperature is higher than outside temperature, at the high-stage-side expansion valve 13 being slightly open (from the point $b1_{16}$ to the point $b2_{16}$ in FIG. 16). The intermediate-pressure refrigerant decompressed at the high-stage-side expansion valve 13 flows into the exterior heat exchanger 20 via the integration valve 14, similar to the cooling operation mode.

The intermediate-pressure refrigerant flowing into the exterior heat exchanger 20 radiates heat by exchanging heat with outside air blown from the blower fan 21 (from the point $b2_{16}$ to the point $b3_{16}$ in FIG. 16). A following operation is the same as the cooling operation mode.

As described above, in the second dehumidification and heating mode, air blown toward the passenger compartment, which has been cooled and dehumidified at the interior evaporator 23, can be heated at the interior condenser 12 and blown into the passenger compartment, similar to the first dehumidification and heating mode. Therefore, a dehumidification and heating operation of the passenger compartment can be exerted.

In the second dehumidification and heating mode, the high-stage-side expansion valve 13 is slightly open, and temperature of refrigerant flowing into the exterior heat exchanger 20 can be lower than that of the first dehumidification and heating mode. Therefore, a temperature difference between a temperature of refrigerant at the exterior heat exchanger 20 and outside temperature is decreased, and a radiated heat amount of refrigerant at the exterior heat exchanger 20 can be reduced.

Accordingly, in comparison to the first dehumidification and heating mode, a refrigerant pressure at the interior condenser 12 can be increased without increasing a flow amount of refrigerant circulating in the cycle, and a temperature of air blown from the interior condenser 12 can be increased greater than the first dehumidification and heating mode.

(c)-3 Third Dehumidification and Heating Mode

The third dehumidification and heating mode is operated when the target air temperature TAO is higher than a second standard temperature, which is predetermined, in the second dehumidification and heating mode. In the third dehumidification and heating mode, an opening degree of the high-stage-side expansion valve 13 is smaller than that of the second dehumidification and heating mode, and an opening degree of the cooling expansion valve 22 is larger than that of the second dehumidification and heating mode. Therefore, a state of refrigerant circulating the cycle is changed as shown in a Mollier diagram in FIG. 17 in the third dehumidification and heating mode.

That is, as shown in FIG. 16, high-pressure refrigerant discharged from the discharge port 11c of the compressor 11 (the point $a_{17}$ in FIG. 17) flows into the interior condenser 12 and radiates heat by exchanging heat with air blown toward the passenger compartment, which is cooled and dehumidified at the interior evaporator 23, (from the point $a_{17}$ to the point $b_{17}$ in FIG. 17), similar to the first and the second dehumidification and heating modes. Therefore, air blown toward the passenger compartment is heated at the interior condenser 12.

Figure 17:
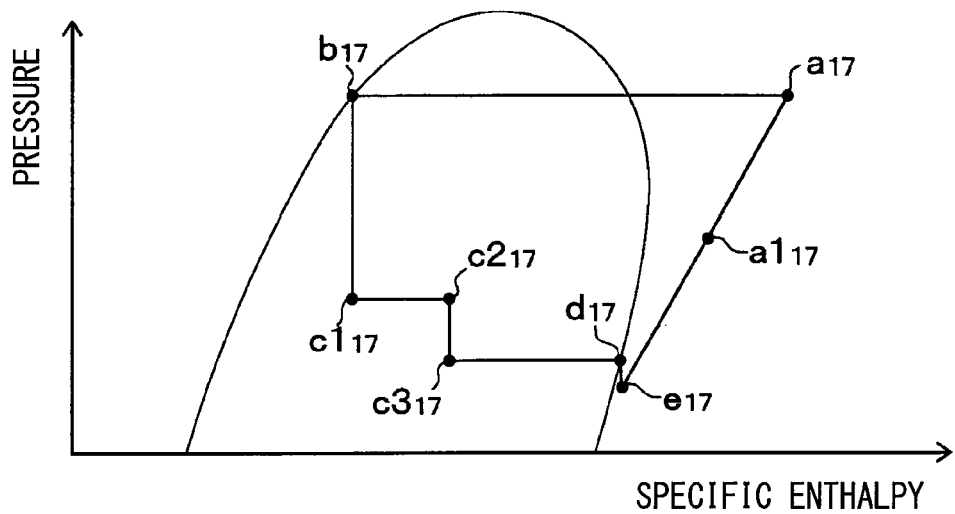
FIG. 17 is a Mollier diagram showing a refrigerant state in a third dehumidification and heating mode of the heat pump cycle according to the first embodiment.

Refrigerant flowing out of the interior condenser 12 is decompressed isoenthalpially to be intermediate-pressure refrigerant, of which temperature is lower than outside temperature, at the high-stage-side expansion valve 13 being slightly open (from the point $b_{17}$ to the point $c1_{17}$ in FIG. 17). The intermediate-pressure refrigerant decompressed at the high-stage-side expansion valve 13 flows into the exterior heat exchanger 20 via the integration valve 14, similar to the cooling operation mode.

The intermediate-pressure refrigerant flowing into the exterior heat exchanger 20 absorbs heat from outside air blown from the blower fan 21 by exchanging heat (from the point $c1_{17}$ to the point $c2_{17}$ in FIG. 17). Further, refrigerant flowing out of the exterior heat exchanger 20 is decompressed isoenthalpially at the cooling expansion valve 22 (from the point $c2_{17}$ to the point $c3_{17}$ in FIG. 17) and flows into the interior evaporator 23. A following operation is the same as the cooling operation mode.

As described above, in the third dehumidification and heating mode, air blown toward the passenger compartment, which is cooled and dehumidified at the interior evaporator 23, can be heated at the interior condenser 12 and blown into the passenger compartment, similar to the first and the second dehumidification and heating mode. Therefore, a dehumidification and heating operation of the passenger compartment can be exerted.

In the third dehumidification and heating mode, an opening degree of the high-stage-side expansion valve 13 is decreased such that the exterior heat exchanger 20 works as an evaporator. Therefore, in comparison to the second dehumidification and heating mode, an absorbed heat amount of refrigerant absorbing heat at the exterior heat exchanger 20 can be increased.

Accordingly, in comparison to the second dehumidification and heating mode, (i) a density of refrigerant drawn into the compressor 11 can be increased, (ii) a refrigerant pressure at the interior condenser 12 can be increased without increasing a rotation speed of the compressor 11, and (iii) temperature of air blown from the interior condenser 12 can be increased greater than the second dehumidification and heating mode.

(c)-4 Fourth Dehumidification and Heating Mode

When the target air temperature TAO exceeds a third standard temperature, which is predetermined, in the third dehumidification and heating mode, the fourth dehumidification and heating mode is operated. In the fourth dehumidification and heating mode, an opening degree of the high-stage-side expansion valve 13 is smaller than that of the third dehumidification and heating mode, and the cooling expansion valve 22 is in a full-open state. Therefore, in the fourth dehumidification and heating mode, a state of refrigerant circulating in the cycle is changed as shown in a Mollier diagram in FIG. 18.

That is, as shown in FIG. 17, high-pressure refrigerant discharged from the discharge port 11c of the compressor 11 (the point $a_{18}$ in FIG. 18) flows into the interior condenser 12 and radiates heat by exchanging heat with air blown toward the passenger compartment, which is cooled and dehumidified at the interior evaporator 23, (from the point $a_{18}$ to the point $b_{15}$ in FIG. 18), similar to the first and the second dehumidification and heating mode. Therefore, blown air for the passenger compartment is heated at the interior condenser 12.

Figure 18:
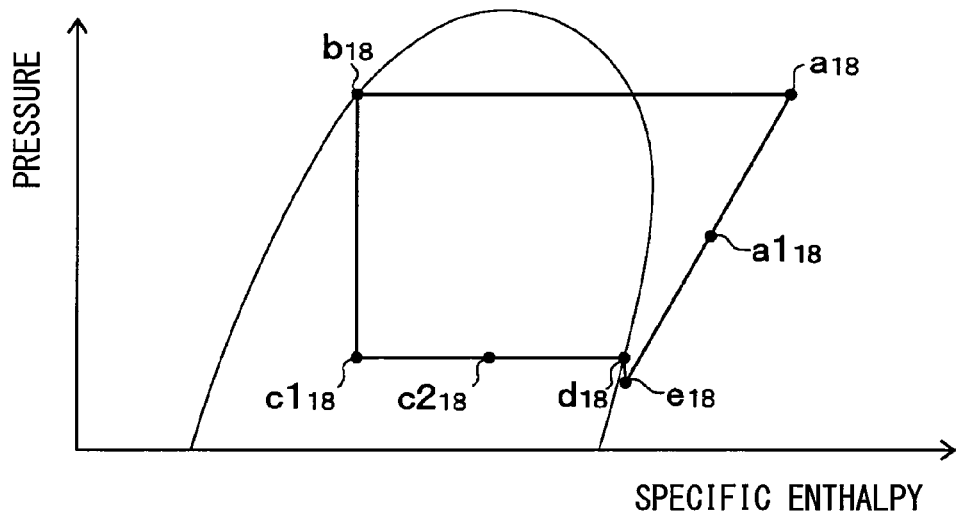
FIG. 18 is a Mollier diagram showing a refrigerant state in a fourth dehumidification and heating mode of the heat pump cycle according to the first embodiment.

Refrigerant flowing out of the interior condenser 12 is decompressed isoenthalpially to be low-pressure refrigerant, of which temperature is lower than outside air, at the high-stage-side expansion valve 13 being slightly open (from the point $b_{18}$ to the point $c1_{18}$ in FIG. 18). The low-pressure refrigerant decompressed at the high-stage-side expansion valve 13 flows into the exterior heat exchanger 20 via the integration valve 14, similar to the cooling operation mode.

The low-pressure refrigerant flowing into the exterior heat exchanger 20 absorbs heat from outside air blown from the blower fan 21 by exchanging heat (from the point $c1_{18}$ to the point $c2_{18}$ in FIG. 18). Further, the cooling expansion valve 22 is in a full-open state, and refrigerant flowing out of the exterior heat exchanger 20 flows into the interior evaporator 23 without being decompressed. A following operation is the same as the cooling operation mode.

As described above, in the fourth dehumidification and heating mode, air blown toward the passenger compartment, which is cooled and dehumidified at the interior evaporator 23, can be heated at the interior condenser 12 and blown into the passenger compartment, as the same as the first, the second, and the third dehumidification and heating modes. Therefore, a dehumidification and heating of the passenger compartment can be exerted.

In the fourth dehumidification and heating mode, as the same as the third dehumidification and heating mode, the exterior heat exchanger 20 works as an evaporator, and an opening degree of the high-stage-side expansion valve 13 is smaller than that of the third dehumidification and heating mode. Accordingly, evaporating temperature of refrigerant at the exterior heat exchanger 20 can be decreased. Therefore, a temperature difference between a temperature of refrigerant at the exterior heat exchanger 20 and outside temperature is bigger than that of the third dehumidification and heating mode, and an absorbed heat amount absorbed by refrigerant at the interior condenser 12 can be increased.

Accordingly, in comparison to the third dehumidification and heating mode, (i) a density of refrigerant drawn into the compressor 11 can be increased, (ii) a refrigerant pressure at the interior condenser 12 can be increased without increasing of a rotation speed of the compressor 11, and (iii) a temperature of air blown from the interior condenser 12 can be higher than that of the third dehumidification and heating mode.

According to the vehicle air conditioner 1 of the present embodiment, as described above, a refrigerant flow passage of the heat pump cycle 10 is switched so that various configurations of cycles are implemented to exert appropriate cooling, heating, and dehumidification and heating of the passenger compartment.

Further, the vehicle air conditioner 1 of the present embodiment usable for an electric vehicle cannot use waste heat for heating a passenger compartment in a vehicle mounting an internal combustion engine (i.e., an engine). Therefore, the heat pump cycle 10 of the present embodiment is extremely effective for a case operated with a high COP regardless of a heating load in the hating operation mode.

According to the present embodiment, the integration valve 14 is used, and in the integration valve, parts of necessary components, which are necessary for the heat pump cycle 10 to be used as a gas injection cycle, are configured integrally. Therefore, a configuration of the heat pump cycle configuring the gas injection cycle can be simple. Accordingly, a mountabilitly of the heat pump cycle in a target object can be improved.

Moreover, since the differential pressure regulating valve moved based on a pressure difference is used as the vapor-phase refrigerant side valve member 18, a device such as an electromagnetic mechanism to move the vapor-phase refrigerant side valve member 18 is not required. Accordingly, by controlling an operation of the liquid-phase refrigerant side valve member 15, the vapor-phase refrigerant side valve member 18 can be moved easily to open or close the vapor-phase refrigerant passage 142b.

Figure 19:
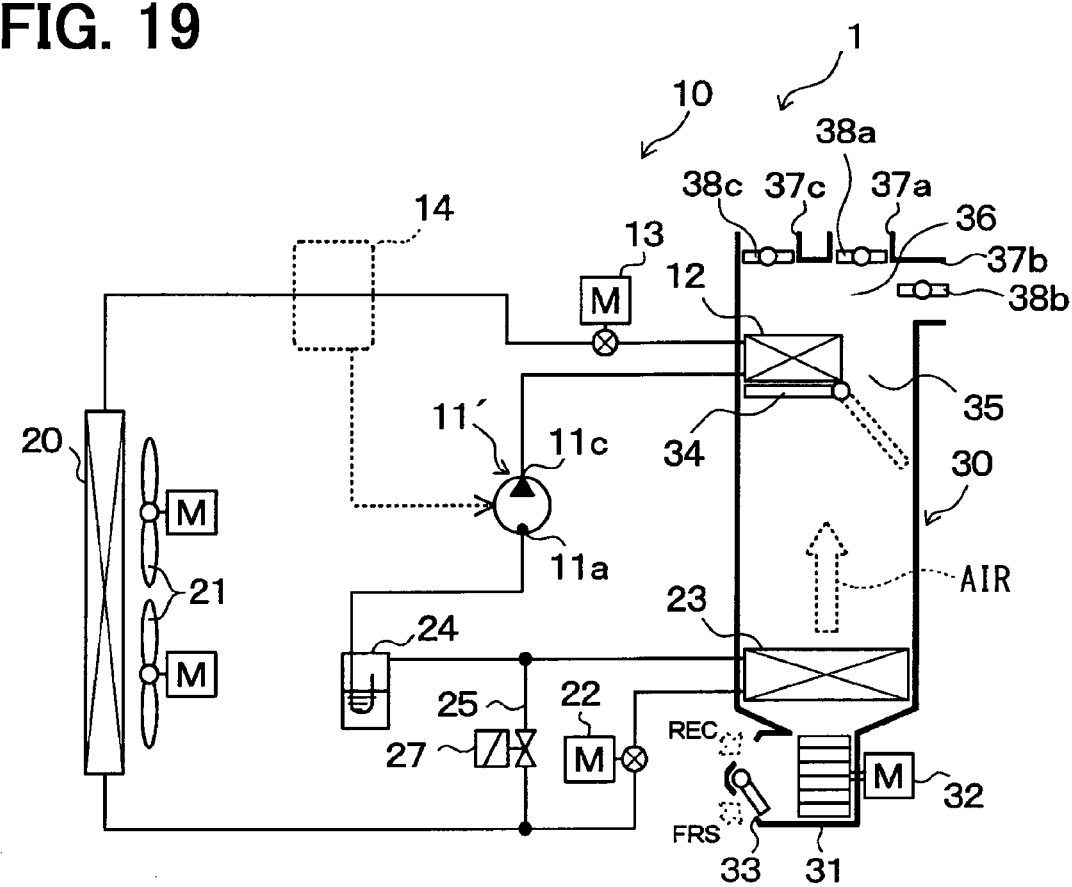
FIG. 19 is an overall schematic diagram illustrating an existing heat pump cycle.

Thus, with respect to a well-known switchable-type heat pump cycle in which refrigerant flow passages are switched, shown in FIG. 19, a heat pump cycle working at least as a gas injection cycle can be configured easily by (i) changing a compressor 11' shown in FIG. 19 to a two-stage-compression-type compressor, (ii) disposing the integration valve 14 of the present embodiment at a part surrounding with a dashed line, and (iii) connecting the vapor-phase refrigerant outlet port 142a of the integration valve 14 and the intermediate-pressure port 11b with each other.

More specifically, when the liquid-phase refrigerant side valve member 15 opens the liquid-phase refrigerant passage 141d, a cycle configuration is set such that at least one of the interior condenser 12 and the exterior heat exchanger 20 works as a radiator at which refrigerant radiates heat, and the interior evaporator 23 works as an evaporator at which refrigerant evaporates.

On the other hand, when the liquid-phase refrigerant side valve member 15 closes the liquid-phase refrigerant passage 141d, a heat pump cycle can be easily switched to a gas injection cycle in which the interior condenser 12 works as a radiator at which refrigerant radiates heat, and the interior evaporator 23 works as an evaporator at which refrigerant evaporates.

The heat pump cycle 10 in FIG. 19 is an example of a well-known heat pump cycle, in which (i) the interior condenser 12 and the exterior heat exchanger 20 work as radiators, and the interior evaporator 23 works as an evaporator when the bypass-passage switching valve 27 is in a closed state, or (ii) a configuration in which the interior condenser 12 works as a radiator, and the exterior heat exchanger 20 work as an evaporator when the bypass-passage switching valve 27 is in an open state.

In FIG. 19, parts that correspond to or equal to the components described in the present embodiment are assigned with the same reference numbers. This term is similar to other drawings, as well. Further, in FIG. 19, illustrations of the air conditioning controller 40 and a power wiring, a signal wiring, or the like electrically connecting the air conditioning controller 40 and various components are omitted, for illustrating clarification.

According to the integration valve 14 of the present embodiment, because the pressure introducing passage 19 is provided in the body 140, a refrigerant passage for transmitting a refrigerant pressure at the side of the liquid-phase refrigerant outlet port 141e to the vapor-phase refrigerant side valve member 18 is not required. Accordingly, a configuration of the heat pump cycle can be further simplified.

According to the integration valve 14 of the present embodiment, the vapor-liquid separating space 141b configures a centrifugal vapor-liquid separating part. Accordingly, in comparison to a configuration in which a vapor-liquid separating performance is exerted using an effect such as gravity, surface tension, or the like, the integration valve 14 exerts a high vapor-liquid separating performance. In this case, a space for the vapor-liquid separating space 141b can be saved, and a whole size of the integration valve can be downsized. Alternatively, a vapor-liquid separating can be performed in the integration valve 14 by using an effect such as gravity, surface tension, or the like, depending on a required vapor-liquid separating performance.

Moreover, the liquid-phase refrigerant passage 141d and the fixed throttle 17 are arranged downward of the separated vapor-phase refrigerant outlet hole 142d, and the vapor-phase refrigerant passage 142b is arranged upward of the separated vapor-phase refrigerant outlet hole 142d. Therefore, liquid-phase refrigerant separated in the vapor-liquid separating space 141b by using gravity is guided securely to a side of the liquid phase refrigerant passage 141d and a side of the fixed throttle 17, and separated vapor-phase refrigerant is guided securely to a side of the vapor-phase refrigerant passage 142b.

In the integration valve 14 of the present embodiment, because a flow direction of refrigerant flowing from the separated liquid-phase refrigerant outlet hole 141c into the liquid-phase refrigerant passage 141d in changed about at a right angle, a mixing performance mixing vapor-phase refrigerant and liquid-phase refrigerant is promoted, and the slip ratio can decreases. Accordingly, a decompression characteristic of the fixed throttle 17 can be stabilized. That is, in the first heating mode, operation of the heat pump cycle 10 can perform stably.

In addition, according to the integration valve 14 of the present embodiment, the refrigerant introducing hole 141g is an oblong hole. The oblong hole extends in an axial direction of the vapor-liquid separating space 141b and is open at the position far from the one end of the separated vapor-phase refrigerant outlet pipe 142c in the longitudinal direction and is closer to the other end of the separated vapor-phase refrigerant outlet pipe 142c in the longitudinal direction.

Accordingly, a diffusion of refrigerant in a radial-inward direction of the vapor-liquid separating space 141b is restricted while an approach zone for refrigerant in the vapor-liquid separating space 141b is secured, and refrigerant can flow along the radial-outer wall surface of the vapor-liquid separating space 141b. Therefore, centrifugal force effectively acts to refrigerant flowing into the vapor-liquid separating space 141b, and a vapor-liquid separating efficiency in the integration valve 14 can be improved. Thus, a space for the vapor-liquid separating space 141b can be saved, and the whole of the integration valve 14 can be downsized. Accordingly, a whole of the heat pump cycle 10 can be downsized, and mountabilitly of the heat pump cycle in a target object can be improved.

Second Embodiment

In the vapor-phase refrigerant side valve member 18 of the first embodiment, the outside diameter of the body part 18a is slightly shorter than the inside diameter of the vapor-phase refrigerant passage 142b so as to be loosely fitted to each other. However, when a clearance is provided between the body part 18a and the vapor-phase refrigerant passage 142b, a refrigerant pressure at the side of the vapor-phase refrigerant passage 142b may leak to a side of the backpressure space 142e.

Leaking of the refrigerant pressure may cause a failure of the vapor-phase refrigerant side valve member 18 and an increase of a refrigerant passage at a side of the liquid-phase refrigerant outlet port 141e, and the quality of refrigerant upstream of the fixed throttle 17 may be changed. Whereas, a sealing portion such as an O-ring or a piston-ring may be disposed to an outer periphery side of the body part 18a, the sealing portion may increase a sliding friction when the vapor-phase refrigerant side valve member 18 moves.

Figure 20A:
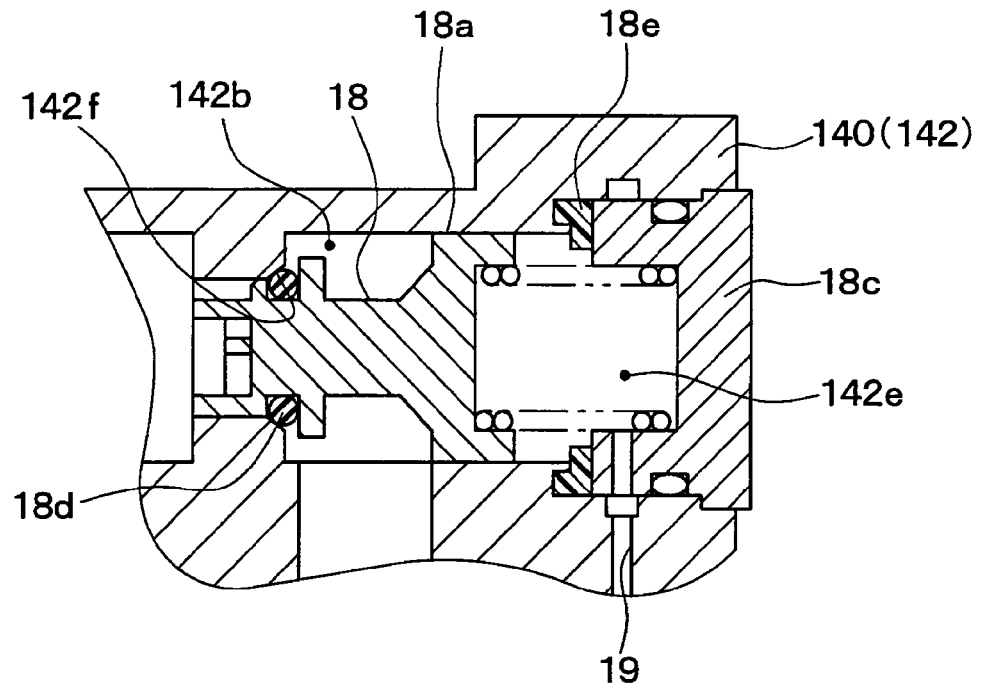
FIG. 20A is a cross-sectional view illustrating a vapor-phase refrigerant side valve member closing a vapor-phase refrigerant passage, according to a second embodiment.
Figure 20B:
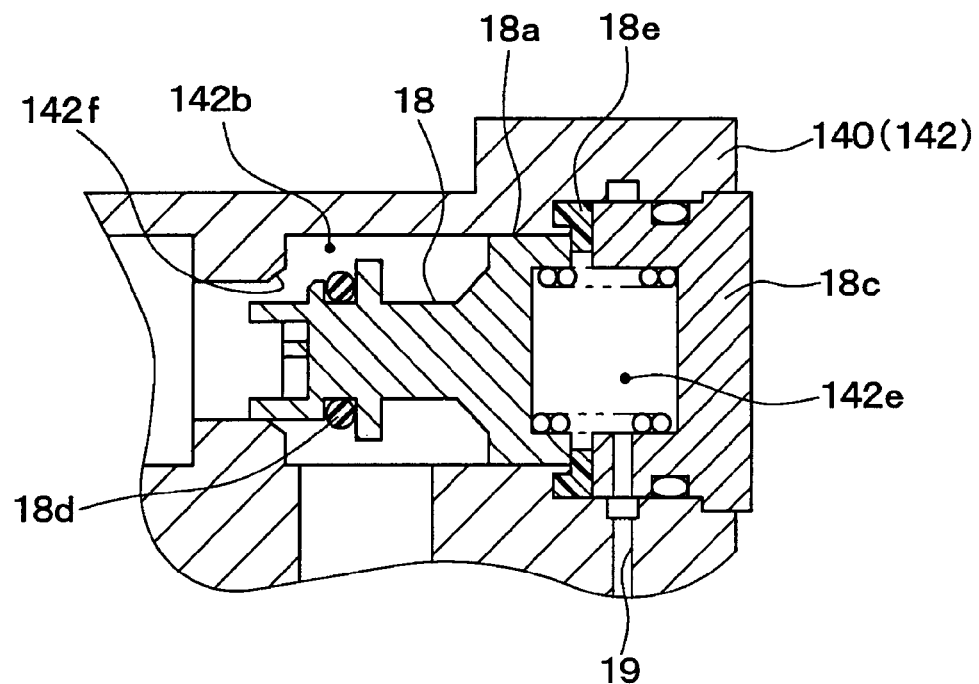
FIG. 20B is a cross-sectional view illustrating the vapor-phase refrigerant side valve member opening the vapor-phase refrigerant passage, according to the second embodiment.

According to the present embodiment, as shown in FIGS. 20A and 20B, the stopper 18c is in contact with an outer periphery part of the body part 18a of the vapor-phase refrigerant side valve member 18 at the other side of the vapor-phase refrigerant side valve member 18 in the axial direction, when the vapor-phase refrigerant side valve member 18 opens the vapor-phase refrigerant passage 142b. A sealing portion 18e made of resin and having an annular shape is disposed at a position of the stopper 18c abutting to the vapor-phase refrigerant side valve member 18.

FIG. 20A is an enlarged cross-sectional view illustrating a state where the vapor-phase refrigerant side valve member 18 closes the vapor-phase refrigerant passage 142b, and FIG. 20B is an enlarged cross-sectional view illustrating a state where the vapor-phase refrigerant side valve member 18 opens the vapor-phase refrigerant passage 142b. Other configurations and operations of the vehicle air conditioner 1 are the same as that of the first embodiment. Therefore, an integration valve 14 and a heat pump cycle 10 of the second embodiment can have the same effects as the first embodiment.

Further, because the stopper 18c described above is used, refrigerant can be restricted from leaking from an abutting part where the vapor-phase refrigerant side valve member 18 and the stopper 18c are in contact, when the vapor-phase refrigerant side valve member 18 opens the vapor-phase refrigerant passage 142d. That is, refrigerant can be restricted from leaking from the side of the vapor-phase refrigerant passage 142b to the side of the liquid-phase refrigerant outlet port 141e, and the vapor-phase refrigerant side valve member 18 can keep the vapor-phase refrigerant passage 142b opening.

When the vapor-phase refrigerant side valve member 18 closes the vapor-phase refrigerant passage 142b, a refrigerant pressure at the side of the vapor-phase refrigerant passage 142b and a refrigerant pressure at the side of the liquid-phase refrigerant outlet port 141e (i.e., in the backpressure space 142e) become generally the same. Accordingly, refrigerant does not leak from the side of the vapor-phase refrigerant passage 142b to the side of the liquid-phase refrigerant outlet port 141e.

Moreover, similar to the first embodiment, the outside diameter of the body part 18a can be set slightly shorter than the inside diameter of the vapor-phase refrigerant passage 142b so as to be loosely in contact with each other. In this case, a sliding friction caused when the vapor-phase refrigerant side valve member 18 moves in the vapor-phase refrigerant passage 142b does not increase.

Third Embodiment

Figure 21A:
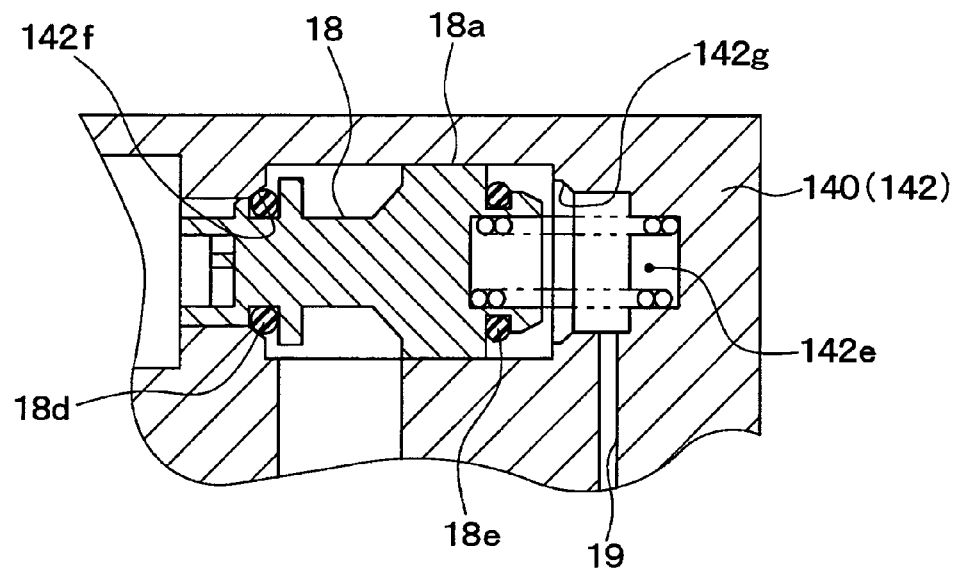
FIG. 21A is a cross-sectional view illustrating a vapor-phase refrigerant side valve member closing a vapor-phase refrigerant passage, according to a third embodiment.
Figure 21B:
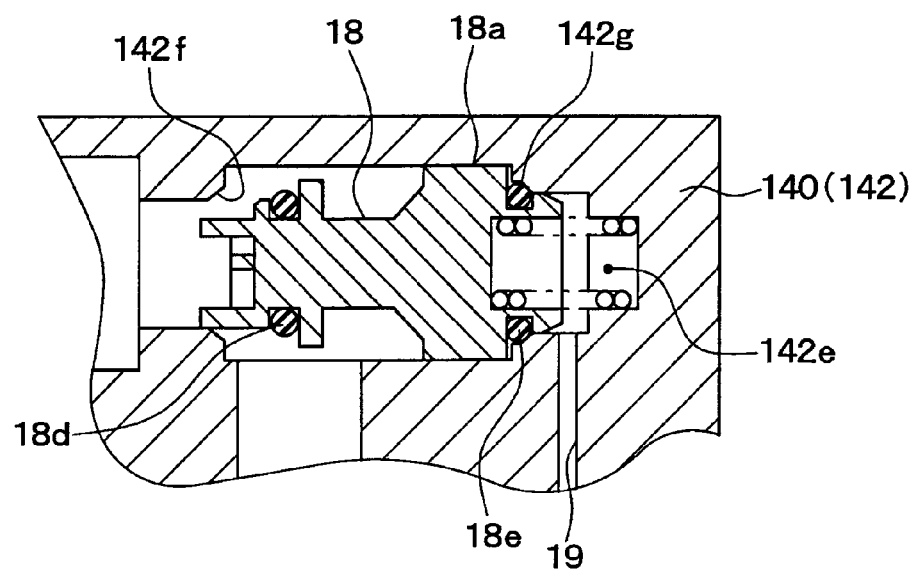
FIG. 21B is a cross-sectional view illustrating the vapor-phase refrigerant side valve member opening the vapor-phase refrigerant passage, according to the third embodiment.

As shown in FIGS. 21A and 21B, the present embodiment is an example in which a regulating member is configured by an abutting portion 142g formed in a tapered shape by reducing an inside diameter of the vapor-phase refrigerant passage 142b, and in which a sealing portion 18e is located at a side of the vapor-phase refrigerant side valve member 18, with respect to the second embodiment in which the regulating member is configured by the stopper 18c, and in which the sealing portion 18e is located at the side of the stopper 18c. FIGS. 21A and 21B correspond to FIGS. 20A and 20B, respectively.

Specifically, the vapor-phase refrigerant side valve member 18 has a tip part at the other side of the vapor-phase refrigerant side valve member 18 in the axial direction, and the tip part is formed in a shape fitting to a shape of the abutting portion 142g. The sealing portion 18e made of an O-ring having an annular shape is disposed to an outer periphery side of the tip part. Other configurations and operations are the same as the first embodiment. Accordingly, an integration valve 14 and a heat pump cycle 10 of the third embodiment can have the same effects as that of the first embodiment.

Further, by using the abutting portion 142g and the vapor-phase refrigerant side valve member 18, refrigerant can be restricted from leaking from the side of the vapor-phase refrigerant passage 142b to the side of the liquid-phase refrigerant outlet port 141e when the vapor-phase refrigerant side valve member 18 opens the vapor-phase refrigerant passage 142b. Accordingly, the present embodiment can have the same effects as that of the first embodiment.

Fourth Embodiment

Figure 22:
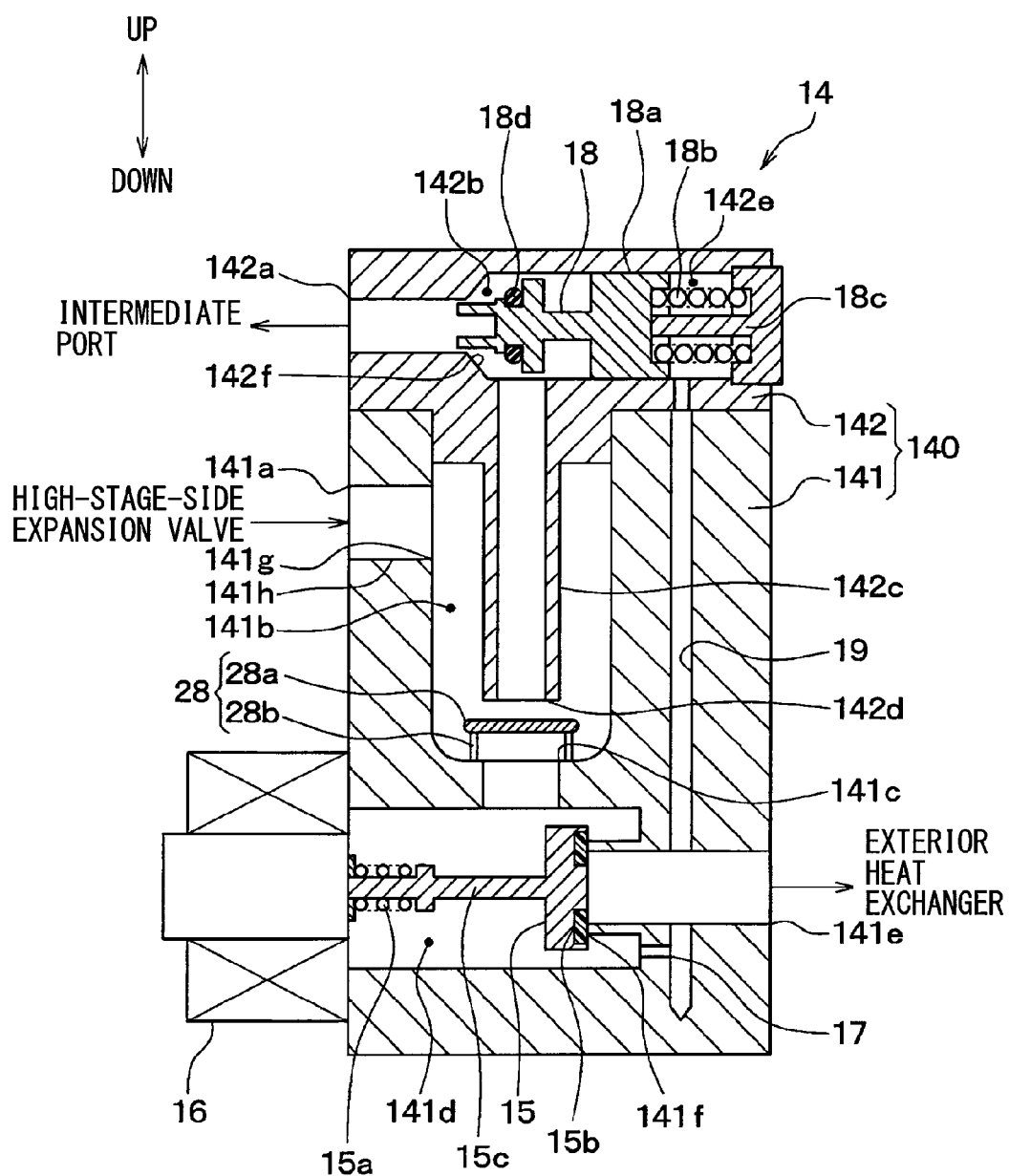
FIG. 22 is a cross-sectional view of an integration valve in a nonconductive state taken along a line extending in a top-bottom direction, according to a fourth embodiment.
Figure 23:
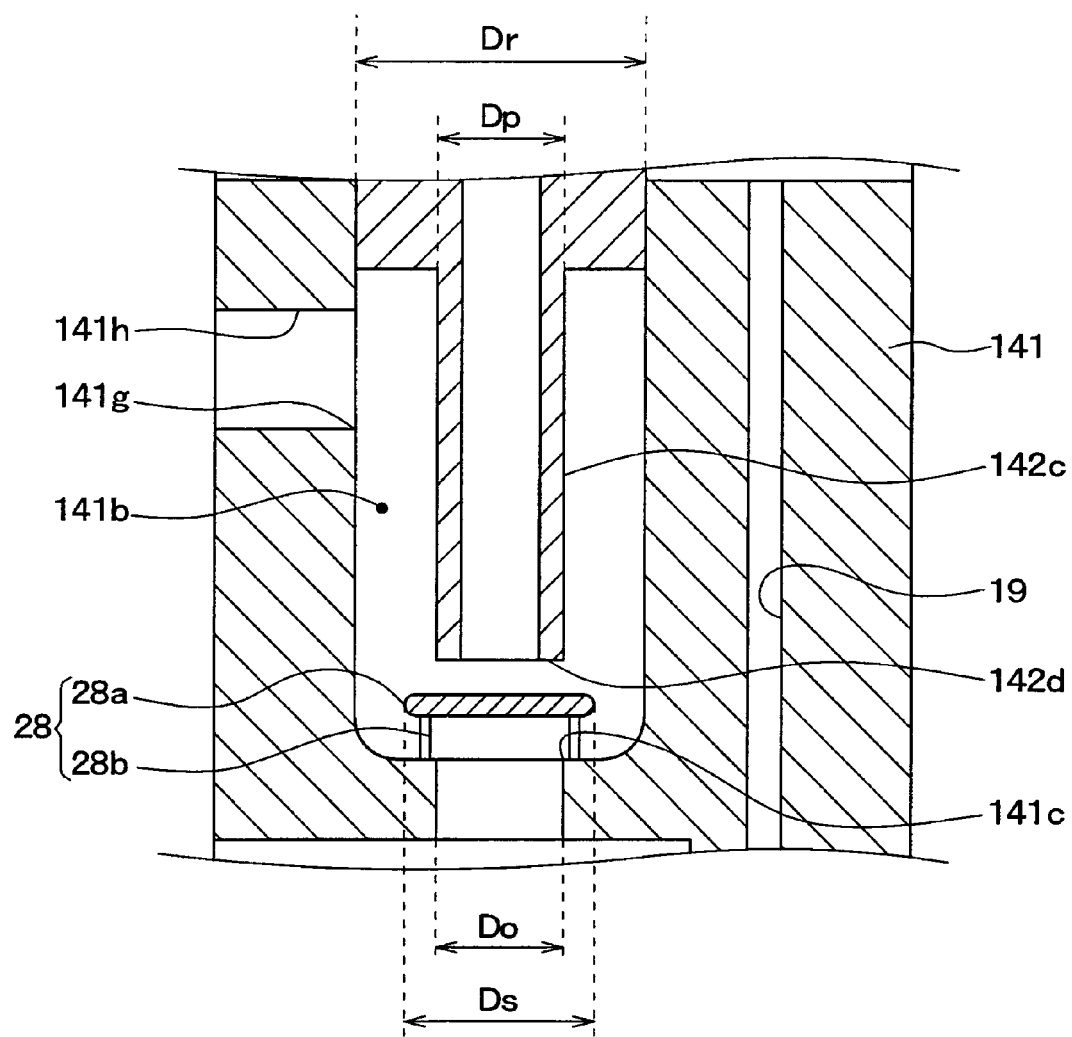
FIG. 23 is an enlarged cross-sectional view illustrating an enlarged substantial part of the integration valve taken along the line extending in the top-bottom direction, according to the fourth embodiment.

According to the present embodiment, a shutter member 28 is further disposed to the integration valve 14 as shown in cross-sectional views of FIGS. 22 and 23, with respect to the integration valve 14 of the first embodiment. The shutter member 28 restricts liquid-phase refrigerant separated in a vapor-liquid separating space 141b of a body 140 from scattering. FIG. 22 corresponds to FIG. 4 according to the first embodiment and is illustrating a cross-sectional view of the integration valve 14 in which electric force is not supplied to a solenoid 16. FIG. 23 is an enlarged cross-sectional view illustrating a vapor-liquid separating space 141b of FIG. 22.

The shutter member 28 is arranged between a separated vapor-phase refrigerant outlet hole 142d and a separated liquid-phase refrigerant outlet hole 141c. The shutter member 28 includes a flat plate portion 28a having a discoid shape extending in a direction perpendicular to an axial direction of the vapor-liquid separating space 141b and leg portions 28b connecting the flat plate portion 28a to a wall surface of the vapor-liquid separating space 141b at downward in the vapor-liquid separating space 141b. Other configuration and operations are the same as that of the first embodiment. Accordingly, the fourth embodiment can have the same effects as that of the first embodiment.

Moreover, since the integration valve 14 of the present embodiment has the shutter member 28, liquid-phase refrigerant separated in the vapor-liquid separating space 141b flows into the separated liquid-phase refrigerant outlet hole 141c via a clearance provided between the discoid flat plate portion 28a and leg portions 28b. Accordingly, liquid-phase refrigerant swirled upwardly at the separated liquid-phase refrigerant outlet hole 141c is restricted from scattering and flowing into the separated vapor-phase refrigerant outlet hole 142d.

In the result, liquid-phase refrigerant is restricted from being drawn into the compressor 11, specifically, in the high-stage-side compression mechanism, from the intermediate pressure port 11b, and the compressor 11 is restricted from causing liquid compression. The integration valve 14 of the present embodiment may have the vapor-phase refrigerant side valve member 18 and the regulating member described in the second and third embodiments.

In the present embodiment, a diameter Ds of the shutter member 28 (i.e., the flat plate portion 28a) is set to satisfy the formula F5 and the formula F6 shown below, by considering a vapor-liquid separating efficiency in the integration valve 14, and a pressure loss ΔP inside the integration valve 14 due to further using the shutter member 28.

$$Dp \leq Ds \leq (Dx+Dr)/2 \quad \text{F5}$$

$$\pi \times (Dr/2)^2 - \pi \times (Dx/2)^2 = \pi \times (Do/2)^2 \quad \text{F6}$$

Dp is a diameter (i.e., an outside diameter) of the separated vapor-phase refrigerant outlet pipe 142c, Dr is a diameter of the vapor-liquid separating space 141b, and Do is a diameter of the separated liquid-phase refrigerant outlet hole 141c. Dx is an outside diameter (i.e., an equivalent diameter) of the shutter member 28 in a state where an area (corresponding to the left side of the formula F6) of a ring-shaped part provided between the vapor-liquid separating space 141b and the shutter member 28, when being viewed in the axial direction, is equal to a cross-sectional area (corresponding to the right side of the formula F6) of the separated liquid-phase refrigerant outlet hole 141c in the radial direction. When the formula F6 is simplified, the formula F6 becomes $Dx=(Dr^2-Do^2)^{1/2}$.

Figure 24:
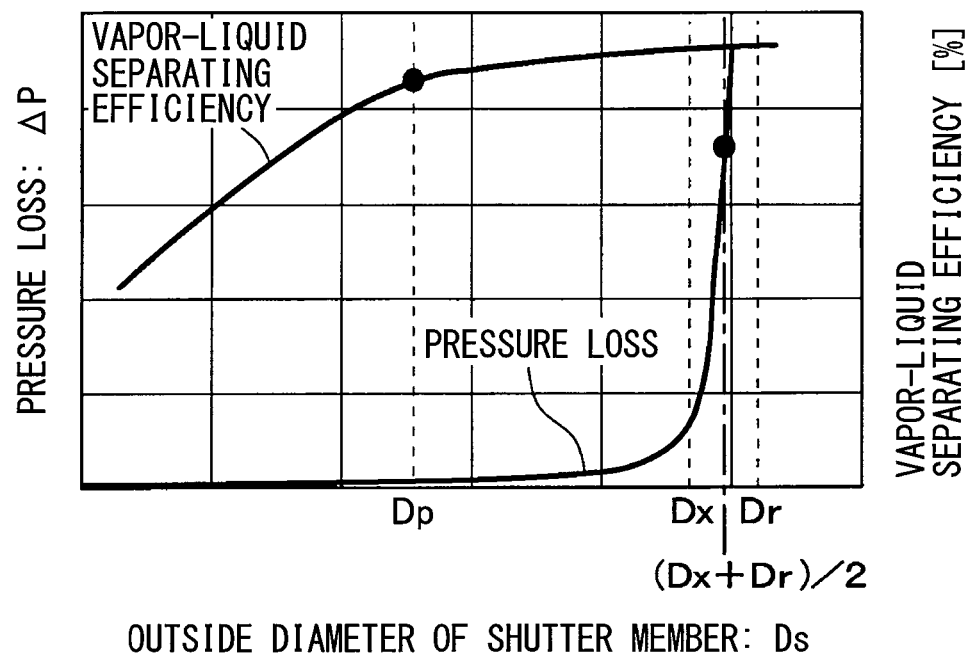
FIG. 24 is an explanatory diagram showing a vapor-liquid separating efficiency and a pressure loss in a condition where an outside diameter of a shutter member is changed.

This matter will be described referring to FIG. 24. FIG. 24 shows a variation of the pressure loss ΔP in the integration valve 14 and a variation of the vapor-liquid separating efficiency (%) in the vapor-liquid separating space 141b based on a variation of the outside diameter Ds of the shutter member 28, respectively, according to the integration valve 14 shown in FIG. 23. The pressure loss ΔP is a measured value in an operation mode in which the liquid-phase refrigerant side valve member 15 of the integration valve 14 opens the liquid-phase refrigerant passage 141d, and the vapor-phase refrigerant side valve member 18 of the integration valve 14 closes the vapor-phase refrigerant passage 142b. The vapor-liquid separating efficiency is a measured value in an operation mode in which the liquid-phase refrigerant side valve member 15 closes the liquid-phase refrigerant passage 141d, and the vapor-phase refrigerant side valve member 18 opens the vapor-phase refrigerant passage 142b.

As shown in FIG. 24, as the outside diameter Ds of the shutter member 28 decreases, the vapor-liquid separating efficiency tends to decrease. However, once the outside diameter Ds of the shutter member 28 become shorter than the diameter Dp of the separated vapor-phase refrigerant outlet pipe 142c, the vapor-liquid separating efficiency decreases drastically. Conversely, when the outside diameter Ds of the shutter member 28 is longer than the diameter Dp of the separated vapor-phase refrigerant outlet pipe 142c, the vapor-liquid separating efficiency is stably kept being high.

Therefore, in the present embodiment, a lower limit of the outside diameter Ds of the shutter member 28 is set to the diameter Dp of the separated vapor-phase refrigerant outlet pipe 142c (Dp≤Ds), by considering the vapor-liquid separating efficiency in the integration valve 14.

When the outside diameter Ds of the shutter member 28 is set extremely large, the shutter member 28 itself becomes a passage resistance between the outer periphery side of the shutter member 28 and the vapor-liquid separating space 141b, in the operation mode (e.g., the cooling operation mode) in which the liquid-phase refrigerant side valve member 15 opens the liquid-phase refrigerant passage 141d, and the vapor-phase refrigerant side valve member 18 closes the vapor-phase refrigerant passage 142b. Accordingly, a confliction of increasing the pressure loss may be caused when refrigerant passes through the outer periphery side of the shutter member 28 and the vapor-liquid separating space 141b.

Specifically, as shown in FIG. 24, the pressure loss ΔP increases drastically when the outside diameter Ds of the shutter member 28 becomes longer than the outside diameter Dx. The increase of the pressure loss ΔP inside of the integration valve 14 may cause a decrease of a system performance.

Therefore, an upper limit of the outside diameter Ds of the shutter member 28 is set to a middle value (=(Dx+Dr)/2) between the outside diameter Dx and the diameter Dr of the vapor-liquid separating space 141b by consideration of inventors of the present disclosure.

From the point of view of restricting the pressure loss ΔP inside of the integration valve 14, the upper limit of the outside diameter Ds of the shutter member 28 is set to the diameter Dx, preferably. In this case, the area of the ring-shaped part provided between the vapor-liquid separating space 141b and the shutter member 28 becomes larger than the cross-sectional area of the separated liquid-phase refrigerant outlet hole 141c in the radial direction. Accordingly, an increase of the pressure loss ΔP inside of the integration valve 14 due to further disposing the shutter member 28 can be effectively restricted.

As described above, according to the integration valve 14 of the present embodiment, the outside diameter Ds of the shutter member 28 is set by considering the vapor-liquid separating efficiency at the integration valve 14 and the pressure loss ΔP inside of the integration valve 14 due to addition of the shutter member 28. Accordingly, the pressure loss due to the shutter member 28 can be restricted, and the vapor-liquid separating efficiency inside of the integration valve 14 can be improved.

Figure 25:
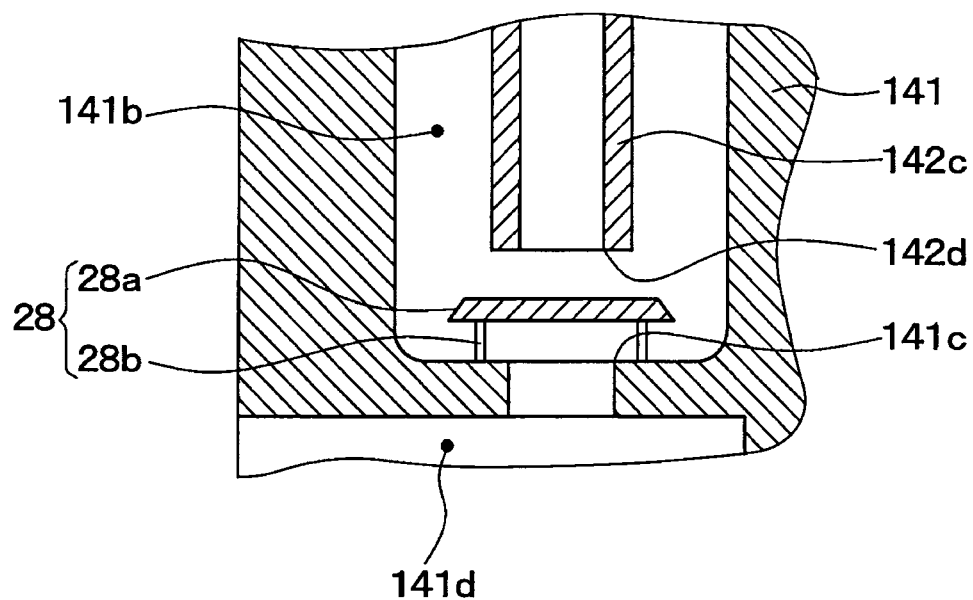
FIG. 25 is a cross-sectional view illustrating a modification in shape of the shutter member.
Figure 26:
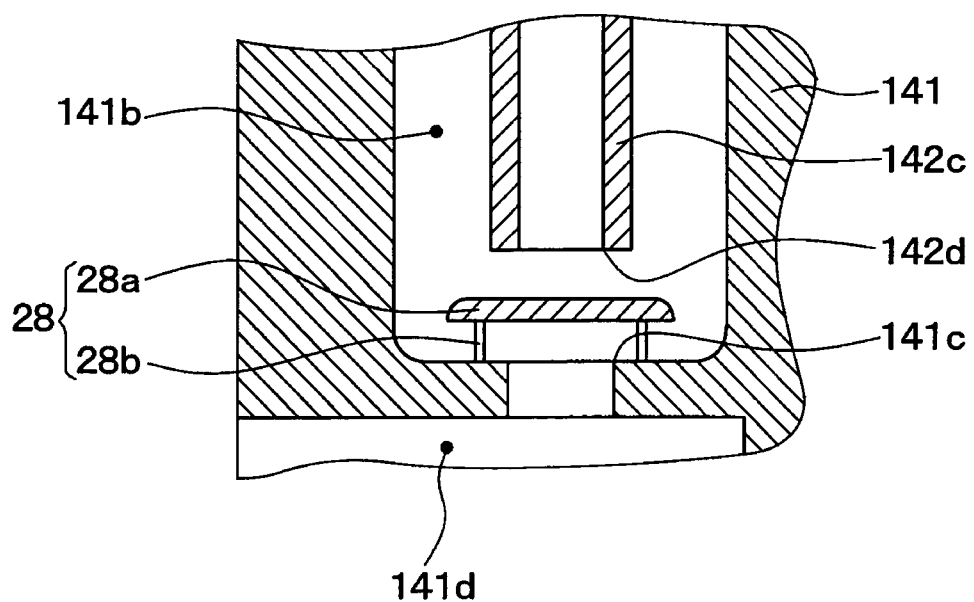
FIG. 26 is a cross-sectional view illustrating a modification in shape of the shutter member.

In the present embodiment, an example in which the flat plate portion 28a of the shutter member 28 is just made of a discoid member. However, preferably, a diameter of an outer periphery part of the shutter member 28 (i.e., the flat plate portion 28a) at a side of the separated vapor-phase refrigerant outlet hole 142d is decreases continuously from a side of the separated liquid-phase refrigerant outlet hole 141c to the side of the vapor-phase refrigerant outlet hole 142d. For example, as shown in a cross-sectional view of FIG. 25, the outer periphery part of the shutter member 28 (i.e., the flat plate portion 28a) may be formed in a tapered shape. Alternatively, as shown in a cross-sectional view of FIG. 26, the outer periphery part of the shutter member 28 (i.e., the flat plate portion 28a) may be formed in a round shape.

According to such examples, since refrigerant flows smoothly from the side of the separated vapor-phase refrigerant outlet hole 142d to the side of the separated liquid-phase refrigerant outlet hole 141c when the refrigerant flows around the shutter member 28 (i.e., the flat plate portion 28a), the pressure loss ΔP due to the shutter member 28 can be reduced.

An example of a configuration of the shutter member 28 in which the shutter member 28 is configured by (i) the flat plate portion 28a having a discoid shape and (ii) the leg portions 28b connecting the flat plate portion 28a to a wall surface of the vapor-liquid separating space 141b at downward in the vapor-liquid separating space 141b. However, a configuration of the shutter member 28 is not limited to the example.

Figure 27:
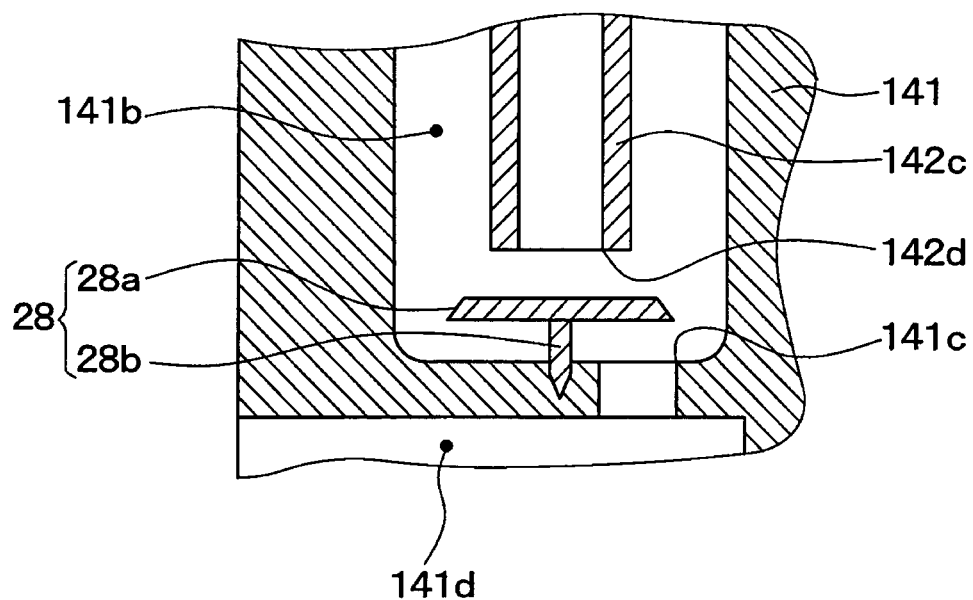
FIG. 27 is a cross-sectional view illustrating a modification in shape of the shutter member.

For example, as shown in FIG. 27, the separated liquid-phase refrigerant outlet hole 141c may be provided outward of a center of the vapor-liquid separating space 141b in the radial direction. Further, the shutter member 28 may be configured by the flat plate portion 28a and a single leg portion 28b. The single leg portion 29b is fixed to a wall surface of the lower body 141 located downward of the vapor-liquid separating space 141b in the axial direction at a radial center position of the lower body 141. By connecting the flat plate portion 28a by the single leg portion 29b, the shutter member 28 can be assembled easier.

Further, in the present embodiment, the shutter member 28 is configured by the flat plate portion 28a having a discoid shape and the leg portions 28b connecting the flat plate portion 28a to a wall surface of the vapor-liquid separating space 141b at downward in the vapor-liquid separating space 141b. However, a configuration of the shutter member 28 is not limited to that of the present embodiment.

Figure 28:
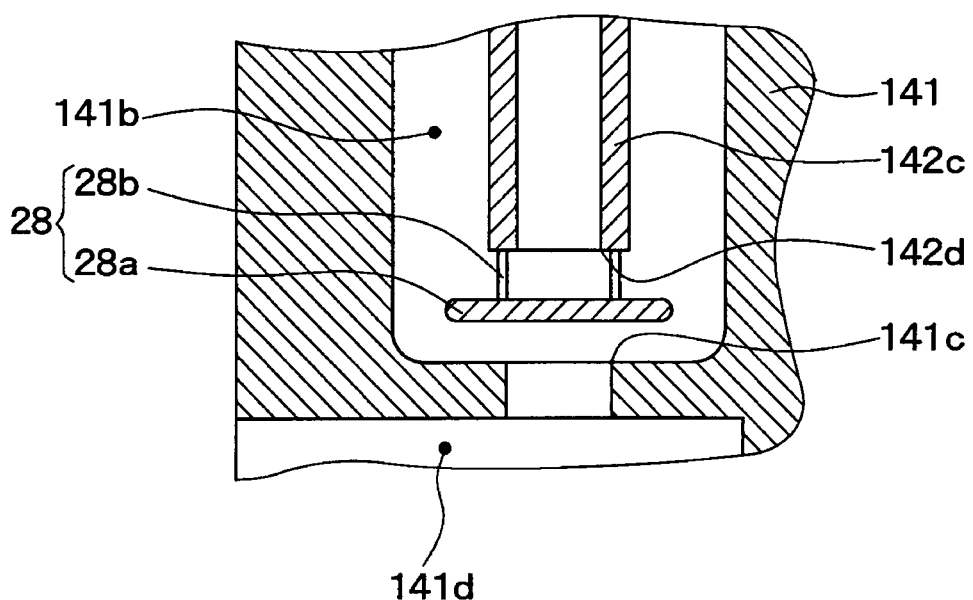
FIG. 28 is a cross-sectional view illustrating a modification in shape of the shutter member.

For example, as shown in FIG. 28, the shutter member 28 may be configured by a flat plate portion 28a having a discoid shape and leg portions 28b connecting the flat plate portion 28a to an end part (i.e., a lower end part) of the separated vapor-phase refrigerant outlet pipe 142c in the longitudinal direction.

According to such a configuration, the shutter member 28 is only fixed to the end part of the separated vapor-phase refrigerant outlet pipe 142c in the longitudinal direction. Accordingly, the shutter member 28 can be assembled easier with respect to a case where the shutter member 28 is fixed at backward (e.g., at a bottom surface in the axial direction) of the vapor-liquid separating space 141b.

Fifth Embodiment

In the above embodiments, an example in which the refrigerant passage through which liquid-phase refrigerant and vapor-phase refrigerant flows are provided in the lower body 141 and the upper body 142 made of a metal block is described. However, according to the example, a temperature difference between a temperature of refrigerant after passing the fixed throttle 17 and a temperature of refrigerant before passing the fixed throttle 17 may be large (e.g., the temperature difference is around 30° C.). In this case, there is a fear that the liquid-phase refrigerant before passing the fixed throttle 17 is cooled via the lower body 141 and the upper body 142 due to low-temperature refrigerant (i.e., vapor-liquid mixed refrigerant) after passing the fixed throttle 17. That is, when the lower body 141 and the upper body 142 are made of metallic material having generally high thermal conductivity, refrigerant before passing the fixed throttle 17 and refrigerant after passing the fixed throttle 17 exchange heat indirectly with each other via the lower body 141 and the upper body 142, and a decompression characteristic of the fixed throttle 17 may be changed. The decompression characteristic of the fixe throttle 17 is, for example, a flow characteristic of the refrigerant before passing the fixed throttle 17 and the refrigerant after passing the fixed throttle 17. Such change of the decompression characteristic of the fixed throttle 17 is not favorable because a cycle balance of the heat pump cycle 10 is affected.

According to the present embodiment, a part of the body 140 providing (i) a refrigerant passage extending from the fixed throttle 17 at a liquid-phase refrigerant passage 141d to a liquid-phase refrigerant outlet port 141e and (ii) the fixed throttle 17 is made of a material having higher thermal resistance (i.e., higher thermal conductivity) than other parts.

Figure 29:
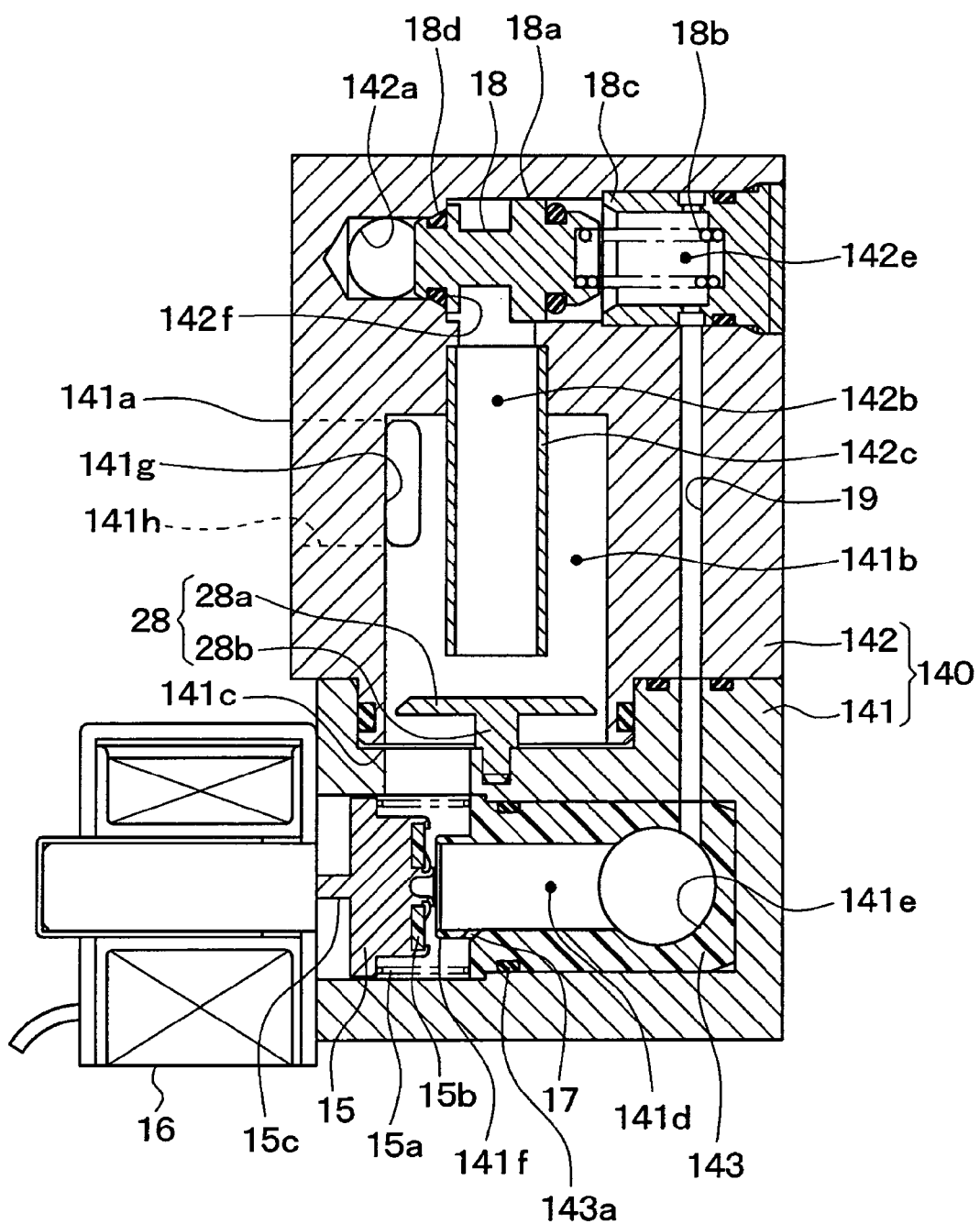
FIG. 29 is a cross-sectional view of an integration valve taken along a line extending in a top-bottom direction, according to a fifth embodiment.

A specific example of the integration valve 14 will be described referring to a cross-sectional view in FIG. 29, according to the present embodiment. As shown in FIG. 29, in the integration valve 14 of the present embodiment, a refrigerant inlet port 141a is provided at an outer surface of the sidewall of an upper body 142, and a vapor-liquid separating space 141b is provided inside of the upper body 142. A shape of the refrigerant inlet port 141a, a capacity of the vapor-liquid separating space 141b, and the like are the same as that of the first embodiment.

In a lower body 141, two bottomed hole portions extending in a direction (i.e., a horizontal direction in the present embodiment) perpendicular to an axial direction of the vapor-liquid separating space 141b are configured. The two bottomed hole portions are arranged to be perpendicular to each other and to communicate with each other at a bottom side of the lower body 141.

One of the two bottomed hole portions communicates with the vapor-liquid separating space 141b via a communication hole part provided in the radial direction of the one bottomed hole portion and has a tubular part 143 therein at a side of a bottom of the bottomed hole portion. The other bottomed hole portion has an opening part opening at an outer wall surface of the lower body 141, and the opening part provides a liquid-phase refrigerant outlet port 141e.

The tubular part 143 is made of a member having a bottomed cylindrical shape and arranged so that an axial direction of the tubular part 143 is perpendicular to the axial direction of the vapor-liquid separating space 141b. The tubular part 143 is disposed in the one bottomed hole portion. The tubular part 143 of the present embodiment is made of a resin member having higher thermal resistance (i.e., thermal conductivity) than that of a metallic member.

A liquid-phase refrigerant passage 141d is provided at an inner periphery side of the tubular portion 143, and the liquid-phase refrigerant passage 141d communicates with the liquid-phase refrigerant outlet port 141e via the other bottomed hole portion. At an opening part of the tubular part 143 at an upstream side in a flow direction of refrigerant, a protruding portion formed in an annular shape and protruding in a direction perpendicular to the axial direction of the vapor-liquid separating space 141b is configured.

On an upper end surface of the tubular part 143, a valve seat portion 141f is configured so that the valve seat portion 141f is in contact with the sealing portion 15b of the liquid-phase refrigerant side valve member 15 when the liquid-phase refrigerant side valve member 15 closes the liquid-phase refrigerant passage 141d. The valve seat portion 141f is formed in an annular shape to fit to the sealing portion 15b.

At an outer periphery side of the tubular part 143, the fixed throttle 17 is provided. When the liquid-phase refrigerant side valve member 15 closes the liquid-phase refrigerant passage 141d, refrigerant separated in the vapor-liquid separating space 141b and decompressed at the fixed throttle 17 flows to a side of the liquid-phase refrigerant outlet port 141e through the fixed throttle 17. That is, in the integration valve 14 of the present embodiment, both of (i) a part of the integration valve 14 providing a refrigerant passage extending from the fixed throttle 17 disposed at the liquid-phase refrigerant passage 141d to the liquid-phase refrigerant outlet port 141e and (ii) a part of the integration valve 14 configuring the fixed throttle 17 are provided in the tubular part 143 made of a material having higher thermal resistance than other parts.

In the other bottomed hole portion of the lower body 141, (i) the liquid-phase refrigerant side valve member 15 opens or closes the liquid-phase refrigerant passage 141d provided in the tubular part 143, (ii) a spring (i.e., an elastic member) 15a configured by a coil spring applying a load to the liquid-phase refrigerant side valve member 15 to open the liquid-phase refrigerant passage 141d, or the like are disposed.

The liquid-phase refrigerant side valve member 15 is connected to a moving part of the solenoid 16 via the shaft 15c and moved when electric force is applied to the solenoid 16. The spring 15a applies a load to the liquid-phase refrigerant side valve member 15 so that the sealing portion 15b made of resin and arranged at a tip part of the liquid-phase refrigerant side valve member 15 is distanced from the valve seat portion 141f provided at the tubular part 143.

According to the present embodiment, when an air conditioning controller 40 supplies electric force to the solenoid 16, a load is applied to the liquid-phase refrigerant side valve member 15 in a direction closing the liquid-phase refrigerant passage 141d based on electromagnetic force applied to the moving part of the solenoid 16. Accordingly, when the load due to the electromagnetic force exceeds the load due to the spring 15a, the liquid-phase refrigerant side valve member 15 is moved and closes the liquid-phase refrigerant passage 141d.

That is, the solenoid 16, the liquid-phase refrigerant side valve member 15, the valve seat portion 141f of the tubular part 143, or the like of the present embodiment configure a normal-open type solenoid valve. The solenoid 16 further functions as a closing member closing the opening part of the one bottomed hole portion of the lower body 141.

According to the present embodiment, in the first heating operation mode described in the first embodiment, an operation of the integration valve 14 is controlled so that (i) the solenoid 16 is energized, (ii) the liquid-phase refrigerant side valve member 15 closes the liquid-phase refrigerant passage 141d, and (iii) the vapor-phase refrigerant side valve member 18 opens the vapor-phase refrigerant passage 142b. In the cooling operation mode, the dehumidification and heating operation mode, and the second heating operation mode described in the first embodiment, an operation of the integration valve 14 is controlled so that (i) the solenoid 16 is un-energized, (ii) the liquid-phase refrigerant side valve member 15 opens the liquid-phase refrigerant passage 141d, and (iii) the vapor-phase refrigerant side valve member 18 closes the vapor-phase refrigerant passage 142b.

Other configurations and operations are the same as that of the first embodiment, and according to the integration valve 14 of the present embodiment, the present embodiment can have the same effects described in the first embodiment. Furthermore, the present embodiment can have further effects that will be described below.

In the integration valve 14 of the present embodiment, both of (i) a part of the integration valve 14 providing a refrigerant passage extending from the fixed throttle 17 disposed at the liquid-phase refrigerant passage 141d to the liquid-phase refrigerant outlet port 141e and (ii) a part of the integration valve 14 configuring the fixed throttle 17 are provided in the tubular part 143 made of a material having higher thermal resistance than other parts.

According to such a configuration, an indirect heat-transferring caused between refrigerant after passing through the fixed throttle 17 and refrigerant before passing through the fixed throttle 17 via the body 140 and the fixed throttle 17 is restricted. Accordingly, a change of decompression characteristic of the fixed throttle 17 is effectively restricted. In the result, a decreasing of a heat-transferring amount of a heat exchanger arranged downstream of the integration valve 14 in a flow direction of refrigerant can be restricted. Further, because a temperature fall of vapor-phase refrigerant flowing out via the vapor-phase refrigerant passage 142b due to liquid-phase refrigerant decompressed at the fixed throttle 17 is restricted, a decrease of a heating capacity of the heat pump cycle 10 functioning as a gas injection cycle can be restricted.

Although both of (i) the part of the integration valve 14 providing the refrigerant passage extending from the fixed throttle 17 disposed at the liquid-phase refrigerant passage 141d to the liquid-phase refrigerant outlet port 141e and (ii) the part of the integration valve 14 configuring the fixed throttle 17 are preferably made of a material having higher heat resistance than other parts as described in the present embodiment, it should be noted that it is just an example. For example, (i) the part of the integration valve 14 providing the refrigerant passage extending from the fixed throttle 17 disposed at the liquid-phase refrigerant passage 141d to the liquid-phase refrigerant outlet port 141e and (ii) the part of the integration valve 14 configuring the fixed throttle 17 may be made of different material, respectively, so that one of these tow parts is made of a material having higher thermal resistance than a material making the other part.

Sixth Embodiment

In a sixth embodiment, an example in which a configuration of the integration valve 14 is changed with respect to the fifth embodiment described above will be described. In the present embodiment, description about the same or equivalent matters relative to the first through fifth embodiment will be omitted or simplified.

According to the present embodiment, refrigerant flowing out of the fixed throttle 17 flows directly into a pipe connection member 144 coupling a refrigerant pipe connected to a refrigerant inlet side of the exterior heat exchanger 20 and the liquid-phase refrigerant outlet port 141e of the integration valve 14 to each other.

Figure 30:
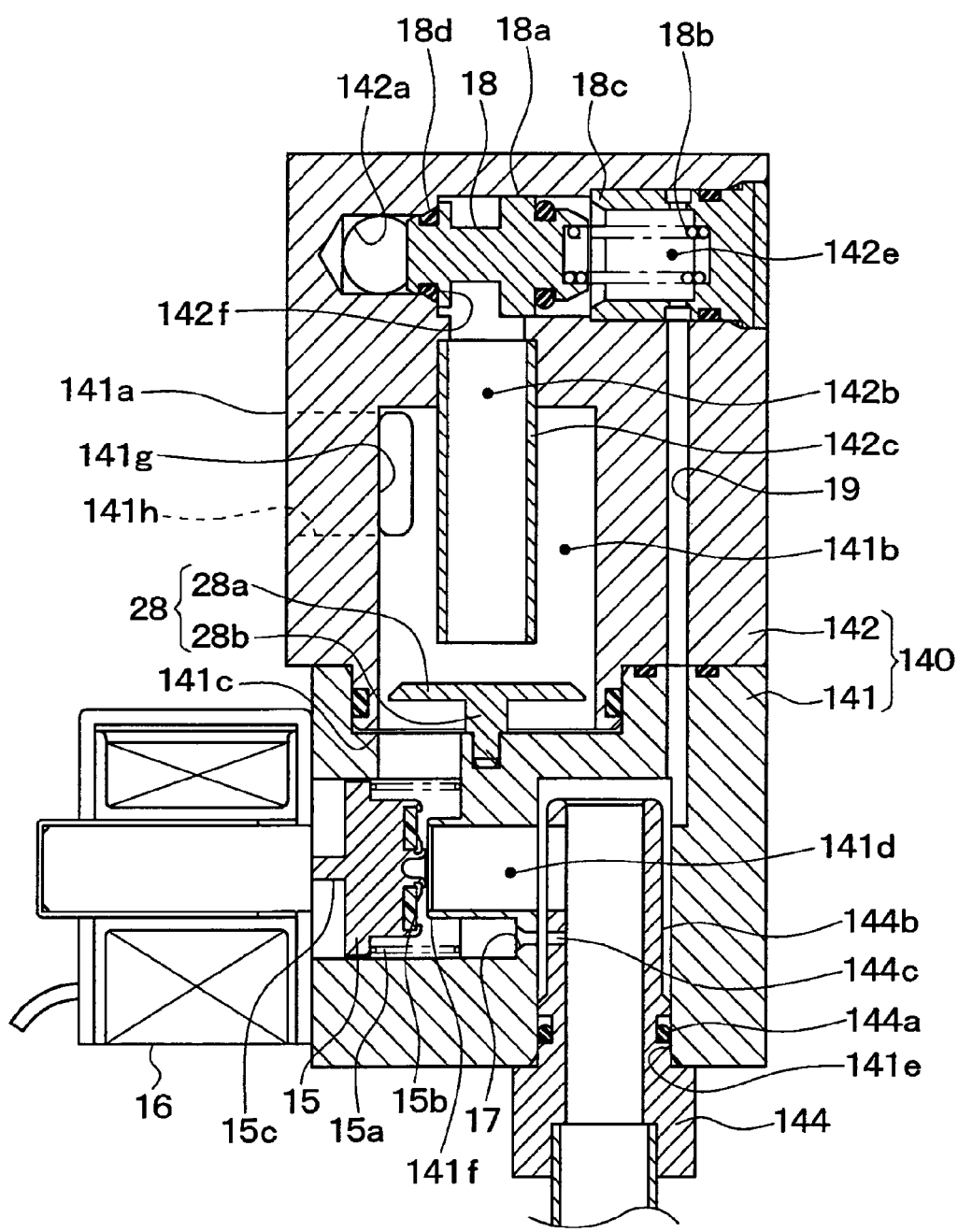
FIG. 30 is a cross-sectional view of an integration valve taken along a line extending in a top-bottom direction, according to a sixth embodiment.

A specific example of the integration valve 14 of the present embodiment will be described referring to a cross-sectional view of FIG. 30. As shown in FIG. 30, the integration valve 14 of the present embodiment has the lower body 141 in which a first bottomed hole portion extending in a direction perpendicular to an axial direction of the vapor-liquid separating space 141b and a second bottomed hole portion extending in the axial direction of the vapor-liquid separating space 141b are provided. The first bottomed hole portion and the second bottomed hole portion communicate with each other at a bottom side and function as the liquid-phase refrigerant passage 141d.

The first bottomed hole portion communicates with the vapor-liquid separating space 141b via a communication hole part provided in a radial direction of the first bottomed hole portion. In the first bottomed hole portion, the liquid-phase refrigerant side valve member 15 opening or closing the liquid-phase refrigerant passage 141d, the spring (i.e., an elastic member) 15a, or the like are disposed. The fixed throttle 17 is disposed at a downward side of the first bottomed hole portion. When the liquid-phase refrigerant side valve member 15 closes the liquid-phase refrigerant passage 141d, the fixed throttle 17 decompresses liquid-phase refrigerant separated in the vapor-liquid separating space 141b, and the decompressed liquid-phase refrigerant flows to a side of a liquid-phase refrigerant outlet port 141e. The fixed throttle 17 of the present embodiment is configured by a communication hole part extending in the direction perpendicular to the axial direction of the vapor-liquid separating space 141b. In the present embodiment, the tubular part 143 of the fifth embodiment is not used, and the liquid-phase refrigerant passage 141d and the fixed throttle 17 are provided in the lower body 141.

The second bottomed hole portion is connected with the pipe connection member 144 coupling the refrigerant pipe connected to the refrigerant inlet side of the external heat exchanger 20 and the liquid-phase refrigerant outlet port 141e of the integration valve 14.

The pipe connection member 144 is made of a metallic material formed in a cylindrical shape extending in the axial direction of the vapor-liquid separating space 141b. The pipe connection member 144 is fastened to the liquid-phase refrigerant outlet port 141e located at a lowermost part of the body 140 via a searing member (e.g., an O-ring) 144a made of resin.

An outside diameter of the pipe connection member 144 is reduced so that a part of the pipe connection member 144 upward of a sealing portion 144a is not in contact with the lower body 141. That is, a clearance is provided between a diameter-reduced part 144b of the pipe connection member 144 and the lower body 141 so as to restrict direct heat-transferring.

At a part of the diameter-reduced part 144b opposing to the fixed throttle 17, a communication hole part 144c is provided so that refrigerant flowing out of the fixed throttle 17 flows directly into the pipe connection member 144.

Other configurations and operations are the same as that of the first embodiment, and according to the integration valve 14 of the present embodiment, the present embodiment can have the same effects described in the first embodiment and further effects which will be described below.

The integration valve 14 of the present embodiment has a configuration in which the refrigerant flowing out of the fixed throttle 17 flows directly into the pipe connection member 144 via the communication hole part 144c provided at the diameter-reduced part 144b of the pipe connection member 144 configured not to be in contact with the lower body 141.

According to such a configuration, indirect heat-transferring, via the body 140 and the fixed throttle 17, between the refrigerant after passing through the fixed throttle 17 and the refrigerant before passing through the fixed throttle is restricted. Accordingly, a change of decompression characteristic of the fixed throttle 17 is effectively restricted. In the result, a decreasing of a heat-transferring amount of a het exchanger arranged downstream of the integration valve 14 in a flow direction of refrigerant can be restricted. Further, because a temperature fall of vapor-phase refrigerant flowing out via the vapor-phase refrigerant passage 142b due to liquid-phase refrigerant decompressed at the fixed throttle 17 is restricted, a decrease of a heating capacity of the heat pump cycle 10 functioning as a gas injection cycle can be restricted.

Seventh Embodiment

In a seventh embodiment, an example in which a configuration of the integration valve 14 is changed with respect to the sixth embodiment described above will be described. In the present embodiment, description about the same or equivalent matters relative to the first through sixth embodiment will be omitted or simplified.

According to the present embodiment, a flow direction of refrigerant flowing out of the fixed throttle 17 is the same as a flow direction of refrigerant flowing thorough a refrigerant passage extending from the fixed throttle 17 at the liquid-phase refrigerant passage 141d to the liquid-phase refrigerant outlet port 141e. Accordingly, refrigerant flowing out of the fixed throttle 17 flows directly into the pipe connection member 144.

Figure 31:
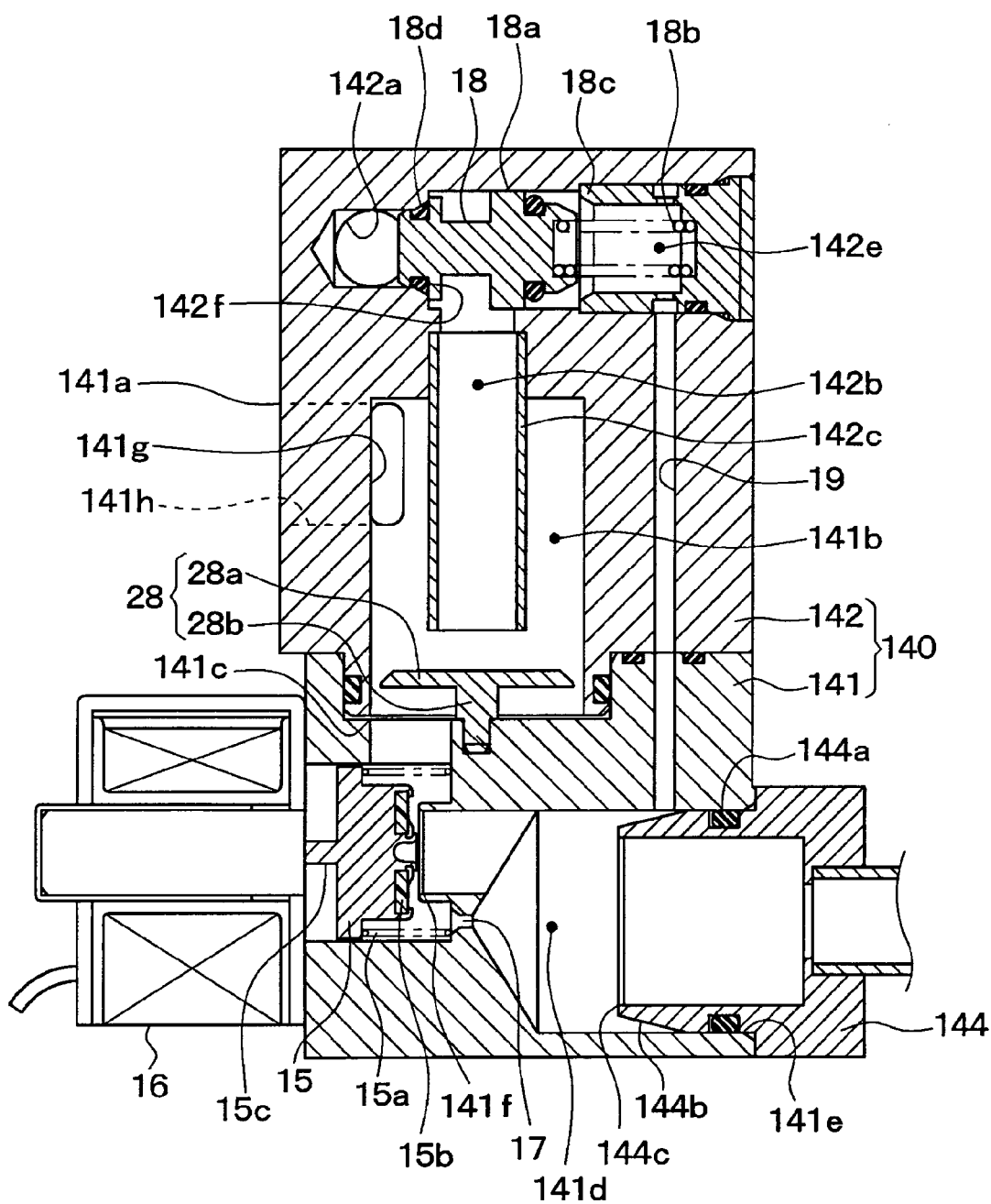
FIG. 31 is a cross-sectional view of an integration valve taken along a line extending in a top-bottom direction, according to a seventh embodiment.

A specific example of the integration valve 14 of the present embodiment will be described referring to a cross-sectional view of FIG. 31. As shown in FIG. 31, the integration valve 14 of the present embodiment has the lower body 141 in which a through hole extending in a direction perpendicular to an axial direction of the vapor-liquid separating space 141b is provided. The through hole communicates with the vapor-liquid separating space 141b via a communication hole part provided in a radial direction of the through hole and functions as the liquid-phase refrigerant passage 141d. In the through hole, (i) the liquid-phase refrigerant side valve member 15 opening or closing the liquid-phase refrigerant passage 141d, (ii) the spring (i.e., an elastic member) 15, or the like are disposed. At an axial center part of the through hole, the fixed throttle 17 is arranged so that (i) liquid-phase refrigerant separated in the vapor-liquid separating space 141b is decompressed at the fixed throttle 17, and (ii) the decompressed liquid-phase refrigerant flows to a side of the liquid-phase refrigerant outlet port 141e, when the liquid-phase refrigerant side valve member 15 closes the liquid-phase refrigerant passage 141d.

The pipe connection member 144 is connected to one end side of the through hole. The pipe connection member 144 of the present embodiment is made of a metallic material formed in a cylindrical shape extending in the direction perpendicular to the axial direction of the vapor-liquid separating space 141b. The pipe connection member 144 is arranged so that an axial center part of the pipe connection member 144 is coaxial with an axial direction of the fixed throttle 17. An inside diameter of the pipe connection member 144 is enlarged so that the axial center part of the pipe connection member 144 overlaps in location with both a hole part of the fixed throttle 17 and the liquid-phase refrigerant passage 141d.

Other configurations and operations are the same as that of the first embodiment, and according to the integration valve 14 of the present embodiment, the present embodiment can have the same effects as the first embodiment and further effects that will be described below.

In the integration valve 14 of the present embodiment, the flow direction of refrigerant flowing out of the fixed throttle 17 is the same as the flow direction of refrigerant flowing thorough the refrigerant passage extending from the fixed throttle 17 at the liquid-phase refrigerant passage 141d to the liquid-phase refrigerant outlet port 141e.

Accordingly, refrigerant flowing out of the fixed throttle 17 flows directly into the pipe connection member 144 through a communication hole part 144c provided at a diameter-reduced part 144b of the pipe connection member 144 configured not to be in contact with the lower body 141. In the result, indirect heat-transferring, via the body 140 and the fixed throttle 17, between the refrigerant after passing through the fixed throttle 17 and the refrigerant before passing through the fixed throttle is restricted. Further, a change of decompression characteristic of the fixed throttle 17 is effectively restricted. Therefore, a decreasing of a heat-transferring amount of a het exchanger arranged downstream of the integration valve 14 in a flow direction of refrigerant can be restricted. Moreover, because a temperature fall of vapor-phase refrigerant flowing out via the vapor-phase refrigerant passage 142b due to liquid-phase refrigerant decompressed at the fixed throttle 17 is restricted, a decrease of a heating capacity of the heat pump cycle 10 functioning as a gas injection cycle can be restricted.

Eighth Embodiment

In an eighth embodiment, an example in which a configuration of the integration valve 14 is changed with respect to the fifth embodiment described above will be described. In the present embodiment, description about the same or equivalent matters relative to the first through seventh embodiment will be omitted or simplified.

In the body 140 of the integration valve 14 of the present embodiment, (i) a cross-sectional area of a part providing a refrigerant passage extending from the vapor-liquid separating space 141b to the fixed throttle 17 and (ii) a cross-sectional area of a part providing a refrigerant passage extending from the fixed throttle 17 to the liquid-phase refrigerant outlet port 141e are smaller than other parts of the refrigerant passage so as to have a higher thermal resistance than other parts.

Figure 32:
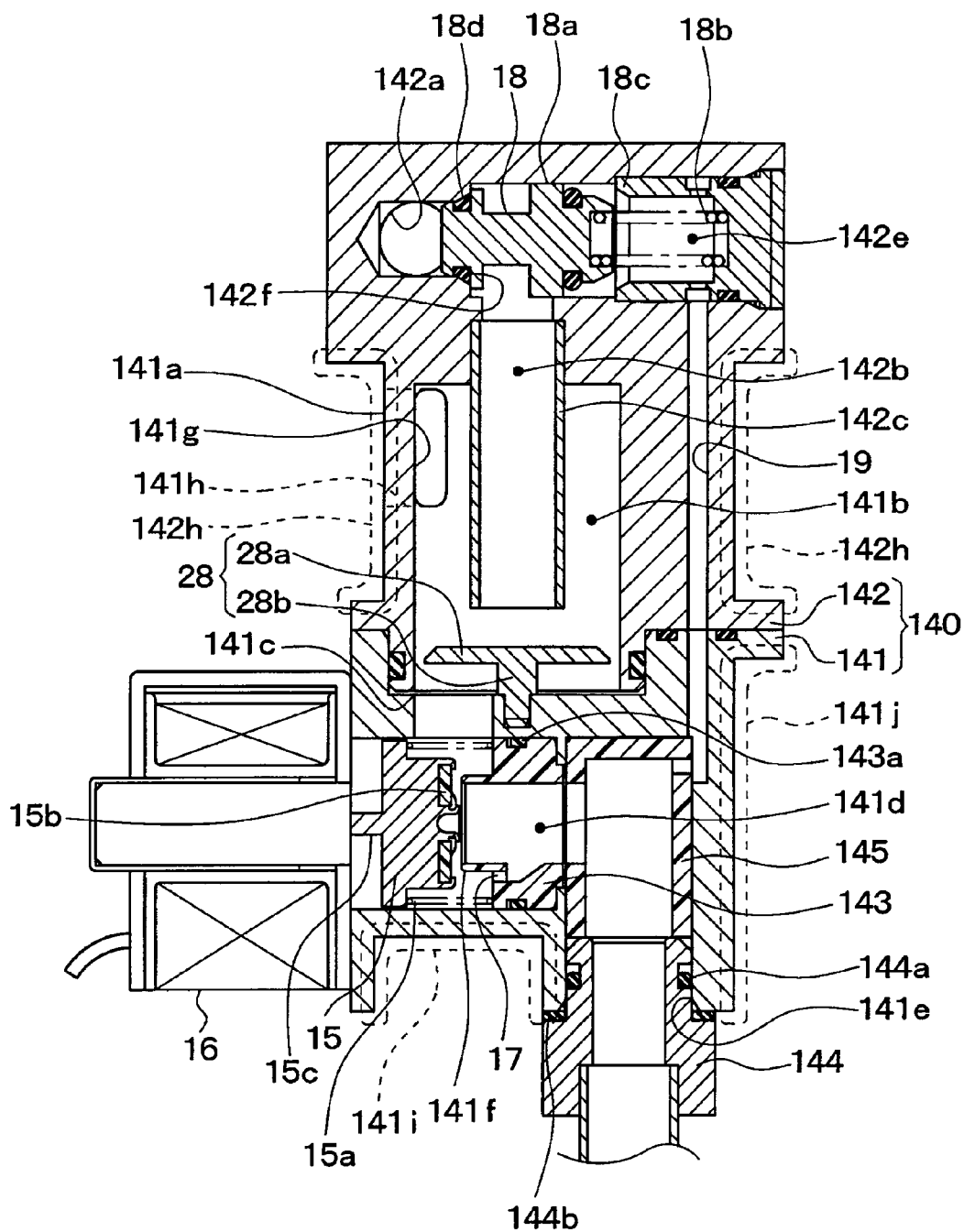
FIG. 32 is a cross-sectional view of an integration valve taken along a line extending in a top-bottom direction, according to an eighth embodiment.

A specific example of the integration valve 14 of the present embodiment will be described referring to a cross-sectional view in FIG. 32. As shown in FIG. 32, in the integration valve 14 of the present embodiment, a recess part 142h is provided on an outer periphery of a sidewall of the upper body 142 by putting a dent radial-inward on the outer periphery of the sidewall of the upper body 142. The outer side of the sidewall of the upper body 142 having the recess part 142h corresponds to a part of the upper body 142 providing the vapor-liquid separating space 141b. By providing the recess part 142h, a thickness (i.e., a cross-sectional area) of the part providing the refrigerant passage extending from the vapor-liquid separating space 141b to the fixed throttle 17 is smaller than that of other parts of the upper body 142. That is, by the recess part 142h provided on the outer periphery of the sidewall of the upper body 142, a thermal resistance at the part providing the refrigerant passage extending from the vapor-liquid separating space 141b to the fixed throttle 17 is higher than other parts of the upper body 142.

Further, in the lower body 141 of the present embodiment, a first bottomed hole portion extending in a direction perpendicular to an axial direction of the vapor-liquid separating space 141b and a second bottomed hole portion extending in the axial direction of the vapor-liquid separating space 141b are provided. The first bottomed hole portion and the second bottomed hole portion are provided to communicate with each other at a bottom side and function as the liquid-phase refrigerant passage 141d.

The first bottomed hole portion communicates with the vapor-liquid separating space 141b via a communication hole part provided in a radial direction of the first bottomed hole portion. In the first bottomed hole portion, the liquid-phase refrigerant side valve member 15 opening or closing the liquid-phase refrigerant passage 141d provided inside the first bottomed hole portion, the spring (i.e., an elastic member) 15a, the tubular part 143 in which the liquid-phase refrigerant passage 141d and the fixed throttle 17 are provided, or the like are disposed.

In the second bottomed hole portion, an insert member 145 having a cylindrical shape is disposed at the bottom side of the second bottomed hole portion, and the pipe connection member 144 coupling a refrigerant pipe, which is connected to a refrigerant inlet side of the exterior heat exchanger 20, to an opening side of the second bottomed hole portion.

Inside of the insert member 145 provides a part of the liquid-phase refrigerant passage 141d through which refrigerant flows and is made of a resin member having high thermal resistance to restrict heat-transferring between the lower body 141 and refrigerant after passing through the lower body 141 and the fixed throttle 17.

The pipe connection member 144 is made of a metallic member formed in a cylindrical shape and extending in the axial direction of the vapor-liquid separating space 141b. The pipe connection member 144 is fastened to the liquid-phase refrigerant outlet port 141e located at a lowermost end of the body 140 via a sealing member (e.g., an O-ring) made of resin.

The pipe connection member 144 of the present embodiment is fastened to abut to a periphery of the liquid-phase refrigerant outlet port 141e via a packing made of resin having high thermal resistance to restrict a heat-transferring between refrigerant after passing through the fixed throttle 17 and the lower body 141.

The lower body 141 of the present embodiment has a recess part 141i at a bottom part corresponding to a part in which the tubular part 143 is disposed, and the recess part 141i is provided by putting a dent inwardly in the axial direction. Further, The lower body 141 has a recess part 141j at an outer periphery corresponding to a part, in which the insert member 145 in which the liquid-phase refrigerant passage 141d is provided and the pipe connection member 144 are disposed, and the recess part 141*j* is provided by putting a dent inwardly in the radial direction.

By providing the recess part 141*i* and the recess part 141*j*, the thickness (i.e., a cross-sectional area) of the part providing the refrigerant passage extending from the fixed throttle 17 to the liquid-phase refrigerant outlet port 141*e* is smaller than a thickness of other parts. That is, by providing the recess part 141*i* and the recess part 141*j* at the outer periphery of the lower body 141, thermal resistance of the part providing the refrigerant passage extending from the fixed throttle 17 to the liquid-phase refrigerant outlet port 141*e* is higher than that of other parts.

Other configurations and operations are the same as the first embodiment, and according to the integration valve 14 of the present embodiment, the present embodiment can have the same effects described in the first embodiment and further effects that will be described below.

In the integration valve 14 of the present embodiment, both (i) the part of the liquid-phase refrigerant passage 141*d* providing the refrigerant passage extending from the fixed throttle 17 to the liquid-phase refrigerant outlet port 141*e* and (ii) the part of the liquid-phase refrigerant passage 141*d* providing the fixed throttle 17 are provided in the tubular par 143 made of resin and the insert member 145, having higher thermal resistance than other parts.

Moreover, by providing the recess part 141*i*, the recess part 141*j*, and the recess part 142*h* at the body 140, (i) the cross-sectional area of the part providing the refrigerant passage extending from the vapor-liquid separating space 141*b* to the fixed throttle 17 and (ii) the cross-sectional area of the part providing the refrigerant passage extending from the fixed throttle 17 to the liquid-phase refrigerant outlet port 141*e* are smaller than other parts of the refrigerant passage so as to have higher thermal resistance than other parts.

Therefore, indirect heat-transferring, via the body 140 and the fixed throttle 17, between the refrigerant after passing through the fixed throttle 17 and the refrigerant before passing through the fixed throttle is restricted. Further, a change of decompression characteristic of the fixed throttle 17 is effectively restricted. Therefore, a decreasing of a heat-transferring amount of a het exchanger arranged downstream of the integration valve 14 in a flow direction of refrigerant can be restricted. Moreover, because a temperature fall of vapor-phase refrigerant flowing out via the vapor-phase refrigerant passage 142*b* due to liquid-phase refrigerant decompressed at the fixed throttle 17 is restricted, a decrease of a heating capacity of the heat pump cycle 10 functioning as a gas injection cycle can be restricted.

The recess part 141*i*, the recess part 141*j*, and the recess part 142*h* are preferably provided at both the outer periphery of the lower body 141 and the outer periphery of the upper body 142 as the present embodiment. However, the recess part 141*i*, the recess part 141*j*, and the recess part 142*h* may be provided one of the outer periphery of the lower body 141 and the outer periphery of the upper body 142.

Other Modifications

The present disclosure is not limited to the above embodiments and can be modified as described below without departing the scope of the present disclosure.

(1) In the above embodiments, an example in which the heat pump cycle 10 of the present disclosure is used in the vehicle air conditioner 1 for an electric vehicle is described. However, the heat pump cycle 10 may be effective for using in a vehicle, such as a hybrid vehicle getting a driving force for a vehicle driving from an engine (i.e., an internal combustion engine) and an electric motor, in which exhaust heat of the engine is not enough as a heat source for heating.

Moreover, the heat pump cycle 10 may be used in, for example, a stationary air conditioner, a container in which air therein is kept at a cool temperature, a liquid heating device, or the like. When the heat pump cycle 10 is employed in the liquid heating device, a liquid-refrigerant heat exchanger may be used as a using side heat exchanger, and a flow amount regulating part may be a liquid pump or a flow regulating valve, which regulates a flow amount of liquid flowing into the liquid-refrigerant heat exchanger.

Although a refrigerant circuit is switched so that the heat pump cycle 10 performs various operation modes in the above embodiments, a heat pump cycle functioning simply as a gas injection cycle can be easily configured, for example, when the integration valve 14 of the first through fourth embodiments are used and the solenoid 16 is not energized.

(2) Although the liquid-phase refrigerant side valve member 15 and the vapor-phase refrigerant side valve member 18 can be made of metal according to the above embodiments, the liquid-phase refrigerant side valve member 15 and the vapor-phase refrigerant side valve member 18 may be made of resin. Specifically, by making the vapor-phase refrigerant side valve member 18 configuring a differential pressure regulating valve, the vapor-phase refrigerant side valve member 18 can be lighter in weight, and a failure of operation can be restricted. Further, the stopper 18*c*, the shutter member 28, the tubular part 143, or the like can be made of meal or resin.

(3) Although the body 140 has a generally cylindrical-shaped exterior in the above embodiments, the exterior shape of the body 140 is not limited to this example and may be a rectangular column shape. Further, by employing an exterior shape adapted to a mounting space in an object to be mounted, mountability of an entire heat pump cycle in the object can be greatly improved.

(4) Although the vapor-liquid separating space 141*b* of the body 140 is arranged so that the axial direction of the vapor-liquid separating space 141*b* is parallel with the vertical direction, the axial direction of the vapor-liquid separating space 141*b* is unnecessary to be coincide with the vertical direction. For example, in the heat pump cycle 10 mounted in a vehicle or the like, the axial direction of the vapor-liquid separating space 141*b* may be misaligned from the vertical direction when whole of the vehicle leans in a driving time.

In this case, based on an assuming result of a mounted state of the integration valve 14 assumed from a tilt of an entire of the vehicle or the like, (i) the liquid-phase refrigerant passage 141*d* and the fixed throttle 17 are arranged downward of the separated vapor-phase refrigerant outlet hole 142*d*, and (ii) the vapor-phase refrigerant passage 142*b* is arranged upward of the separated vapor-phase refrigerant outlet hole 142*d*.

(5) In the first thorough fourth embodiments, an example in which a normal-close type solenoid valve is configured by the solenoid 16, the liquid-phase refrigerant side valve member 15, and the valve seat 141*f* of the liquid-phase refrigerant passage 141*d*, or the like, is described. However, a normal-open type solenoid valve, in which the liquid-phase refrigerant side valve member 15 opens the liquid-phase refrigerant passage 141*d* when the solenoid 16 is un-energized, may be configured.

In the fifth through eighth embodiments, an example, in which a normal-open type solenoid valve is configured by the solenoid 16, the liquid-phase refrigerant side valve member 15, or the like, is described. However, a normal-close type solenoid valve, in which the liquid-phase refrigerant side valve member 15 closes the liquid-phase refrigerant passage 141*d* when the solenoid 16 is energized, may be configured.

Further, a solenoid valve may be a pilot type solenoid valve in which (i) a small valve member (i.e., a pilot valve) is moved by a solenoid actuator operated by generally small electric force, and (ii) a main valve (e.g., the liquid-phase refrigerant side valve member 15 in the above embodiments) is operated by a pressure difference due to a movement of the small valve member.

(6) In the fifth through eighth embodiments, an example in which the shutter member 28 is disposed in the vapor-liquid separating space 141*b* is described. However, the shutter member 28 may not be necessary and may be omitted.

(7) In the above embodiments and modifications, at least drawings referred to describe the integration valve 14 show specific examples of the integration valve 14, and it should be noted that configurations of the integration valve 14 is not limited to the specific examples. Various configurations of the integration valve 14 shown in those drawings can be combined as far as there is no harm in the combination.

What is claimed is:

1. An integration valve for a heat pump cycle having a compressor compressing and discharging refrigerant, the integration valve comprising:
    a body provided with (i) a refrigerant inlet port to which refrigerant discharged from the compressor flows, (ii) a vapor-liquid separating space separating refrigerant flowing from the refrigerant inlet port into vapor-phase refrigerant and liquid-phase refrigerant, (iii) a vapor-phase refrigerant outlet port through which vapor-phase refrigerant separated in the vapor-liquid separating space flows, and (iv) a liquid-phase refrigerant outlet port through which liquid-phase refrigerant separated in the vapor-liquid separating space flows;
    a liquid-phase refrigerant side valve member opening or closing a liquid-phase refrigerant passage extending from the vapor-liquid separating space to the liquid-phase refrigerant outlet port;
    a fixed throttle decompressing liquid-phase refrigerant and passing the decompressed liquid-phase refrigerant to a side of the liquid-phase refrigerant outlet port, when the liquid-phase refrigerant side valve member closes the liquid-phase refrigerant passage; and
    a vapor-phase refrigerant side valve member opening or closing a vapor-phase refrigerant passage extending from the vapor-liquid separating space to the vapor-phase refrigerant outlet port, wherein
    the liquid-phase refrigerant side valve member is located downstream of the vapor-liquid separating space,
    the liquid-phase refrigerant side valve member, the fixed throttle, and the vapor-phase refrigerant side valve member are housed in the body, and
    the vapor-phase refrigerant side valve member is configured by a differential pressure regulating valve movable based on a pressure difference between a refrigerant pressure at a side of the liquid-phase refrigerant outlet port and a refrigerant pressure at a side of the vapor-phase refrigerant passage.

2. The integration valve according to claim 1, wherein the vapor-phase refrigerant side valve member is configured by the differential pressure regulating valve in which the vapor-phase refrigerant passage is open when a refrigerant pressure at the side of the liquid-phase refrigerant outlet port is lower than a refrigerant pressure at the side of the vapor-phase refrigerant passage.

3. The integration valve according to claim 1, wherein the body has therein a pressure introducing passage through which a pressure of refrigerant at the side of the liquid-phase refrigerant outlet port is applied to the vapor-phase refrigerant side valve member.

4. The integration valve according to claim 1, further comprising
    an electromagnetic mechanism operating a moving of the liquid-phase refrigerant side valve member due to electric force supplied thereto.

5. The integration valve according to claim 1, wherein the liquid-phase refrigerant passage and the fixed throttle are arranged downward of a separated vapor-phase refrigerant outlet hole through which vapor-phase refrigerant flows from the vapor-liquid separating space to the side of the vapor-phase refrigerant passage.

6. The integration valve according to claim 1, wherein the vapor-phase refrigerant passage is arranged upward of a separated vapor-phase refrigerant outlet hole through which vapor-phase refrigerant flows from the vapor-liquid separating space to the side of the vapor-phase refrigerant passage.

7. The integration valve according to claim 1, further comprising:
    a regulating member regulating a movement of the vapor-phase refrigerant side valve member by abutting to the vapor-phase refrigerant side valve member when the vapor-phase refrigerant side valve member opens the vapor-phase refrigerant passage; and
    a sealing member which restricts refrigerant from leaking through a contact part at which the vapor-phase refrigerant side valve member and the regulating member abut to each other, the sealing member being disposed on at least one side of the vapor-phase refrigerant side valve member or the regulating member.

8. The integration valve according to claim 1, wherein the body is provided with a separated liquid-phase refrigerant outlet hole through which liquid-phase refrigerant flows from the vapor-liquid separating space to a side of the liquid-phase refrigerant passage, and
    a flow direction of liquid-phase refrigerant flowing out of the separated liquid-phase refrigerant outlet hole is different from a flow direction of refrigerant flowing in the liquid-phase refrigerant passage.

9. The integration valve according to claim 1, wherein the vapor-liquid separating space is formed in a cylindrical shape, and
    the vapor-liquid separating space is configured to separate vapor-phase refrigerant and liquid-phase refrigerant from each other by using a centrifugal force in the vapor-liquid separating space.

10. The integration valve according to claim 1, wherein at least a part of the body providing a refrigerant passage extending from the fixed throttle at the liquid-phase refrigerant passage to the liquid-phase refrigerant outlet port or a part of the body providing the fixed throttle is made of a material having higher thermal resistance than other parts.

11. The integration valve according to claim 1, wherein a flow direction of refrigerant flowing out of the fixed throttle is the same as a flow direction of refrigerant flowing through the refrigerant passage extending from the fixed throttle at the liquid-phase refrigerant passage to the liquid-phase refrigerant outlet port.

12. The integration valve according to claim 1, wherein at least (i) a part of the body providing a refrigerant passage extending from the vapor-liquid separating space to the fixed throttle and (ii) the part of the body providing the refrigerant passage extending from the fixed throttle to the liquid-phase refrigerant outlet port has a cross-sectional area smaller than other part of the body so as to be higher in thermal resistance.

13. An integration valve for a heat pump cycle having a compressor compressing and discharging refrigerant, the integration valve comprising:
a body provided with (i) a refrigerant inlet port to which refrigerant discharged from the compressor flows, (ii) a vapor-liquid separating space separating refrigerant flowing from the refrigerant inlet port into vapor-phase refrigerant and liquid-phase refrigerant, (iii) a vapor-phase refrigerant outlet port through which vapor-phase refrigerant separated in the vapor-liquid separating space flows, and (iv) a liquid-phase refrigerant outlet port through which liquid-phase refrigerant separated in the vapor-liquid separating space flows;
a liquid-phase refrigerant side valve member opening or closing a liquid-phase refrigerant passage extending from the vapor-liquid separating space to the liquid-phase refrigerant outlet port;
a fixed throttle decompressing liquid-phase refrigerant and passing the decompressed liquid-phase refrigerant to a side of the liquid-phase refrigerant outlet port, when the liquid-phase refrigerant side valve member closes the liquid-phase refrigerant passage; and
a vapor-phase refrigerant side valve member opening or closing a vapor-phase refrigerant passage extending from the vapor-liquid separating space to the vapor-phase refrigerant outlet port, wherein
the liquid-phase refrigerant side valve member, the fixed throttle, and the vapor-phase refrigerant side valve member are housed in the body,
the vapor-phase refrigerant side valve member is configured by a differential pressure regulating valve movable based on a pressure difference between a refrigerant pressure at a side of the liquid-phase refrigerant outlet port and a refrigerant pressure at a side of the vapor-phase refrigerant passage,
the vapor-liquid separating space is formed in a cylindrical shape,
the vapor-liquid separating space is configured to separate vapor-phase refrigerant and liquid-phase refrigerant from each other by using a centrifugal force in the vapor-liquid separating space,
the vapor-liquid separating space is provided with a separated vapor-phase refrigerant outlet pipe arranged coaxially with the vapor-liquid separating space and providing the vapor-phase refrigerant passage therein, and
the separated vapor-phase refrigerant outlet pipe is provided with a separated vapor-phase refrigerant outlet hole through which vapor-phase refrigerant flows from the vapor-liquid separating space to a side of the vapor-phase refrigerant passage, and which is arranged at one end part of the separated vapor-phase refrigerant outlet pipe in a longitudinal direction.

14. The integration valve according to claim 13, further comprising
a shutter member formed in a discoid shape and restricting liquid-phase refrigerant separated in the vapor-liquid separating space from scattering toward a side of the separated vapor-phase refrigerant outlet hole, wherein
the shutter member is arranged between the separated vapor-phase refrigerant outlet hole and a separated liquid-phase refrigerant outlet hole through which liquid-phase refrigerant flows from the vapor-liquid separating space to a side of the liquid-phase refrigerant passage.

15. The integration valve according to claim 14, wherein a diameter Ds of the shutter member, a diameter Dp of the separated vapor-phase refrigerant outlet pipe, a diameter Dr of the vapor-liquid separating space, and a diameter Do of the separated liquid-phase refrigerant outlet hole are determined to satisfy following formulas of $Dp \leq Ds \leq (Dx+Dr)/2$ and $Dx=(Dr^2-Do^2)^{1/2}$.

16. The integration valve according to claim 14, wherein a diameter of an outer periphery of the shutter member at the side of the separated vapor-phase refrigerant outlet hole decreases continuously from a side of the separated liquid-phase refrigerant outlet hole to the side of the separated vapor-phase refrigerant outlet hole.

17. The integration valve according to claim 13, wherein the vapor-liquid separating space communicates with a refrigerant introducing passage introducing refrigerant from the refrigerant inlet port to the vapor-liquid separating space via a refrigerant introducing hole provided on a radial-outer wall surface of the vapor-liquid separating space, and
the refrigerant introducing hole is an oblong hole extending in an axial direction of the vapor-liquid separating space and opens at a location further from the one end part of the separated vapor-phase refrigerant outlet pipe than the other end part of the separated vapor-phase refrigerant outlet pipe in the longitudinal direction.

18. The integration valve according to claim 17, wherein (i) a distance Lv from an end part of the refrigerant introducing hole on a side of the one end part of the separated vapor-phase refrigerant outlet pipe in the longitudinal direction to the one end part of the separated vapor-phase refrigerant outlet pipe and (ii) a vertical dimension Dv of the refrigerant introducing hole extending in the axial direction of the vapor-liquid separating space are determined to satisfy a formula of $Lv \geq (1/2) \times Dv$.

* * * * *